US012013257B2

(12) United States Patent
Zafar et al.

(10) Patent No.: US 12,013,257 B2
(45) Date of Patent: Jun. 18, 2024

(54) METHOD AND APPARATUS FOR REMOTE MONITORING AND MANAGEMENT OF STORAGE USING MACHINE LEARNING AND DATA ANALYTICS

(71) Applicant: TeleSense, Inc., San Jose, CA (US)

(72) Inventors: Naeem Zafar, Cupertino, CA (US); Peter Michael Goesseringer, Jr., Saratoga, CA (US); Nicholas William Garner, Sunnyvale, CA (US); Pragya Kumar, Sunnyvale, CA (US); Achint Jagjit Sanghi, Irvine, CA (US)

(73) Assignee: TeleSense, Inc., Sunnyvale, CA (US)

( * ) Notice: Subject to any disclaimer, the term of this patent is extended or adjusted under 35 U.S.C. 154(b) by 0 days.

(21) Appl. No.: 16/285,964

(22) Filed: Feb. 26, 2019

(65) Prior Publication Data
US 2019/0265082 A1 Aug. 29, 2019

Related U.S. Application Data

(60) Provisional application No. 62/636,087, filed on Feb. 27, 2018.

(51) Int. Cl.
*G01D 11/24* (2006.01)
*A01F 25/00* (2006.01)
(Continued)

(52) U.S. Cl.
CPC ............ *G01D 11/245* (2013.01); *A01F 25/00* (2013.01); *A01F 25/16* (2013.01); *G01D 7/00* (2013.01)

(58) Field of Classification Search
CPC ........ G01D 1/245; G01D 11/245; G01D 7/00; G05D 27/02; G06N 3/02; G06N 20/00;
(Continued)

(56) References Cited

U.S. PATENT DOCUMENTS 3,475,687 A * 10/1969 Pierce ...................... H04B 7/10
  455/274
6,931,952 B2 * 8/2005 Rantala ................... G01L 5/008
  73/431
(Continued)

FOREIGN PATENT DOCUMENTS

CN 202818382 U 3/2013
CN 206021065 U 3/2017
(Continued)

OTHER PUBLICATIONS

International Search Report dated Sep. 20, 2019 issued in PCT/US2019/019604.
(Continued)

*Primary Examiner* — Justin N Olamit
(74) *Attorney, Agent, or Firm* — Arnold & Porter Kaye Scholer

(57) ABSTRACT

The present disclosure describes methods and apparatus for remote sensing with data analytics. The methods and apparatus have many applications including monitoring the quality of grain during storage and/or transport. The present disclosure describes a way to collect temperature and other environmental data to describe and predict quality of stored grains, current and future, based on a myriad factors including fumigation, external temperature and humidity, in storage grain temperature and humidity.

27 Claims, 21 Drawing Sheets

(51) Int. Cl.
*A01F 25/16* (2006.01)
*G01D 7/00* (2006.01)

(58) Field of Classification Search
CPC .......... G06N 20/10; A01F 25/16; H04Q 9/00; G01K 1/024; G01K 13/12
See application file for complete search history.

(56) References Cited

U.S. PATENT DOCUMENTS

| | | | | |
|---|---|---|---|---|
| 6,958,693 | B2 * | 10/2005 | Rothgeb | G21C 17/00 340/539.22 |
| 6,986,294 | B2 | 1/2006 | Fromme et al. | |
| 7,253,602 | B2 * | 8/2007 | Shvach | G01K 13/00 324/127 |
| 7,392,030 | B2 * | 6/2008 | Sunaga | H01Q 1/243 455/277.1 |
| 7,707,003 | B2 | 4/2010 | O'Connor et al. | |
| 8,314,712 | B2 * | 11/2012 | Fromme | G01N 27/00 340/632 |
| 8,661,407 | B2 | 2/2014 | Siegemund et al. | |
| 8,912,892 | B2 * | 12/2014 | Davoodi | G01V 11/002 340/10.1 |
| 9,779,330 | B2 | 10/2017 | Wellington et al. | |
| 9,797,785 | B2 | 10/2017 | Giorgi et al. | |
| 10,296,863 | B2 * | 5/2019 | Bantas | F26B 9/063 |
| 10,491,971 | B2 * | 11/2019 | Pisilä | G05B 15/02 |
| 10,653,027 | B2 * | 5/2020 | van Pol | G01N 29/02 |
| 10,677,723 | B2 | 6/2020 | Ditterich | |
| 11,033,694 | B2 * | 6/2021 | Ballam | A61M 16/024 |
| 11,343,551 | B1 | 5/2022 | Brailovskiy | |
| 2003/0033057 | A1 | 2/2003 | Kallestad | |
| 2004/0128050 | A1 | 7/2004 | Rieger et al. | |
| 2008/0091470 | A1 * | 4/2008 | Muradia | A61B 7/02 705/3 |
| 2010/0245074 | A1 * | 9/2010 | Green | A01F 25/00 340/539.1 |
| 2012/0142443 | A1 | 6/2012 | Savarese et al. | |
| 2014/0107932 | A1 * | 4/2014 | Luna | G16H 50/20 702/19 |
| 2016/0291127 | A1 | 10/2016 | Huang et al. | |
| 2017/0023987 | A1 | 1/2017 | Cho et al. | |
| 2017/0103683 | A1 | 4/2017 | Yazdi et al. | |
| 2017/0346953 | A1 * | 11/2017 | Abassi | H04M 11/007 |
| 2017/0350241 | A1 * | 12/2017 | Shi | E21B 47/01 |
| 2018/0197135 | A1 * | 7/2018 | Moyer | G06Q 50/10 |
| 2019/0018378 | A1 * | 1/2019 | Varikooty | H04W 4/38 |
| 2019/0107617 | A1 * | 4/2019 | Crowley | H01Q 1/084 |
| 2019/0265082 | A1 | 8/2019 | Zafar et al. | |

FOREIGN PATENT DOCUMENTS

| | | |
|---|---|---|
| CN | 106645599 A * | 5/2017 |
| CN | 206573225 U | 10/2017 |
| EP | 1 882 934 A1 | 1/2008 |
| JP | 2005-339078 | 12/2005 |
| WO | WO 03/100153 A1 | 12/2003 |
| WO | WO 2017/000022 A1 | 1/2017 |

OTHER PUBLICATIONS

"Achieve total success in crops and biomass monitoring, Webstech local," advertisement Kongskilde (2013).
"Achieve total success in crops and biomass monitoring, Base Station 2.0" advertisement Kongskilde (2013).
"Catch the ball with Webstech," advenisement Kongskilde (2013).
Luunbjerg, "25.000 kr. sparet på tørring årligt," advertisement Kontakt Salg & Service, www.webstech.dk (2013) with translation.
"Sensseed som sikkerhedsnet I maltbyggen," advenisement Kontakt Salg & service www.webstech.dk (2013) (with translation).
Wikipedia, "Machine Learning" as downloaded from the internet Archive on Jan. 2, 2017 (2017).
Groehe et al., "Manufacturing and use of novel sensoric fasteners for monitoring forming processes," Measurement 53:136-144 (2014).
International Search Report and Written Opinion dated Mar. 2, 2021 in PCT/US2020/058848.
Kaleta et al., "Criteria of Determination of Safe Grain Storage Time—A Review," (2013) downloaded at http://dx[dot]doi[dot]org/10[dot]5772/52235.

* cited by examiner

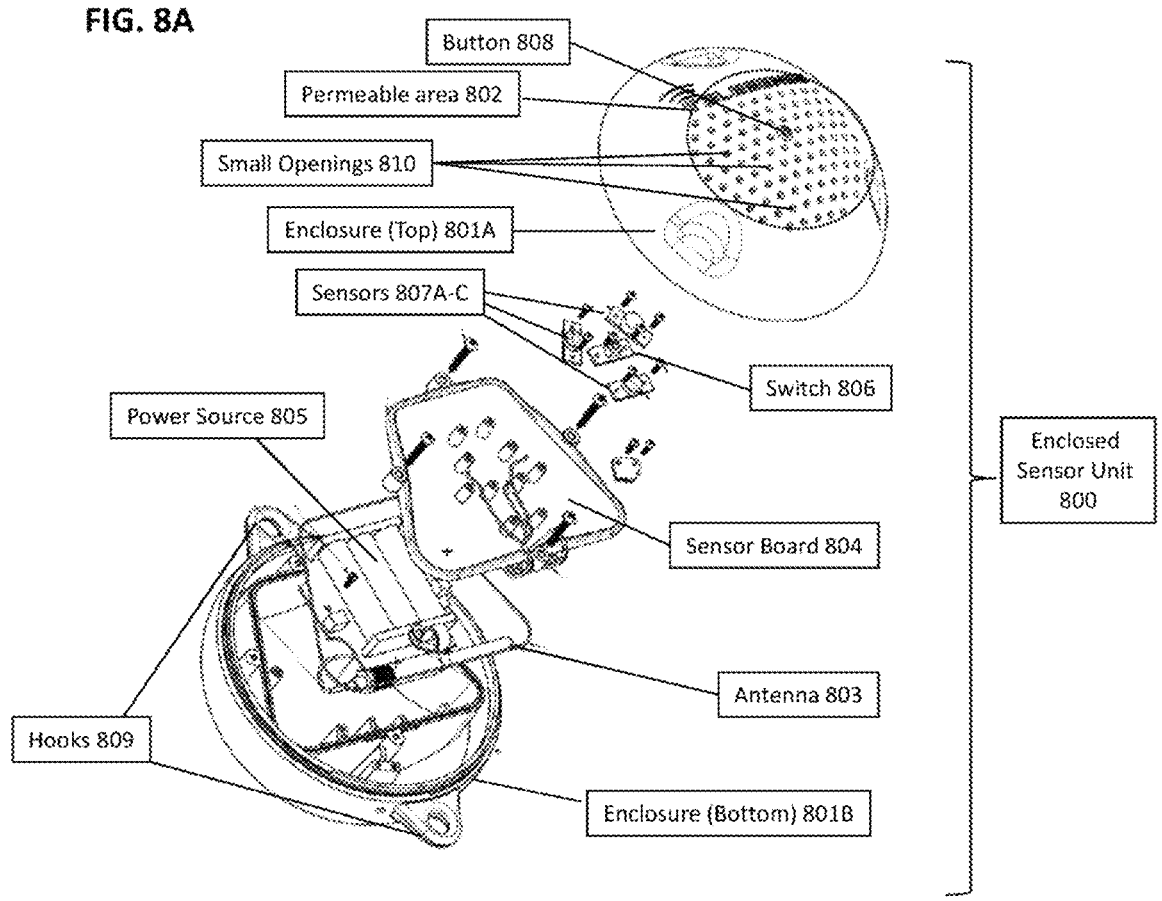

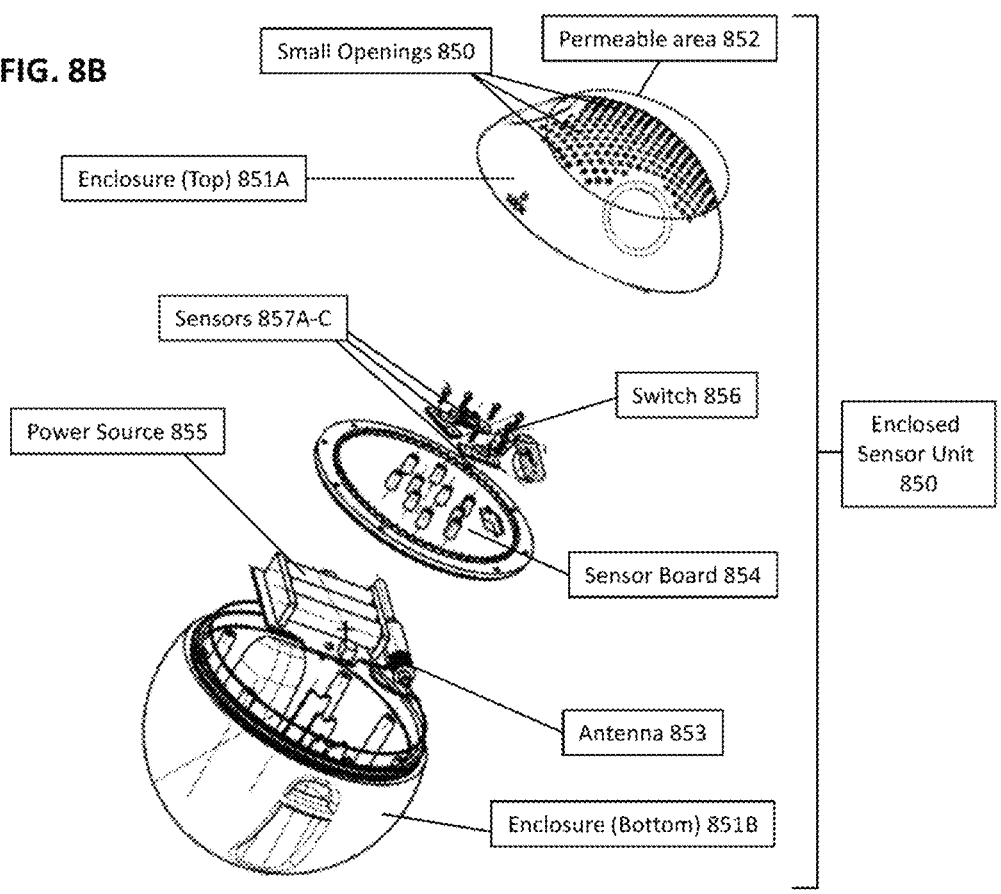

METHOD AND APPARATUS FOR REMOTE MONITORING AND MANAGEMENT OF STORAGE USING MACHINE LEARNING AND DATA ANALYTICS

CROSS REFERENCE TO RELATED APPLICATIONS

This application claims priority to U.S. Provisional Application No. 62/636,087, filed Feb. 27, 2018, the contents of which are incorporated herein by reference in their entirety for all purposes.

FIELD

The present patent document relates generally to sensors and data analytics and, more particularly, to a system that enables monitoring, logging, and/or acting on sensory data using data analytics and a sensor structure uniquely well-suited to crop storage applications, and in particular, grain storage. Some aspects of this disclosure improve ease of monitoring grain in storage, reducing quality degradation of stored grain, and optimizing decisions related to the purchase and sale of grains.

BACKGROUND

With the world population expected to increase to over nine billion people within the next thirty years, global food supplies will need to increase by 60% to ensure food security. Maximizing the efficiency of food production requires end-to-end management of agriculture from crop production through post-harvest. However, it is estimated that 1.3 billion tons of food is lost or wasted every year between harvest and consumption.

Cereal grains are estimated to supply half of the world's calorie intake, so even a small amount of post-harvest losses represents a significant loss in available food. Estimates of cereal post-harvest losses range between 2-10% of total production, varying based on region. Since grain is typically harvested once or twice a year but consumed year-round, long-term storage of harvests is critical to the overall grain value chain. Reducing grain losses during storage represents a reduction in waste of water, energy, and available food. Developing solutions to reduce storage losses is important in combating food waste and improving global food security.

Food loss consists of quantity losses as well as quality losses. Quality losses include loss of nutritional value, damage, change in nutritional composition, and reductions in processing yields. Quantity losses are actual reductions in total weight. Unfavorable storage conditions lead to insect infestation, mold growth, and rodent damage, which are major causes of both quality and quantity losses.

Corn, soybeans, and rice are three important crops for American farmers, each of which are susceptible to significant post-harvest loss during storage. For example, rice is one of the most important crops grown in California's Sacramento valley and more than 40 million hundredweights (equivalent to roughly 1.8 billion kg) of rice are produced every year. Rice is harvested when moisture ranges between 18% to 22% but it is dried down to 13% to 14% to for safe, long-term storage. Rice needs to be maintained at an appropriate temperature and moisture to preserve its quality. In fact, according to a survey conducted by the University of California Cooperative Extension of rice storage facilities, on-farm operations identified maintaining appropriate grain moisture as one of the most important problems respondents faced, followed by insect infestation and grain temperature. Biological degradation can also negatively affect the rice grade. High grain temperatures and moistures provide optimal conditions for mold growth and insect infestation, which can lead to a loss in grade of rice, and may also cause odors that can further reduce the value of rice.

The same issues apply to corn and soybeans, which are the major crops grown in the Midwest. For example, moisture levels in harvested soybeans greatly influence the profitability and quality of the product. Beans delivered above or below 13% moisture can lose potential profit. At greater than 13% moisture, there is a moisture dock on the scale ticket for delivering wet beans, resulting in a lower price per bushel. At less than 13% moisture, profit is lost because the reduced weight means there are fewer bushels measured from a given volume of grain—the farmer does not get paid for the weight of the moisture that is missing.

A common method for monitoring the condition of stored product utilizes temperature cables in storage structures and probing of grain for moisture content before delivery. Some medium and large sized American farms are fitted with sensor cables to monitor the temperature and moisture. However, these technologies lack predictive insight and require significant labor resources to operate, which often precludes full realization of potential gains in efficiency and profitability. To detect a pocket of spoiling grain, commonly referred to as a hotspot, moisture content temperature must be measured in or near the spoilage because moisture and heat do not diffuse outward readily. Deterioration occurring in the stored grain over half of a meter away from the temperature sensor could proceed into advanced stages before any noticeable rise in temperature is recorded. Hence, alternative methods of detection need to be developed and incorporated into stored grain management protocols that enable detection of the onset of biological activity in a timelier manner. The early detection of grain spoilage will limit product damage and help prevent dangerous mycotoxins in the food chain, which can cause death and disease in humans and animals. Early detection will also help avoid financial loss by allowing the application of timely and appropriate control measures. Thus, new sensor apparatuses and systems are useful to mitigate these issues.

Improved methods and systems for data collection are also needed to prevent a negative impact from post-harvest loss on quality and profitability. Currently, data are often collected from grain silos manually. For example, some grain silos have hanging thermocouples that require manual data collection. There are mechanisms to monitor grain spoilage by detecting changes in temperature, typically using sensor cables, but these technologies are real-time and lack predictive insight. They can give alerts once the temperature reaches a high enough value to indicate a problem, but often it is too late, and the grains are already spoiled by the time the alert is observed. Temperature data collected by these thermocouples are generally left as raw data, subject to interpretation and not made into an actionable format for users. An operator using this technology is left using their intuition and best guess for such critical operational decisions as running aeration fans, blending, or moving the grain to a new storage structure. There is a need for a more comprehensive solution that can aggregate data from multiple sensors, allow better central monitoring, and predict problems before they occur.

Finally, there is no one single, uniform metric that determines grain quality. The United States Department of Agriculture has established grades and standards that allow importers to gauge the quality of American grain. However, the grades do not provide detailed information that is often important to processors, such as nutritional composition, free fatty acid content (for soybeans), or falling number (for wheat). The use of these grades denies growers of any premiums and processors from being able to provide exact specifications in their bids. An objective measurement is needed that allows quality assessment at a high level of detail, which can also allow direct comparison between different grain types and varieties.

SUMMARY

Improved systems, methods, and apparatuses are disclosed that enable facile monitoring of grain stored in a storage environment. The systems utilize sensor units that can communicate data to and from a gateway over a first network. The systems also utilize a second network to communicate data between the gateway and a cloud computing system. The cloud computing system performs analysis on the environmental data collected by the sensors, thereby providing predictive analytics that can be used for responsive automation. The apparatuses, systems, and methods disclosed herein represent a significant advancement over those currently used in the field of grain storage and monitoring.

In one aspect of the present disclosure, a system for monitoring stored grain is provided. The system comprises a sensor unit located in a grain storage environment that detects an environmental variable from the grain storage environment, generates environmental data based on the environmental variable, and the sends environmental data. The system also comprises a gateway that receives the environmental data, and sends the environmental data to a cloud computing system. The system also comprises a cloud computing system that receives the environmental data, analyzes the environmental data, and generates an output. The system also comprises a first network that communicates the environmental data from the sensor unit to the gateway. The system also comprises a second network that communicates the environmental data from the gateway to the cloud computing system. The system performs the following functions: the gateway sends the environmental data generated by the sensor to the cloud computing system; the cloud computing system stores the environmental data over time, thereby generating a historical environmental data set; and the cloud computing system applies a trained algorithm to the historical environmental data set, thereby generating an output. The environmental data comprises at least one of the following: a temperature value, a humidity value, an oxygen value, a carbon dioxide value, a phosphine value, an ethylene value, a pressure value, and an acoustic value. The output comprises predictive data and/or an objective measure of grain quality.

In another embodiment, the first network comprises a first wireless network that operates at one or more communication frequencies.

In another embodiment, the one or more communication frequencies is between 400 MHz and 2.5 GHz.

In another embodiment, the one or more communication frequencies is at least one of the following: 2.4 GHz, 915 MHz, 900 MHz, 868 MHz, and/or 433 MHz.

In another embodiment, the system comprises a plurality of sensors units, the first network is a meshing wireless network, and each sensor unit of the plurality of sensor units functions as a node for the meshing wireless network.

In another embodiment, the system comprises a plurality of sensors units, the first network is a meshing wireless network, and each sensor unit of the plurality of sensor units functions as a node for the meshing wireless network; and the one or more communication frequencies is at least one of the following: 2.4 GHz, 915 MHz, 900 MHz, 868 MHz, and/or 433 MHz.

In another embodiment, the first wireless network utilizes at least one of the following protocols: ZigBee, Z-Wave, Thread, Bluetooth mesh, or Wi-Fi mesh.

In another embodiment, the system further comprises (f) a repeater unit that receives the environmental data from the sensor unit and sends the environmental data to the gateway; wherein the first network communicates the environmental data from the sensor unit to the repeater and from the repeater to the gateway.

In another embodiment, the gateway connects to the second network using at least one of the following: an internet connection, a cellular connection, and a satellite connection.

In another embodiment, the gateway comprises a mobile phone.

In another embodiment, the output is accessible via a user interface.

In another embodiment, the user interface comprises a personal computer or a mobile phone.

In another embodiment, the user interface comprises a native application and/or a web-based application.

In another embodiment, the output comprises a Grain Storage Quality Index (GSQI) value corresponding to the quality of the grain in the storage environment.

In another embodiment, the system comprises a plurality of sensor units and at least one of the sensor units comprises a wireless junction box.

In another embodiment, the trained algorithm is trained using an artificial intelligence modality.

In another embodiment, the trained algorithm is trained using machine learning.

In another aspect of the present disclosure, a method of monitoring grain in a grain storage environment is provided. The method utilizes a sensor located in the grain storage environment that detects one or more environmental variables from the grain storage environment and generates environmental data based on the one or more environmental variables. The method also utilizes a gateway that receives the environmental data, and sends the environmental data. The method also utilizes a cloud computing system that receives the environmental data from the gateway, stores the environmental data, thereby generating a historical environmental data set, applies a trained algorithm to the historical environmental data set, and generates an output. The method also utilizes a first network that communicates the environmental data from the sensor to the gateway. The method also utilizes a second network that communicates the environmental data from the gateway to the cloud computing system. The method comprises receiving the first environmental data set comprising data corresponding to environmental variables within the grain storage environment at a first time point and/or time period. The method also comprises analyzing the first environmental data set using a first set of conditions. The method also comprises determining if the first environmental data set satisfies the first set of conditions. The method also comprises repeating steps (a)-(c) using a plurality of environmental data sets, each of the plurality of environmental data sets comprising data corresponding to environmental variables within the grain storage environment at a unique time point and/or time period, and each of the plurality of environmental data sets is compared to a corresponding set of conditions. The method also comprises automatically initiating a downstream process if a predetermined number of consecutive environmental data sets exceeds their corresponding set of threshold values. The environmental data comprises and at least one of the following: temperature data, humidity data, oxygen data, carbon dioxide data, phosphine data, pressure data, and ethylene data.

In another embodiment, the environmental data comprises at least one of the following: temperature data and humidity data.

In another embodiment, the environmental data comprises temperature data and at least one of the following: humidity data, oxygen data, carbon dioxide data, phosphine data, pressure data, and ethylene data.

In another embodiment, the environmental data comprises temperature data.

In another embodiment, environmental data is saved by the cloud computing system, thereby generating and iteratively updating a historical data set, and each set of conditions is determined, in part, by analysis of the historical data set.

In another embodiment, the downstream process comprises presentation of an audio alert, a visual alert, and/or a notification.

In another embodiment, the downstream process comprises providing suggested actions to modify the grain storage environment, including suggestions relating to at least one of the following adjusting fans, adjusting vents, stirring the grain, and adjusting fumigation parameters.

In another embodiment, the downstream process comprises sending provisioning data to an actuator that manipulates a device in response to the provisioning data, thereby causing a change in the grain storage environment.

In another embodiment, the change in the grain storage environment comprises at least one of the following: (a) a change in temperature of the grain storage environment, (b) a change in level of aeration of the grain storage environment, (c) a change in amount and/or duration of fumigation of the grain storage environment; (d) a stirring of the grain in the grain storage environment.

In another embodiment, the trained algorithm is trained using an artificial intelligence modality.

In another embodiment, the trained algorithm is trained using machine learning.

In another aspect of the present disclosure, a method of monitoring grain in a grain storage environment. The method utilizes a sensor located in the grain storage environment that detects one or more environmental variables from the grain storage environment and generates a detected environmental data set based on the one or more environmental variables. The method also utilizes a gateway that receives the detected environmental data set, and sends the detected environmental data set. The method also utilizes a cloud computing system that receives the detected environmental data set from the gateway, stores a historical environmental data set, applies a trained algorithm to the historical environmental data set, generates a predicted environmental data set, and generates an output. The method also utilizes a first network that communicates the environmental data from the sensor to the gateway. The method also utilizes a second network that communicates the environmental data from the gateway to the cloud computing system. The method comprises receiving the detected environmental data set from the gateway. The method also comprises applying the trained algorithm to a prediction data set comprising a historical environmental data set thereby generating a predicted environmental data set. The method also comprises comparing the predicted environmental data set to the detected environmental data set, thereby generating a differential value set. The method also comprises analyzing the differential value set using a set of conditions. The method also comprises if the differential value set satisfies the set of conditions, automatically initiating a downstream process. The detected environmental data set and the historical environmental data set each comprise at least one of the following: temperature data, humidity data, oxygen data, carbon dioxide data, phosphine level data, and ethylene data. The historical environmental data set comprises environmental data previously generated by the sensor corresponding to the one or more environmental variables.

In another embodiment, the prediction data set further comprises an external predicted environmental data set acquired from an external source.

In another embodiment, the external source comprises a local weather forecast.

In another embodiment, the external predicted environmental data set comprises at least one of the following: temperature data, humidity data, and pressure data.

In another embodiment, the external predicted environmental data set comprises temperature data and humidity data.

In another embodiment, the detected environmental data set and the historical environmental data set each comprise at least one of the following: temperature data and humidity data.

In another embodiment, the detected environmental data set and the historical environmental data set each comprise at least one of the following: temperature data, humidity data, oxygen data, carbon dioxide data, phosphine data, and ethylene data.

In another embodiment, the detected environmental data set and the historical environmental data set each comprise temperature data.

In another embodiment, the detected environmental data set and the historical environmental data set each comprise temperature data and humidity data.

In another embodiment, the downstream process comprises presentation of an audio alert, a visual alert, and/or a notification.

In another embodiment, the downstream process comprises providing suggested actions to modify the grain storage environment, including suggestions relating to at least one of the following adjusting fans, adjusting vents, stirring the grain, and adjusting fumigation parameters.

In another embodiment, the downstream process comprises sending provisioning data to an actuator that manipulates a device in response to the provisioning data, thereby causing a change in the grain storage environment.

In another embodiment, the change in the grain storage environment comprises at least one of the following: (a) a change in temperature of the grain storage environment, (b) a change in level of aeration of the grain storage environment, (c) a change in amount and/or duration of fumigation of the grain storage environment; (d) a stirring of the grain in the grain storage environment.

In another embodiment, the trained algorithm is trained using an artificial intelligence modality.

In another embodiment, the trained algorithm is trained using machine learning.

In another aspect of the present disclosure, a sensor pod for detecting information about characteristics of an environment is provided. The sensor pod comprises a three-dimensional round enclosure. The three-dimensional round enclosure has at least one cross section that is circular or approximately circular. The three-dimensional round enclosure containing at least the following: a power supply; a memory; a processor configured to execute instructions in the memory and to read and write data to and from the memory; a radio receiver; a radio transmitter; an antenna configured to wirelessly transmit data and receive data; and one or more sensors. The one or more sensors comprise at least one of the following: a temperature sensor, a humidity sensor, an oxygen sensor, a carbon dioxide sensor, a phosphine sensor, an acoustic sensor, an ethylene sensor, a positioning sensor, an accelerometer, and a pressure sensor. The power supply is operably coupled to the memory chip, the processor, the radio receiver, the radio transmitter, and the one or more sensors. The memory chip is operably coupled to the processor, the radio receiver, the radio transmitter, and the one or more sensors. The processor is operably coupled to the radio receiver, the radio transmitter, and the one or more sensors. The antenna is operably coupled to the radio transmitter and the radio receiver. The sensor pod also comprises an on-off switch. The on-off switch is operably coupled to the power supply. The three-dimensional round enclosure comprises a permeable area, thereby allowing the one or more sensors to detect the environment.

In another embodiment, the sensor pod further comprises one or more external sensors not contained within the three-dimensional round enclosure, wherein data is collected by the sensor pod from the one or more external sensors using a wireless connection or direct coupling between the one or more external sensors and the sensor pod.

In another embodiment, the one or more external sensors is coupled to the sensor pod.

In another embodiment, data is collected from the one or more external sensors by a wireless connection.

In another embodiment, the one or more external sensors comprises at least one of the following: an external temperature sensor, an external humidity sensor, an external carbon dioxide sensor, an external oxygen sensor, an external phosphine sensor, an external ethylene sensor, an external acoustic sensor; an external positioning sensor, an external accelerometer, and an external pressure sensor.

In another embodiment, the one or more external sensors comprise at least one of the following: an external temperature sensor, an external humidity sensor, an external phosphine sensor, an external carbon dioxide sensor, and an external oxygen sensor.

In another embodiment, the one or more external sensor comprises an external temperature sensor.

In another embodiment, the one or more sensors comprises a temperature sensor and a humidity sensor.

In another embodiment, the one or more sensors further comprises at least one of the following: an oxygen sensor, a carbon dioxide sensor, a phosphine sensor, an acoustic sensor, a positioning sensor, an accelerometer, and a pressure sensor.

In another embodiment, the one or more sensors comprises a temperature sensor, a humidity sensor, and a phosphine sensor.

In another embodiment, the one or more sensors further comprises a at least one of the following: an oxygen sensor, a carbon dioxide sensor, a phosphine sensor, an acoustic sensor, a positioning sensor, an accelerometer, and a pressure sensor.

In another embodiment, the sensor pod is configured to be in two possible modes: an active mode, in which power from the power supply is delivered to the radio transmitter and the radio receiver, or a sleep mode, in which power from the power supply is not delivered to the radio transmitter or the radio receiver; wherein the sensor pod can switch between the active mode and the sleep mode and between the sleep mode and the active mode.

In another embodiment, the sensor pod will switch from the sleep mode to the active mode upon at least one of the following: data received by the sensor pod is outside of a predetermined range or a predetermined set of ranges; data received by the sensor pod is different from or substantially different from a predetermined value or a predetermined set of values; the sensor pod was in the sleep mode for a predetermined time period; and the sensor pod detects pressure and/or movement.

In another embodiment, the sensor pod will automatically transfer data to a gateway upon switching from sleep mode to active mode.

In another embodiment, the sensor pod switches from the active mode to the sleep mode upon at least one the following: data received by the sensor pod is within a predetermined range or ranges; data received by the sensor pod is equal to or substantially equal to a predetermined value or values; the sensor pod was in the active mode for a predetermined time period; and the sensor pod cannot find connectivity to a wireless network for a predetermined time period.

In another embodiment, the antenna comprises a first coaxial antenna unit and a second coaxial antenna unit, and wherein the plane defined by the first coaxial antenna unit is oriented perpendicular to or nearly perpendicular to the plane defined by the second coaxial antenna unit.

In another embodiment, the sensor pod tests the connectivity for each of the first coaxial antenna unit and the second coaxial antenna units prior to communication, and communicates using the coaxial antenna unit having the better connectivity.

In another embodiment, the sensor pod communicates using a frequency between 400 MHz and 2.5 GHz:

In another embodiment, the sensor pod communicates using at least one of the following frequencies: 2.4 GHz, 915 MHz, 900 MHz, 868 MHz, and/or 433 MHz.

In another embodiment, the sensor pod communicates using at least one of the following wireless protocols: ZigBee, Z-Wave, Thread, Bluetooth mesh, or Wi-Fi mesh.

In another embodiment, the sensor pod communicates using one of the following connections: an internet connection, a cellular connection, and a satellite connection.

In another aspect of the present disclosure, a method of monitoring the quality of grain in a grain storage environment. The method utilizes a sensor located in the grain storage environment that detects one or more environmental variables from the grain storage environment and generates a detected environmental data set based on the one or more environmental variable. The method also utilizes a gateway that receives the detected environmental data set, and sends the detected environmental data set. The method also utilizes a cloud computing system that receives the detected environmental data set from the gateway, stores a historical grain quality data set, applies a trained algorithm to a combined data set, and generates a Grain Quality Index Score (GSQI) value. The method also utilizes a first network that communicates the environmental data from the sensor to the gateway. The method also utilizes a second network that communicates the environmental data from the gateway to the cloud computing system. The method comprises receiving the detected environmental data set from the gateway. The method also comprises applying the trained algorithm to a combined data set. The combined data set comprises the historical grain quality data set and an environmental data set. The environmental data set comprises the detected environmental data set received from the gateway. The method also comprises generating a current GSQI value corresponding to the present quality of the grain stored in the grain storage environment. The historical grain quality data set comprises a historical GSQI value that corresponds to the quality of the grain stored in the grain storage environment at a previous time point and/or time period. The detected environmental data set comprises at least one of the following: temperature data, humidity data, oxygen data, carbon dioxide data, phosphine level data, and ethylene data.

In another embodiment, the environmental data set further comprises an external environmental data set acquired from an external source.

In another embodiment, the external source comprises a local weather forecast.

In another embodiment, the external environmental data set comprises at least one of the following: temperature data and humidity data.

In another embodiment, the external predicted environmental data set comprises temperature data and humidity data.

In another embodiment, the detected environmental data set and the historical environmental data set each comprise at least one of the following: temperature data and humidity data.

In another embodiment, the detected environmental data set comprises at least one of the following: temperature data, humidity data, oxygen data, carbon dioxide data, phosphine data, and ethylene data.

In another embodiment, the detected environmental data set comprises temperature data.

In another embodiment, the detected environmental data set comprises temperature data and humidity data.

In another embodiment, the detected environmental data set comprises temperature data and at least one of the following: humidity data, oxygen data, carbon dioxide data, phosphine data, and ethylene data.

In another embodiment, the trained algorithm is trained using an artificial intelligence modality.

In another embodiment, the trained algorithm is trained using machine learning.

In another aspect of the present disclosure, a method of predicting the quality of grain in a grain storage environment is provided. The method utilizes a sensor located in the grain storage environment that detects one or more environmental variables from the grain storage environment and generates environmental data based on the one or more environmental variables. The method also utilizes a gateway that receives the environmental data, and sends the environmental data. The method also utilizes a cloud computing system that receives the environmental data from the gateway, stores a historical grain quality data set and a historical environmental data set, analyzes the historical environmental data set, applies a trained algorithm to a combined data set, and generates a predicted GSQI value. The method also utilizes a first network that communicates the environmental data from the sensor to the gateway. The method also utilizes a second network that communicates the environmental data from the gateway to the cloud computing system. The method comprises applying the trained algorithm to a combined data set. The combined data set comprises a historical grain quality data set and a predicted environmental data set. The predicted environmental data set corresponds to predicted environmental data at a future time point. The method further comprises generating a predicted GSQI value corresponding to the predicted quality of the grain stored in the grain storage environment at the future time point. The historical grain quality data set comprises a historical GSQI value that correspond to the quality of the grain stored in the grain storage environment at previous time point and/or time period. The predicted environmental data set comprises at least one of the following an external predicted environmental data set acquired from an external source and an internal predicted environmental data set. The internal data set is generated by analyzing the historical environmental data set comprising environmental data received from the gateway at a previous time point and/or time period. The predicted environmental data set comprises at least one of the following: temperature data, humidity data, oxygen data, carbon dioxide data, phosphine level data, and ethylene data.

In another embodiment, the predicted environmental data set comprises at least one of the following: temperature data and humidity data.

In another embodiment, the predicted environmental data set comprises temperature data.

In another embodiment, the predicted environmental data set comprises temperature data and at least one of the following: humidity data, oxygen data, carbon dioxide data, phosphine data, and ethylene data.

In another embodiment, the predicted environmental data set comprises temperature data and humidity data.

In another embodiment, the predicted environmental data set comprises an external predicted environmental data set acquired from an external source.

In another embodiment, the external source is a local weather forecast.

In another embodiment, the external predicted environmental data set comprises at least one of the following: temperature data and humidity data.

In another embodiment, the external predicted environmental data set comprises temperature data and humidity data.

In another embodiment, the trained algorithm is trained using an artificial intelligence modality.

In another embodiment, the trained algorithm is trained using machine learning.

In another embodiment, the method further comprises generating an output.

In another embodiment, the output comprises suggestions for timing and price for the sale of the grain stored in the grain environment.

In another embodiment, the output comprises suggestions for shipping routes.

BRIEF DESCRIPTION OF THE DRAWINGS

FIG. 8A depicts the details of one embodiment 800 of the enclosed sensor unit 700, enclosed sensor unit 800, in exploded view. This embodiment comprises three sensors 807A-C connected to sensor board 804, power source 805, antenna 803, and on/off switch 806. All of these components are fully encapsulated in a three-dimensional round enclosure 801. The on/off switch 806 can be manipulated from outside of the enclosure using button 808.

FIG. 8B depicts the details of another embodiment 850 of the enclosed sensor unit 700, enclosed sensor unit 850, in exploded view. This embodiment comprises three sensors 857A-C connected to sensor board 854, power source 855, antenna 853, and on/off switch 856. All of these components are fully encapsulated in a three dimensional round enclosure 851. The button for manipulating the on/off switch 856 is not visible in the schematic depicted in FIG. 8B.

DETAILED DESCRIPTION

Figure 1A:
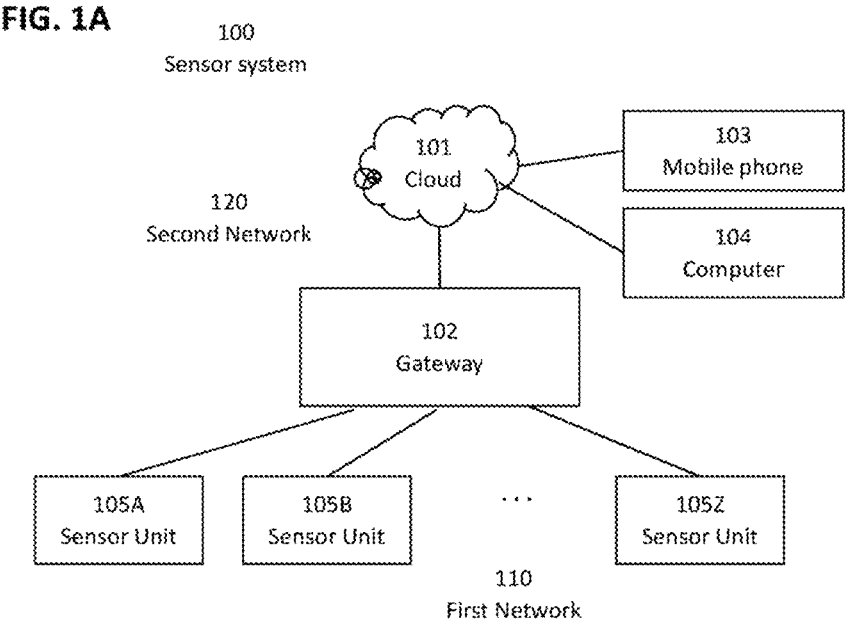
FIG. 1A shows a sensor system 100, consisting of a gateway 102 which connects to the cloud computing system 101 as well as to a number of sensor units 105A through 105Z. Gateway 102 connects to cloud computing system 101 using second network 120. Second network can be, for example, a connection to the internet such as a wired local area network ("LAN") or a wireless internet connection. The gateway 102 communicates digitally with sensor units 105A through 105Z e.g. through a wireless protocol or through a wired connection or through other means known to those in the art such as optical interconnection, magnetic resonance, etc. Cloud computing system 101 can analyze data and generate readouts, in addition to allowing remote access through one or more user interfaces, such as mobile phone 103 and/or computer 104.

The following description is presented to enable any person skilled in the art to create and use a sensor system, including a sensor ball, to measure and analyze the quality of grain in storage comprising one or more sensor units and one or more gateways. Each of the features and teachings disclosed herein can be utilized separately or in conjunction with other features to implement the disclosed system and method. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present teachings. However, it will be apparent to one skilled in the art that these specific details are not required to practice the present teachings. Within this application, use of terms that describe particular measurable parameters such as temperature, pressure, local atmospheric composition (e.g., concentration of a particular gas and/or set of gasses), or other terms of the art, are intended as examples for clarity of explanation and are not intended to restrict the applications of the present disclosure in any way. The matter disclosed in this application may be applied to any measurable parameters.

Section headings are included for ease-of-reading only, and are not intended to limit, indicate combinations of technology, or in any other way affect the scope or nature of this disclosure and the claims.

The present patent document describes sensor systems, apparatuses, and methods for determining the quality of crops and crop products in storage. For ease of explanation, a majority of the description in the present disclosure is made with respect to grain in storage. However, the systems, apparatuses, and methods disclosed herein are of equally useful to the monitoring and management of other crops in storage. For example, the systems, apparatuses, and methods disclosed herein can be utilized for the monitoring and management of fruits and vegetables in storage. Where particular changes to the methodology are required for adequate monitoring and management of fruits and vegetables, these difference are explicitly discussed. Otherwise, teachings and discussions applied to grain in storage are also applicable to fruits and vegetables in storage.

The present patent document discloses sensor systems for monitoring and predicting the quality of grain in a storage environment. These sensor systems utilize at least one sensor unit that connects to a cloud computing system. In some embodiments, the sensor system utilizes at least one sensor unit and at least one gateway. The sensor unit is generally located in or near a grain storage environment, where it detects environmental variables, such as temperature and humidity that affect grain quality, and generates data corresponding to these detected environmental variables. The data from the sensors are transferred to the cloud computing system for analysis. In some embodiments, the data is first transferred from sensor units to a gateway using either a local wireless connection or a direct wired connection. In some cases, the sensor unit is self-contained (i.e. sensor and wireless transmitter/receiver are contained in one device). In other cases, a pre-existing sensor (lacking wireless communication capabilities) is utilized and equipped with a modular device (i.e., wireless junction box) that allows the pre-existing sensor to transmit data over a local network. In some systems, each sensor can communicate directly with the other sensors, thereby meshing to expand the scope of the local network. Once in the cloud, the data are stored and analyzed using one or more machine-learning trained algorithms. The algorithms thereby generate a variety of analytical data including a Grain Storage Quality Index ("GSQI") (an objective measure of quality for the grain in storage) score, environmental trends (e.g., temperature trend line over time), environmental value predictions, and probabilities of an anomalous event (e.g., probability of developing a hotspot within the grain). In some cases, the analytical data also include suggestions for the user, such as suggested adjustments to the grain storage environment and suggestions about which batches of grain to sell in order to maximize return on grain sales over time. Users can access this analytical data using a computer or mobile phone that can connect to a native and/or web-based application that presents a variety of outputs, including data, quality scores, trend lines, and recommendations. In addition, some of the analytical data may be sent to the user's computer or mobile device. In some cases, the cloud computing system communicates information back to the sensor units and/or a gateway, and/or initiates other automated downstream processes.

The present patent document also discloses a sensor pod apparatus that is able to detect environmental variables and transmit that data to a gateway using a local network. The sensor pod apparatus comprises one or more sensors to detect environmental variables, as well as a radio transmitter and receiver to allow wireless communication. All of these components are contained within a three-dimensional round enclosure (e.g., three-dimensional ellipsoid or spherical enclosure). The three-dimensional round enclosure increases the durability of the sensor pod apparatus, making it more resistant to damage caused by physical force. The three-dimensional round enclosure also facilitates placement of the sensor pod, by making it easy to roll or throw, and facilitates retrieval of the sensor pod (e.g., allowing it to roll during vacuum cleaning of a grain storage bin). The sensor pod can transmit data to a gateway over a local network, where it can be forwarded to a cloud computing system and proxied through a gateway for analysis. In some cases, a plurality of sensor pods can directly communicate with each other, for example, over a meshing wireless network, thereby expanding the scope of the local wireless network. In some cases the sensor pods can process and store data locally prior to sending. Some sensor pods can be programmed to enter a sleep mode, thereby saving power and greatly extending the battery life of the system. In some cases, the sensor pods can be provided with provisioning data over the local network, thereby allowing the user to control various settings for each sensor pod.

The present patent document further discloses a method of predicting the quality of a grain in storage that utilizes one or more sensors, a gateway, and a cloud computing system. Data corresponding to environmental variables in the grain storage location are collected by the sensors and communicated to the gateway using a local wireless network or over wired connection. The data are then communicated from the gateway to a cloud computing system using a long-range network. In some embodiments, the gateway connects to the long range network using a wired connection and/or a wireless connection. Data are received by the cloud computing system and stored. A machine-learning trained algorithm, utilizing an initial GSQI value for the grain in storage, is then applied to the environmental data to generate predicted GSQI value that estimates the quality of the grain in storage at the current moment and/or one or more time points in the future. The GSQI value is universal in that it allows an accurate direct comparison of the quality two batches of grain, even if the two batches comprise different grain types (e.g., barley, rice, canola, etc.) and/or were grown in different areas (e.g., farms located on the Kansas plains vs. farms in California's central valley). In some cases, the GSQI value will allow direct comparison of batches that are grown only a few miles from each other that nevertheless have different profiles based on differential environmental conditions (e.g., different microclimates) and/or soil characteristics of the two areas, as well as different storage and/or transport conditions. The universal GSQI method allows farmers and purchasers to make informed business decisions (e.g., which batches of grain to buy or sell, how to price the batches, and/or when to sell). In some cases, the method further comprises the algorithm generating suggested business decisions and, in some cases, automating those business decisions.

I. Sensor Systems and their Components

A schematic illustrating the basic components of a sensor system for monitoring the quality of grain in storage is depicted in FIG. 1A. In one aspect, the present disclosure provides a sensor system comprising at least one gateway 102 and at least one sensor unit, depicted as a number of sensor units 105A-105Z. The number of sensor units can vary based on a number of factors, including the amount of grain being stored and the size of the storage facility. In some embodiments, the sensor units 105 are placed to proximal (and/or within) the grain in storage (e.g., within a grain storage environment). The sensor units 105 detect environmental conditions that are relevant to the quality of the grain in storage (e.g., temperature, humidity, oxygen concentration, carbon dioxide concentration, phosphine concentration, ethylene concentration, pressure, etc.). In some embodiments, each sensor unit 105A-105Z detects a single environmental condition. In other embodiments, each sensor unit 105A-105Z detects at least one environmental condition. In some embodiments, each sensor unit 105A-105Z detects more than one (e.g., 2, 3, 4, 5, or 6) environmental condition. In some embodiments, the sensor units 105 quantify the environmental condition and convert it to electronically stored data. In some embodiments, the sensor system comprises a single gateway 102. In other embodiment, the sensor system comprises more than one gateway 102 (e.g., 2, 3, 4, 5, etc.). For the purpose of simplifying the explanation, a system comprising one gateway will be repeatedly referenced throughout the specification. However, embodiments having more than one gateway are within the purview of the present disclosure.

Data corresponding to one or more environmental variables are captured from the one or more sensor units 105A-105Z. Data are then transmitted from the one or more sensor units 105 to the gateway 102. In some embodiments, the data captured by the sensor are transmitted to the gateway over a first (i.e., local) wireless network. In another embodiment not depicted, data captured by the one or more sensor units 105 are transferred to the gateway 102 using a wired connection between the one or more sensor units 105 and the gateway 102. The gateway 102 communicates data to a cloud computing system 101 over a second (i.e. long range) network 120. In preferred embodiments, the second network 120 is the Internet and the gateway 102 communicates to the cloud computing system 101 using standard Internet connectivity methods and protocols (including, for example, wired protocols such as wired LAN and/or wireless protocols such as Wi-Fi). The cloud computing system stores 101 and analyzes the data received from the gateway 102. In some embodiments, the cloud computing system 101 provides a user interface that can be accessed by a user via a device (e.g., personal computer 104 or mobile phone 103). In some embodiments, the cloud computing system 101 can send data back to the gateway 102 via the long range network 120. In some embodiments, the gateway 102 can send data to the one or more sensor units 105 using the local network 110 (wired or wireless connection). In other embodiments not depicted, the gateway 102 can send data to the sensor units 105 using a wired connection.

The data transferred from the sensor units 105 to the gateway 102 correspond to values of one or more environmental variables in a grain storage environment. Exemplary environmental values include the following: temperature, relative humidity, carbon dioxide concentration, oxygen concentration, phosphine concentration, ethylene concentration, pressure levels, and sound levels. Such environmental variables are relevant to the quality of the grain in the storage environment because they affect the rate of degradation and/or correlate to the rate of degradation of grain during storage. For example, an increase in temperature and/or humidity can cause an increased rate of spoilage. However, for example, an increase in carbon dioxide and concomitant decrease in oxygen can be caused by the growth of pest colonies, thereby correlating to an increased rate of spoilage. Similarly, certain sounds may be caused by the development of insect colonies, thereby correlating to an increased rate of degradation. Ethylene is given off by some ripening plant products and therefore will correlate to degradation rates for specific crops. The exemplary environmental variables listed above are not meant to provide an exhaustive list of all potential environmental variables that can be measured in connection with the present disclosure. Other variables relevant to grain quality (i.e., affecting or correlating to rate of grain degradation) may be used in connection with the apparatuses, systems, and methods disclosed herein.

In some embodiments, the sensor units 105 detect one of the following environmental variables: temperature, humidity, carbon dioxide, oxygen, phosphine, ethylene, pressure levels, movement, and sound levels. In other embodiments, the sensor units 105 detect at least one of the following environmental variables: temperature, humidity, carbon dioxide, oxygen, phosphine, ethylene, pressure levels, movement, and sound levels. In yet other embodiments, the sensor units 105 detect two or more (e.g., 2, 3, or 4, etc.) of the following environmental variables: temperature, humidity, carbon dioxide, oxygen, phosphine, ethylene, and sound levels. In some embodiments, the sensor units 105 detect at least one of temperature and humidity. In some embodiments, the sensor units 105 detect at least one of temperature and humidity, as well as at least one of the following environmental variables: carbon dioxide, oxygen, phosphine, ethylene, pressure levels, movement, and sound levels. In some embodiments, the sensor units 105 detect both temperature and humidity. In some embodiments, the sensor units 105 detect both temperature and humidity, as well as at least one of the following environmental variables: carbon dioxide, oxygen, phosphine, ethylene, and sound levels.

Figure 1B:
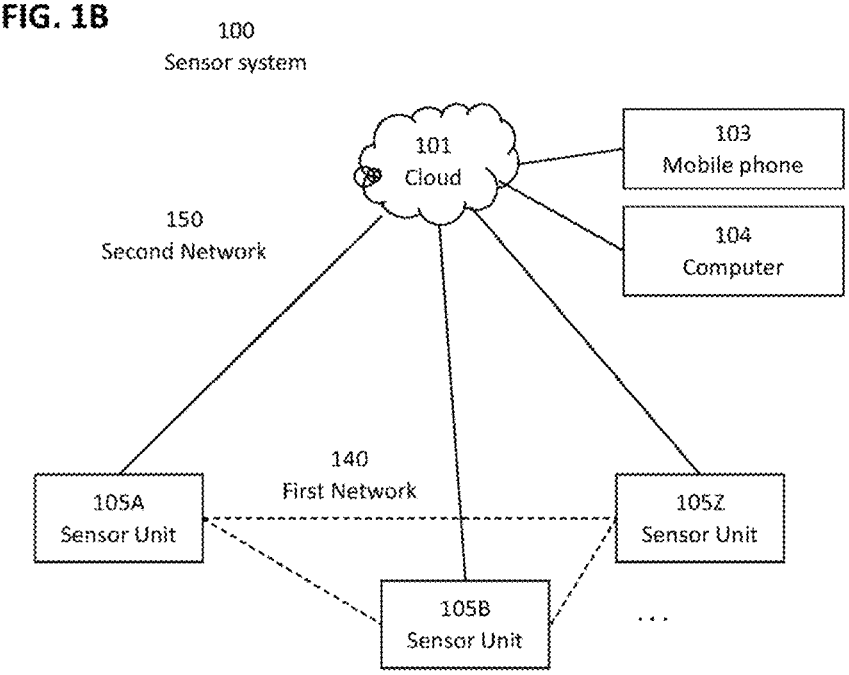
FIG. 1B shows another embodiment of sensor system 100, in which a number of sensor units 105A through 105Z connect directly to cloud computing system 101 using second network 150 without the need for a gateway intermediary. Second network 150 can be any long range network used by gateway 102 to connect to cloud computing system 101. Each sensor unit 105 can communicate with each other sensor unit 105 in the system 100 over first network 140.

In some embodiments, each sensor unit 105 A-Z of a plurality of sensor units 105 detects the same environmental variable (e.g., temperature) or set of environmental variables (e.g., temperature and humidity) as all other sensor units 105 A-Z in the plurality of sensor units 105. In other embodiments, each sensor unit 105 A-Z of a plurality of sensor units 105 does not detect the same environmental variable (e.g., temperature) or set of environmental variables (e.g., temperature and humidity) as all other sensor units 105 A-Z in the plurality of sensor units 105. Each of the components illustrated in FIGS. 1A and FIG. 1B is discussed in greater detail below. To facilitate simplicity of description and ease of understanding, in many places the system components will be referred to in the singular tense. However, as described above, systems comprising a plurality of each element are within the scope of the present disclosure. Sensor networks of the present disclosure may comprise, for example, one or more of the following components: a gateway, a sensor unit (including standalone sensor units and wireless junction boxes), and repeaters. Each component of the sensor system disclosed herein will now be described in greater detail.

Although the discussion of each component of the sensor system is made with respect to its application for monitoring grain storage, these systems and components, as described herein, are also applicable to the monitoring and management of fruit and/or vegetables in storage.

A. Gateway

Figure 2A:
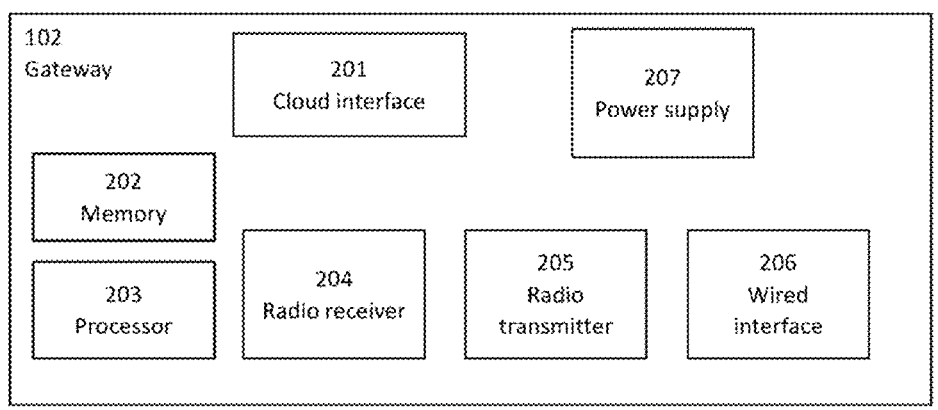
FIG. 2A shows the components of the gateway 102. A processor 203 executes instructions in memory 202 as well as reads and writes data to and from memory 202. Data is received from sensor units 105 using radio receiver 204 and transmitted using radio transmitter 205. Wired sensor units 105 are connected via 206 wired interface, using means such as Ethernet or RS-485. The gateway 102 communicates with cloud computing system 101 using, for example, a standard internet connection, such as a wired LAN or a Wi-Fi protocol. Power is provided by power supply 207, which may get its power from a battery, a DC power source such as the 12V power available in a motor vehicle, or an AC power source such as an electrical outlet.

In some embodiments, gateway 102, depicted by the schematic in FIG. 2A, comprises a cloud interface 201, memory 202, processor 203, radio receiver 204, radio transmitter 205, wired interface 206, and power supply 207. In some embodiments, the cloud interface 201 permits communication between the gateway 102 and the cloud computing system 101, depicted in FIG. 1A and FIG. 1B. Memory 202 stores data locally on the gateway, including data collected by one or more sensor units 105. Processor 203 executes instructions in memory 202 and reads and writes data to and from memory 202. Data are received from sensor units 105 using radio receiver 204. Radio receiver 204 permits gateway 102 to receive data from, for example, the one or more sensor units 105 over, for example, local network 110. In some embodiments, radio receiver 204 also permits gateway 102 to receive data from, for example, the cloud computing system 101 over, for example, long range network 120, when long range network 120 comprises a cellular network. Data are transmitted to sensor units 105 using radio transmitter 205. In some embodiments, radio transmitter 205 permits gateway 102 to send data to, for example, the one or more sensor units 105 over, for example, local network 110. In some embodiments, radio transmitter 205 also permits gateway 102 to send data to, for example, the cloud computing system 101 over, for example, long range network 120, when long range network 120 comprises a cellular network. In some embodiments, data are also received from one or more additional gateways 102 using radio receiver 204 and transmitted using radio transmitter 205 via the local network 110. In some embodiments, wired interface 206 allows gateway 102 to be connected to one or more wired sensor units (not depicted in FIG. 1A or FIG. 1B) using a direct wired connection. In some embodiments wired sensor units are connected to gateway 102 using means such as Ethernet or RS-485. In some embodiments, wired sensors are provided power using a Power over Ethernet ("PoE"), such as for example a standards-based PoE. In some embodiments, long range network 120, includes, for example wife, wireless broadband, cellular, LAN, and/or wired broadband. Power supply 207 delivers power to the gateway 102, thereby enabling its function. In some embodiments the gateway 102 may include an Internet access point in addition to its other functions described herein.

In some embodiments, the gateway 102 is powered by a portable power source such as, for example, a battery. In some embodiments, the gateway 102 is powered by a DC power source such as, for example, a car's 12V electrical system. In some embodiments, the power system is, for example, 5V or 3.3 V. In some embodiments, the gateway 102 is powered from an AC power source such as, for example, a home electrical outlet. In some embodiments, gateway 102 is powered by solar cells located on the gateway 102. In some embodiments, the power source may comprise an Ethernet cable, and the gateway 102 is powered by a PoE system. In some embodiments, the power source may be converted to a different voltage, conditioned, or processed in other ways through internal or external circuitry, such as, for example, a power brick.

In some embodiments, gateway 102 aggregates and/or buffers information from one or more sensor pods 105. The aggregated/buffered data may then be processed. The raw and/or processed data may be forwarded to another communications channel, such as long range network 120 (e.g. a Wi-Fi connection or wired Ethernet connection that leads to the Internet) so that the data can be transferred to cloud computing system 101. In some embodiments, the aggregated/buffered data is stored locally on the memory 202 of gateway 102 and the data is transferred to the cloud computing system 101 upon the occurrence of predetermined events. For example, in some embodiments, the gateway 102 will automatically send the locally stored data to the cloud computing system 101, when the gateway 102 is connected to the long range network 120. In some embodiments, the gateway 102 is programmed (either manually by the user or through a preset configuration) to send batches of aggregated/buffered data to the cloud computing system 101 at predetermined time periods. A person having ordinary skill in the art will recognize that many variations on this functionality are possible.

In some embodiments, a display may be included as part of gateway 102. The display may be, for example, a basic computer screen or a touch-screen interface. In some embodiments, user controls (e.g., a keyboard and/or touch-screen) may be included as part of the gateways 102. In some embodiments, such as that depicted in FIG. 2B, this display and/or user controls is implemented by providing, for example, a removable tablet computer 402. In other embodiments, a different a removable display and/or user interface is implemented by providing, for example, a removable mobile phone or laptop computer. In some embodiments, these display and/or user controls provide at least one or more of the following functions:

a. Access to the Internet by using the gateway 102 as an access point;
  b. Display the data for local use, such as for example, in a preferred embodiment where the gateway 102 may create its own local wireless network using Wi-Fi technology and communicate with the Internet using one of many protocols;
  c. Display of aggregated data from one or more sensor pods;
  d. Set and/or display the configuration of one or more sensor pods;
  e. Display acknowledged and unacknowledged alerts and alarms; and/or
  f. Provide sensor unit name to hardware ID mapping allowing for sensor unit assignment.

In some embodiments, gateway 102 provides a visual and/or audible alarm upon the occurrence of a predetermined event. In some embodiments, the predetermined events include, for example, data received from one or more sensor units 105 that indicate a value that is out of range. In some embodiments, the proper range may be determined by manual setting of minimum and/or maximum values for the normal range by the user. In some embodiments, the normal range is preconfigured based on application. For example, if the sensor units 105 are monitoring the temperature of a grain silo with relatively high temperatures (e.g., California's Central Valley), each sensor unit could be preconfigured for a normal range of, for example, 10° C. to 30° C. Similarly, if the sensor units 105 are monitoring the temperature of a refrigerated trailer that carries frozen food, each sensor unit 105A-Z could be preconfigured for a normal range of, for example, −25° C. to −15° C. In other embodiments, the normal range may be based on previous typical values. For example, if a sensor value goes more than 2-sigma outside of historical values (e.g., the average of the last 10 sensor values) the sensor value is deemed out of range, thereby triggering an alarm. In yet other embodiments, the normal range may be based on the values detected by other sensors. For example, if all of the sensors from a given sensor pod are monitoring different sections of a grain silo, a sensor that is, for example, more than 10% different than any of the other sensors within the grain silo might be deemed out of range. Each of the preceding methods of establishing a normal range can be used in isolation or in combination (e.g., an alarm to go off if either out of a predetermined range or greater than 10% deviation from historical data values).

In yet other embodiments, normal range is configured at the sensor, (e.g. through a switch 310 in FIG. 3 or other means) either instead of or in addition to configuration of the normal range at the gateway. For example, a temperature sensor may include a switch that indicates whether it is monitoring refrigerated grain or grain stored at ambient temperatures. In this example if the switch is set to the refrigerated grain setting, the sensor unit could set a range of 5° C. to 10° C. for this sensor. If the switch is set to the ambient temperature setting, the sensor unit could set a range of, for example, 10° C. to 27° C. for this sensor unit. The position of the switch may be communicated to the sensor pod through any one of a number of methods understood by those skilled in the art, such as, for example, utilizing the local wireless network or an extra wire (in cases where it is an analog sensor). The switch can be mechanical or software addressable from a user dashboard. In some embodiments, the user dashboard is located on, for example, a personal computer, tablet computer, or mobile phone.

While each of the above described examples for determining a normal range utilize temperature as the environmental variable, the facet of the present disclosure is in no way limited to sensor systems that utilize temperature sensors. Each of the examples described above (e.g. manual input, preprogrammed range, ranges based on historical data, and/or ranges that depend on other sensor in the system) can utilize one or more environmental variables including temperature, humidity, carbon dioxide levels, oxygen levels, ethylene levels, phosphine levels, pressure levels, movement, and/or sound levels. For example, a sensor system could have a normal range that covers 20% to 40% relative humidity, which was set by a user via a software interface to cloud computing system 101, such as, for example, mobile phone 103 or computer 104. An alarm in this case might prompt the user to increase aeration of the grain silo on a relatively dry day. In another example, a sensor system can be set to have a normal range of within 10% of historic values for carbon dioxide and within 5% of the oxygen values of other sensor units. In such cases, if a sensor pod registers a deviation from either one or both of these ranges (depending on the setting), then the user will receive an alarm that might indicate a localized formation of a pest colony. The user can then rely on this information to adjust fumigation practices so as to curtail the pest growth.

In some embodiments, the gateway 102 is configured to automatically engage one or more actions whenever the gateway 102 and/or one or more of the sensor pods 105 are turned on (e.g., they are provided power and/or a power switch or button is actuated). In some embodiments, one or more actuators are automatically provisioned. In some embodiments, the actuators engage processes that modulate the storage environment, such as turning on fans, stirring the grain, opening vents, and/or fumigating the grain. In some embodiments, these may include providing prompts and/or alarms for provisioning of each sensor. In this context, provisioning consists of an exchange of information from the sensor pod to the gateway 102 to signal the pod's presence and for the gateway 102 to respond with any relevant parameters. Parameters may include, but are not limited, to time intervals between measurements, normal ranges, etc. For example, upon powering up the gateway 102, a prompt may be generated indicating to the user that the parameters of the sensors (e.g., which environmental variables to detect, what to define as normal ranges, etc.) can be adjusted at this time. Such prompt and/or display might also include historical and/or current data delivered from the sensors. In other embodiments, the gateway 102 will automatically initiate provisioning of one or more sensors upon powering up.

In some embodiments, the gateway 102 automatically finds sensor units 105 that are within communications range (e.g. within the range of local wireless network 110). In such embodiments, each sensor unit 105A-Z announces its presence and the master coordinator acknowledges the sensor unit and makes it part of the mesh network. In such embodiments, the local wireless network is self-configuring and self-healing. Although some of the foregoing example describe the process in terms of a local wireless network that comprises a ZigBee network, those skilled in the art will recognize that similar techniques can be implemented using other network types and protocols (e.g., Z-Wave, Thread, Bluetooth mesh, or Wi-Fi mesh).

In some embodiments, the gateway 102 communicates with sensor units 105 using a first network (i.e., local network) 110. In some embodiments, local network 110 is a local wireless network that operates in a defined frequency range. In some embodiments, the frequency range is between 400 MHz and 2.5 GHz. In some embodiments, the frequency range is between 400 MHz and 2.0 GHz. In some embodiments, the frequency range is between 500 MHz and 1.0 GHz. In some embodiments, the frequency range is between 950 MHz and 850 MHz. In some embodiments, the sensor units 105 are on a local wireless network 110 that operates at one or more communication frequency. In some embodiments, the one or more communication frequency of local wireless network 110 includes, for example, at least one of the following: 2.4 GHz, 915 MHz, 900 MHz, 868 MHz, and/or 433 MHz. In some embodiments, the one or more communication frequency of local wireless network 110 is, for example, 2.4 GHz, 915 MHz, 900 MHz, 868 MHz, or 433 MHz. In some embodiments, the communication frequency of local wireless network 110 is 2.4 GHz. In some embodiments, the communication frequency of local wireless network 110 is 915 MHz. In some embodiments, the communication frequency of local wireless network 110 is 900 MHz. In some embodiments, the communication frequency of local wireless network 110 is 868 MHz. In some embodiments, the communication frequency of local wireless network 110 is 433 MHz. In some embodiments, the local network 110 utilizes a ZigBee protocol. In some embodiments, the local network 110 utilizes at least one of the following wireless protocols: Z-Wave, Thread, Bluetooth mesh, and/or Wi-Fi mesh.

In some embodiments, gateway 102 connects to the cloud using a second network 120 (i.e., long range network). In some embodiments, gateway 102 connects to second network 120 using a standard internet connection. In some embodiments, gateway 102 connects to second network 120 using a wired internet connection. In some embodiments, the gateway 102 connects to the second network 120 using a wired LAN. In some embodiments, the gateway 102 connects to the second network 120 using Ethernet. In some embodiments, the gateway 102 connects to the second network 120 using a wireless internet connection. In some embodiments, the gateway 102 connects to the second network 120 using Wi-Fi. In some embodiments, the gateway 102 connects to the second network 120 using a cellular connection. In some embodiments, the gateway 102 connects to the second network 120 using a satellite communication protocol. Many other methods for connecting the gateway to the cloud computing system 101 are known to a person of ordinary skill and may be used without deviating from the scope of the present disclosure.

Figure 2B:
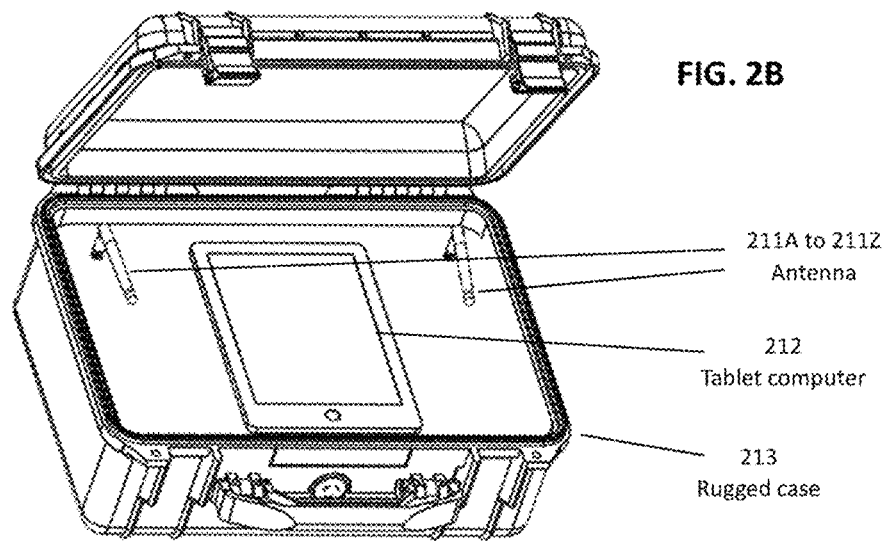
FIG. 2B shows one embodiment of the gateway 102. The components are preferably built into a rugged case 213. A number of antennas 211A to 211Z are included for wireless communications. For clarity of drawing just two antennas are shown. In the embodiment shown, a tablet computer 212 is included, as a user interface and display device. This tablet communicates with the gateway 102 via standard wireless and/or wired protocols, such as Wi-Fi and/or wired LAN, and the gateway 102 uses, for example, the ZigBee protocol and similar protocols to communicate with all sensor nodes as a mesh network. Not shown in the diagram is a charge port for the tablet computer that is built into the gateway 102.

As described above, in some embodiments, a gateway 102 can comprise, for example, a removable user interface, such as a tablet computer 212 (depicted in FIG. 2B). In some embodiments, the removable user interface can be reversibly attached (i.e. docked) into a larger gateway system 102 that is fully enclosed, for example, in rugged case 213, depicted in FIG. 4. Such gateway system can include one or more antennae 211A-Z, which facilitate long range wireless communication, for example, with cloud computing system 101 (see FIG. 1A). Such embodiments will offer several advantages, including improved wireless connectivity to, for example, long range network 120 and local network 110. The rugged case will facilitate transport of the gateway, and will increase the durability of gateway 120, particularly during use in the field. In some embodiments, the gateway 102 will be fully functional (e.g. able to collect, store, aggregate, process, and/or communicate data) in the absence of the removable user interface.

B. Sensor Units

In some embodiments, each sensor unit 105 is a single, standalone device. In other embodiments, each sensor unit comprises a local sensor device (e.g., a hanging thermocouple) and a modular communications unit (e.g., a wireless junction box or "WJB") that connects to the local sensor device, thereby enabling wireless transfer of data collected by the local sensor device to a gateway 105. More detailed information on such modular communications units and the WJB are described below. Some sensor systems comprise one or more standalone sensor units (e.g., sensor pods), as well as one or more local sensor devices fitted with a modular communications unit (e.g., a WJB).

(1) Standalone Sensor Units

Figure 3:
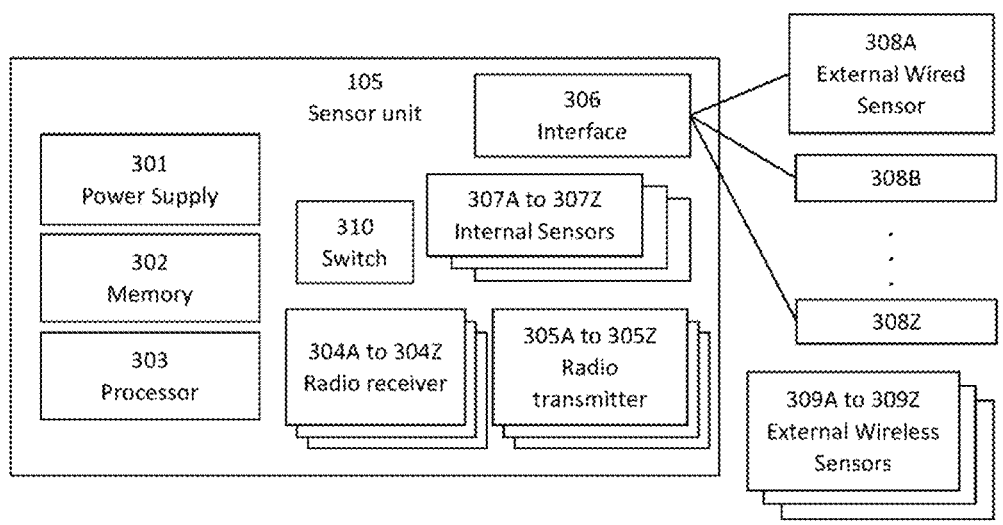
FIG. 3 shows the components and architecture of sensor unit 105 along with its associated external wired and wireless sensors. A processor 303 executes instructions in memory 302 as well as reads and writes data to and from memory 302. Data is collected from sensors connected in three different ways. Internal sensors 307A to 307Z are a number of sensors embedded within the sensor unit 105. External wired sensors 308A to 308Z are an arbitrary number of external sensors that use a physical connection to transfer data to sensor unit 105. This physical connection may be analog, digital, or other means of interconnect, such as optical. External wireless sensors 309A to 309Z are an arbitrary number of external sensors that use a wireless connection to transfer data to sensor unit 105. This may be through radio waves, for example using a wireless communication protocol, or may be optical, electromagnetic, sonic, or any other means that do not require a physical connection. Radio receivers 304A to 304Z and Radio transmitters 305A to 305Z communicate with external wireless sensors 309 and/or to one or more gateways 102. In some embodiments a first radio receiver and transmitter are included to communicate with wireless sensors and a second radio receiver and transmitter are included for communicating with the gateway 102. Power is provided by power supply 301, which may get its power from, e.g., a battery, a DC power source or an AC power source such as an electrical outlet.

As described above, in some embodiments, the sensor unit 105, depicted by the block diagram in FIG. 3, is a separate, standalone device (e.g., a sensor pod). Sensor unit 105 comprises a power supply 301, memory 302, processor 303, radio receiver 304, radio transmitter 305, and internal sensors 307. In some embodiments, the sensor unit 105 further comprises one or more external wired sensors 308A-Z. In some embodiments, the sensor unit 105 further comprises one or more external wireless sensors 309A-Z. Power supply 301 delivers power to the sensor unit 105, thereby enabling its function. The power supply 301 can be, for example, at least those power sources described above with respect to power supply 207 (e.g., PoE system, battery, electrical outlet, etc.). In some embodiments, memory 302 stores data locally on the sensor unit 105, including data collected by one or more internal sensors 307, the one or more wired external sensors 308, and/or the one or more wireless external sensors 309. Processor 303 executes instructions stored in a non-transitory device such as memory 302, and reads and writes data to and from memory 302. Data is received from, for example, the gateway and/or other sensor units 105 using radio receiver 304. Radio receiver 204 permits sensor unit 105 to receive data from, for example, the gateway 102 and/or other sensor units 105 over, for example, local wireless network 110. In some embodiments, radio receiver 304 also permits sensor unit 105 to receive data from, for example, the cloud computing system 101 over, for example, long range network 120. Data are transmitted to, for example, the gateway 102 and/or other sensor units 105 using radio transmitter 305. In some embodiments, radio transmitter 205 permits sensor unit 105 to send data to, for example, the gateway and/or other sensor units 105 over, for example, local wireless network 110. In some embodiments, sensor unit 105 comprises switch 310 for configuring and/or manually provisioning sensor unit 105. In some embodiments, radio transmitter 205 also permits sensor unit 105 to send data to, for example, the cloud computing system 101 over, for example, long range network 120.

Sensor units 105 comprise internal sensors 307A-Z that detect an environmental variable and generate data corresponding to that environmental variable. As described above, exemplary environmental values include the following: temperature, humidity level, carbon dioxide concentration, oxygen concentration, phosphine concentration, ethylene concentration, sound levels, and movement. In some embodiments, each sensor unit 105 comprises a plurality (e.g., 2, 3, 4, 5, etc.) of internal sensors 307A-Z. In some such embodiments, each of the plurality of internal sensors 307 is specific to a different environmental variable. For example, in one embodiment, a single sensor unit 105 comprises a temperature sensor, a humidity sensor, a carbon dioxide sensor, an oxygen sensor, a phosphine sensor, an ethylene sensor, a sound/acoustic sensor, a pressure sensor, and an accelerometer. In another exemplary embodiment, a single sensor unit 105 comprises at least one of the following: a temperature sensor, a humidity sensor, a carbon dioxide sensor, an oxygen sensor, a phosphine sensor, an ethylene sensor, a sound/acoustic sensor, a pressure sensor, and an accelerometer. In another exemplary embodiment, a single sensor unit 105 comprises at least one of a temperature sensor and a humidity sensor. In another embodiment, a single sensor unit 105 comprises at least one of a temperature sensor and a humidity sensor, as well as at least one of the following: a carbon dioxide sensor, an oxygen sensor, a phosphine sensor, an ethylene sensor, a sound/acoustic sensor, a pressure sensor, and an accelerometer. In another embodiment, a single sensor unit 105 comprises both a temperature sensor and a humidity sensor. In some embodiments, a single sensor unit 105 comprises a temperature sensor, a humidity sensor, and a phosphine sensor. In another embodiment, a single sensor unit comprises both a temperature sensor and a humidity sensor, as well as at least one of the following: a carbon dioxide sensor, an oxygen sensor, a phosphine sensor, an ethylene sensor, a sound/acoustic sensor, and an accelerometer. In some embodiments, single sensor unit 105 comprises a temperature sensor, a humidity sensor, and a phosphine sensor. A person having ordinary skill in the art will recognize that various combinations of such sensors can be used without straying from the scope of the present patent document and claims.

The sensor unit 105 may comprise additional sensors as well, which are not necessarily used to detect environmental variables. For example, the sensor unit 105 further comprises a positioning sensor. The positioning sensor can determine the location of the sensor unit 105 and transmit to other sensor units, gateway 102, and/or cloud computing system 101. In some embodiments, the sensor unit 105 further comprises a pressure sensor. The pressure sensor can be used to detected changes in atmospheric pressure in the grain environment. However, pressure sensors can also detect pressure exerted on the sensor unit, such that the pressure sensor can, for example, detect the sensor unit's relative depth in a bulk grain pile. In some embodiments, the pressure sensors detect both the atmospheric pressure in the grain environment, as well as presser exerted on the sensor unit. In some embodiments, the sensor unit 105 also comprises an accelerometer. The accelerometer can be used to detect movement in the grain. This can be useful in determining the environmental conditions (for example, by detecting movement cause by pests). However, in some embodiments, the accelerometer can also be used, for example, to detect other movement in the grain and can be used to reestablish connectivity by shaking the ball as needed when deploying or redeploying the sensor unit.

For embodiments used in the monitoring of stored fruits and vegetables, it is particularly advantageous to have an ethylene sensor because ethylene is given off by ripening fruit and/or vegetables. In some embodiments, a single sensor unit comprises an ethylene sensor as well as at least one of the following: a temperature sensor, a humidity sensor, a carbon dioxide sensor, an oxygen sensor, a phosphine sensor, a sound/acoustic sensor, a pressure sensor, and an accelerometer. In some embodiments, a single sensor unit comprises an ethylene sensor as well as at least one of the following: a temperature sensor, a humidity sensor, a carbon dioxide sensor, an oxygen sensor, and a phosphine sensor. In some embodiments, a single sensor unit comprises an ethylene sensor as well as at least two of the following: a temperature sensor, a humidity sensor, a carbon dioxide sensor, an oxygen sensor, a phosphine sensor, a sound/acoustic sensor, a pressure sensor, and an accelerometer. In some embodiments, a single sensor unit comprises an ethylene sensor and a temperature sensor, as well as at least one of the following: a humidity sensor, a carbon dioxide sensor, an oxygen sensor, a phosphine sensor, a pressure sensor, a sound/acoustic sensor, and an accelerometer. In some embodiments, a single sensor unit comprises an ethylene sensor, a temperature sensor, and a humidity sensor.

In some embodiments, sensor unit 105 comprises a temperature sensor. In some embodiments, sensor unit 105 comprises a humidity sensor. In some embodiments, sensor unit 105 comprises an ethylene sensor. In some embodiments, sensor unit 105 comprises a phosphine sensor. In some embodiments, sensor unit 105 comprises an oxygen sensor. In some embodiments, sensor unit 105 comprises a carbon dioxide sensor. In some embodiments, sensor unit 105 comprises an acoustic/sound sensor. In some embodiments, sensor unit 105 comprises an accelerometer.

In some embodiments, sensor unit 105 comprises a temperature sensor and a humidity sensor. In some embodiments, sensor unit 105 comprises a temperature sensor and a phosphine sensor. In some embodiments, sensor unit 105 comprises a temperature sensor and an ethylene sensor. In some embodiments, sensor unit 105 comprises a temperature sensor and a carbon dioxide sensor. In some embodiments, sensor unit 105 comprises a temperature sensor and an oxygen sensor. In some embodiments, sensor unit 105 comprises a temperature sensor and a pressure sensor. In some embodiments, sensor unit 105 comprises a temperature sensor and an accelerometer. In some embodiments, sensor unit 105 comprises a temperature sensor and an acoustic/sound sensor.

In some embodiments, sensor unit 105 comprises a temperature sensor, a humidity sensor, and a phosphine sensor. In some embodiments, sensor unit 105 comprises a temperature sensor, a humidity sensor, and an ethylene sensor. In some embodiments, sensor unit 105 comprises a temperature sensor, a humidity sensor, and a carbon dioxide sensor. In some embodiments, sensor unit 105 comprises a temperature sensor, a humidity sensor, and an oxygen sensor.

In some embodiments, sensor unit 105 further comprises one or more external sensors. In some embodiments, sensor unit 105 further comprises interface 306 and is connected to external wired sensors 308A-Z. Such external wired sensors 308 also detect an environmental variable and generate data corresponding to that environmental variable. In some embodiments, interface 306 allows the sensor unit 105 to be connected to one or more external wired sensors (as depicted in FIG. 3) using a direct wired connection. In some embodiments, the sensor unit 105 communicates wirelessly with one or more external wireless sensors 309A-Z. In some embodiments, sensor unit 105 communicates with the external wireless sensors 309 using the radio receiver 304 and radio transmitter 305 that sensor unit uses to communicate with the gateway 102 (e.g., over the local wireless network). In other embodiments, the sensor unit 105 utilizes different sets of radio receiver and radio transmitters to communicate with the gateway an the external wireless sensors.

Each of the external sensors, including external wired sensors 308 and external wireless sensors 309, detects an environmental variable that is relevant to the quality of grain in a grain storage environment. As described above, exemplary environmental values include the following: temperature, humidity level, carbon dioxide concentration, oxygen concentration, phosphine concentration, ethylene concentration, sound levels, and movement. In some embodiments, each sensor unit 105 is connected to a plurality (e.g., 2, 3, 4, 5, 10, etc.) of external wired sensors 308A-Z and/or a plurality (e.g., 2, 3, 4, 5, 10, etc.) of external wireless sensors 309A-Z.

In some such embodiments, each of the plurality of external sensors is specific to a different environmental variable. For example, in one embodiment, a single sensor unit 105 comprises an external temperature sensor, an external humidity sensor, an external carbon dioxide sensor, an external oxygen sensor, an external phosphine sensor, an external ethylene sensor, an external sound/acoustic sensor, an external pressure sensor, and an external accelerometer. In another exemplary embodiment, a single sensor unit 105 comprises at least one of the following: an external temperature sensor, an external humidity sensor, an external carbon dioxide sensor, an external oxygen sensor, an external phosphine sensor, an external ethylene sensor, an external sound/acoustic sensor, an external pressure sensor, and an external accelerometer. In another exemplary, a single sensor unit 105 comprises at least one of an external temperature sensor and an external humidity sensor. In another embodiment, a single sensor unit 105 comprises at least one of an external temperature sensor and an external humidity sensor, as well as at least one of the following: an external carbon dioxide sensor, an external oxygen sensor, an external phosphine sensor, an external ethylene sensor, an external sound/acoustic sensor, an external pressure sensor, and an external accelerometer. In another embodiment, a single sensor unit 105 comprises both an external temperature sensor and an external humidity sensor. In another embodiment, a single sensor unit 105 comprises both an external temperature sensor and an external humidity sensor, as well as at least one of the following: an external carbon dioxide sensor, an external oxygen sensor, an external phosphine sensor, an external ethylene sensor, an external sound/acoustic sensor, and external pressure sensor, and an external accelerometer. In some embodiments, the external sensors communicate data to and from the sensor unit via a wireless network and/or through a direct wired connection to the sensor unit 105. In some embodiments, the external sensors communicate data to the sensor unit 105 through a wireless network. In other embodiments, the external sensors communicate data to the sensor unit 105 through a wired connection.

In some embodiments, the memory 302 of sensor unit 105 stores data collected by internal sensors 307, external wired sensors 308, and/or external wireless sensors 309. In some embodiments, the memory 302 stores this data until it is communicated to cloud computing system 101 (e.g., directly from the sensor unit 105 or via gateway 102). In some embodiments, the sensor unit 105 will locally store environmental data on memory 202 for later transmission if the communication link between sensor unit 105 and the local wireless network 110 is lost (e.g., if solar powered and due to snow or rain it shut down the radio for a few days) or the sensor unit 105 is in transport mode In some embodiments, data from the sensors and/or sensor units 105 may be buffered within the memory of the sensor unit 105 when a data connection is not available and the buffered data may be transmitted when the data connection becomes available to the gateway 102 or the cloud computing system 101. In some embodiments, the sensor unit 105 will automatically transfer to the gateway 102 and/or cloud computing system 101 to data locally stored on memory 302 once sensor 105 connects with local wireless network 110.

In some embodiments, such as those described with respect to FIG. 1B, the sensor units 105 connect directly to cloud computing system 101. In some embodiments, sensor units 105 connect directly to cloud computing system 101 over second network 150. Second network can utilize, for example, any network described with respect to the long-range network 120 used by gateway 102 (e.g., wired LAN, Wi-Fi, cellular, satellite, etc.). In some embodiments, sensor units 105 connect directly to other sensor units using first network 140. In some embodiments, sensor systems with direct communication between sensor units 105 and cloud computing system 101 do not utilize a gateway 102. In such embodiments, these sensor systems can utilize all of the methods and features described herein with respect to sensor systems that utilize a gateway 102.

(2) Wireless Junction Box

As described above, some sensor units incorporate local sensors by connecting the local sensor to a modular communication device, such as a wireless junction box ("WJB"). Such modular systems have the advantage of being able to utilize existing farm infrastructure, such as a local sensor (e.g., hanging thermocouple) that does not have the ability to wirelessly transmit data. Thus, the WJB provides a cost-effective way to incorporate existing sensors into a sensor system, such as the sensor system depicted in FIG. 1A.

Figure 4:
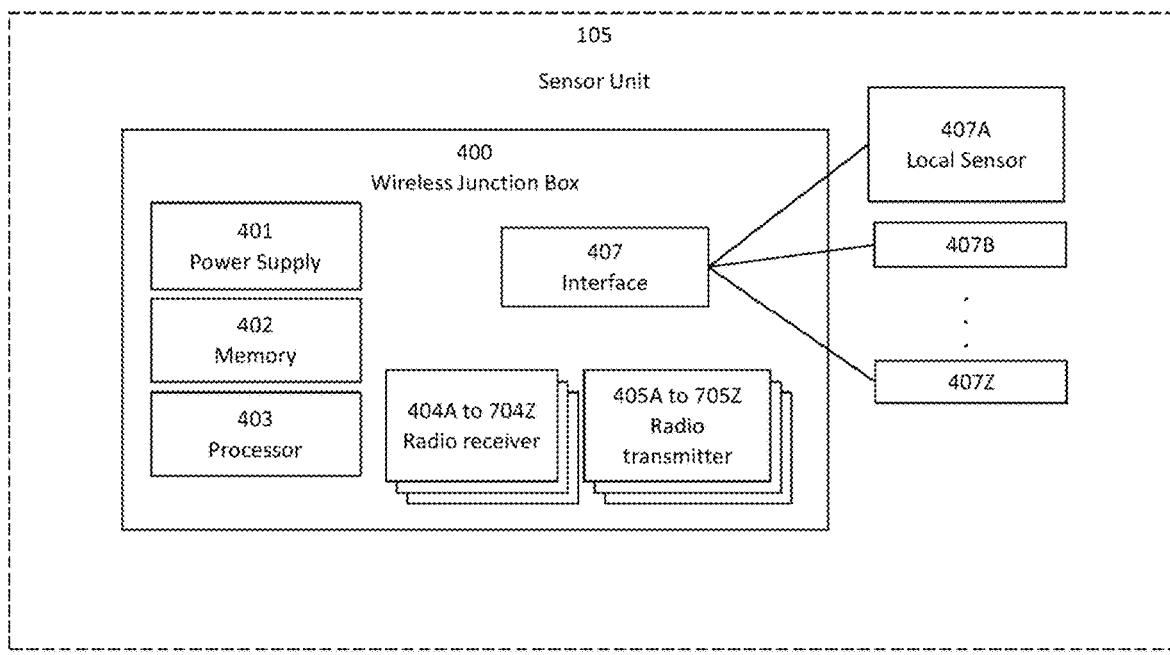
FIG. 4 shows the components and architecture of wireless junction box ("WJB") 400, which connects to a number of local sensors 407A to 407Z, thereby forming one embodiment of sensor unit 105. A processor 403 executes instructions in memory 402 as well as reads and writes data to and from memory 402. Data is collected from local sensors 407A to 407Z through a physical connection or a wireless network. This physical connection may be analog, digital, or other means of interconnect, such as optical. This may be through radio waves, for example using the protocol defined by ZigBee or other wireless protocols, or communication may be optical, electromagnetic, sonic, or any other means that do not require a physical connection. Radio receivers 404A to 404Z and Radio transmitters 405A to 405Z communicate with one or more gateways 102. In a preferred implementation a radio receiver and transmitter are included communicating with wireless sensors and a separate radio receiver and transmitter is included for communicating with the gateway 102. In another preferred implementation, the radio receiver and transmitter utilize a near field communication ("NFC") protocol to communicate with wireless sensors and/or gateway 102. Power is provided by power supply 401, which may get its power from, e.g., a battery, a DC power source or an AC power source such as an electrical outlet.

A schematic for an exemplary sensor unit comprising a WJB 400 and one or more local sensors 407A-Z is depicted in FIG. 4. In the embodiment depicted in FIG. 4, the WJB comprises power supply 401, memory 402, processor 403, radio receiver 404, radio transmitter 405, and interface 407. Power supply 401 delivers power to the sensor unit WJB 400, thereby enabling its function. The power supply 401 can be, for example, at least those power sources described above with respect to power supply 207. In some embodiments, memory 402 stores data locally on the WJB 400, including data collected by one or more local sensors 407. Processor 403 executes instructions in memory 402 and reads and writes data to and from memory 402. Data is received from, for example, the gateway 102 using radio receiver 404. Radio receiver 404 permits WJB 400 to receive data from, for example, the gateway 102 over, for example, local network 110 (as shown in FIG. 1A). Data are transmitted to, for example, gateway 102 using radio transmitter 405. In some embodiments, radio transmitter 405 permits WJB 400 to send data to, for example, the gateway using, for example, local network 110. In some embodiments, radio receiver 404 and radio transmitter 405 also permit the WJB 400 to send data to and receive data from, for example, the cloud computing system 101 over, for example, long range network 120, when long range network 120 comprises a cellular network. In some embodiments, radio receiver 404 and radio transmitter 405 also permit the WJB 400 to send data to and receive data from, for example, the cloud computing system 101 through gateway 102.

The WJB 400 is connected to a local sensor 407 (e.g., a thermocouple sensor), via the interface 407 such that the WJB 400 can collect data from the local sensor. In some embodiments, the WJB 400 is connected to one local sensor 407. In other embodiments, the WJB 400 is connected to more than one (e.g., 2, 3, 4, etc.) local sensors 407A-Z. The data collected by the WJB 400 from the local sensor 407 can then be sent to the gateway 102, for example, using the methods and systems described above. Thus, installation of a WJB 400 to a local sensor 407 effectively converts the local sensor 407 to a fully functioning sensor unit 105, represented in FIG. 4. by the dashed line around both the WJB 400 and the local sensor 407. As described above with respect to FIG. 1A, the gateway 102 can then communicate the data retrieved from the local sensor and sent by the WJB to the cloud computing system 101 using the long range network 120. Data received by the cloud computing system 101 are then processed as discussed throughout the present disclosure.

In one exemplary embodiment, local sensors 407 comprise existing temperature reader cards that connect to existing thermocouple cables using a wired connection. Several types of such thermocouples are known in the art and can be adapted to sensor systems such as sensor system 100 using, for example, WJB 400.

As described above, local sensors 407 can be any number of sensors that, unlike the sensor units 105 discussed in the present disclosure, cannot mesh into a wireless network. However, like the standalone sensor units 105, local sensors 407 detect an environmental variable and generate data corresponding to that environmental variable. As described above, exemplary environmental values include the following: temperature, humidity level, carbon dioxide concentration, oxygen concentration, phosphine concentration, ethylene concentration, and sound levels. In some such embodiments, a local sensor can detect a plurality of different environmental variables. For example, in one embodiment, a single sensor unit comprises a temperature sensor, a humidity sensor, a carbon dioxide sensor, an oxygen sensor, a phosphine sensor, an ethylene sensor, a sound/acoustic sensor, a pressure sensor, and an accelerometer. In another exemplary embodiment, a single sensor unit comprises at least one of the following: a temperature sensor, a humidity sensor, a carbon dioxide sensor, an oxygen sensor, a phosphine sensor, an ethylene sensor, a sound/acoustic sensor, a pressure sensor, and an accelerometer. In another exemplary, a single sensor unit comprises at least one of a temperature sensor and a humidity sensor. In another embodiment, a single sensor unit comprises at least one of a temperature sensor and a humidity sensor, as well as at least one of the following: a carbon dioxide sensor, an oxygen sensor, a phosphine sensor, an ethylene sensor, a sound/acoustic sensor, a pressure sensor, and an accelerometer. In another embodiment, a single sensor unit comprises both a temperature sensor and a humidity sensor. In another embodiment, a single sensor unit comprises both a temperature sensor and a humidity sensor, as well as at least one of the following: a carbon dioxide sensor, an oxygen sensor, a phosphine sensor, an ethylene sensor, a sound/acoustic sensor, a pressure sensor, and an accelerometer. A person having ordinary skill in the art will recognize that various combinations of different sensor types can be used and be within the scope of this patent document and the claims.

C. Repeaters

In some instances, the sensor system needs to cover a vast area of land (e.g., farms with different grain silos that are thousands of feet, if not miles, apart). A sensor unit 105 may be located too far from the gateway 102 for the sensor unit 105 to connect to the gateway 102 over the local wireless network 110. In such situations, it may be possible for a portable gateway 102 to be used, which, as described elsewhere in the present disclosure, can automatically connect to the sensor unit 105 and retrieve data when both the gateway 102 and the sensor unit 105 are within range of the local wireless network 110. However, it may also be advantageous for the sensor system to utilize repeaters, which effectively bridge the gap between sensor unit 105 and gateway 102, thereby allowing the two system components to communicate over the local wireless network 110 without the need to bring the gateway 102 within proximity to the sensor unit 102. Moreover, it is also advantageous to have additional network nodes within a mesh network to add resiliency and/or redundancy to the network, in the event that one or more network nodes fails. Repeater units can provide such functionality.

Figure 5A:
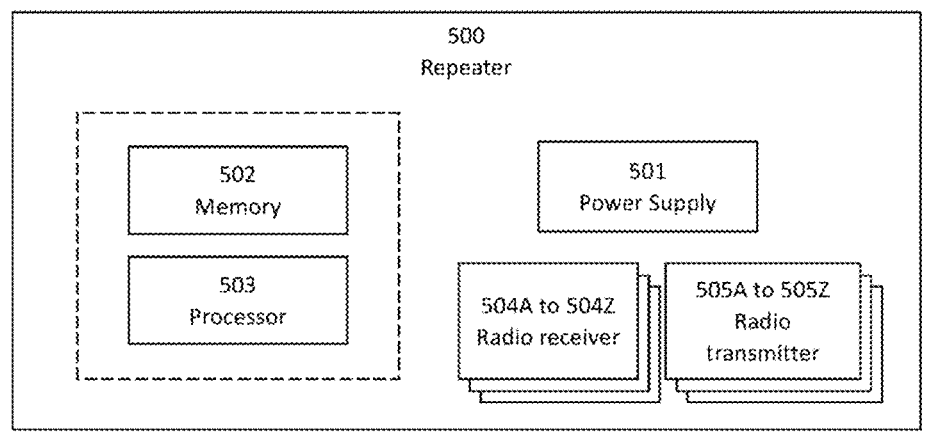
FIG. 5A shows the components and architecture of repeater unit 500, which can receive and transmit data over the local wireless network. In some embodiments, processor 503 executes instructions in memory 402 as well as reads and writes data to and from memory 502. Radio receivers 504A to 504Z and Radio transmitters 505A to 505Z communicate with one or more gateways 102. In some embodiments, a first radio receiver and transmitter are included to communicate with wireless sensors and a second radio receiver and transmitter are included for communicating with the gateway. Power is provided by power supply 501, which may get its power from a battery, a DC power source such as the 12V power available in a motor vehicle, or an AC power source such as an electrical outlet.

In some embodiments, the repeater 500, shown schematically in FIG. 5A, comprises power supply 501, radio receivers 504, and radio transmitter 505. Power supply 501 delivers power to the repeater 500, thereby enabling its function. The power supply 501 can be, for example, at least those power sources described above with respect to power supply 207. Data are received from, for example, the sensor unit 105 using radio receiver 504. Radio receiver 504 permits repeater 500 to receive data from, for example, sensor unit 105 over, for example, local wireless network 110 (as shown in FIG. 1A). Data are transmitted to, for example, gateway 102 using radio transmitter 505. In some embodiments, radio transmitter 505 permits repeater 500 to send data to, for example, the gateway using, for example, local wireless network 110. In some embodiments, radio receiver 504 and radio transmitter 505 also permit the repeater 500 to send data to and receive data from, for example, the cloud computing system 101 over, for example, long range network 120.

In some embodiments, the repeater 500 further comprises local memory 502 and processor 503. In some embodiments, memory 402 stores data locally on the WJB 400, including data collected by one or more local sensors 407. Processor 403 executes instructions in memory 402 and reads and writes data to and from memory 402. In some of such embodiments, the repeater 500 receives data from one or more sensor units 105 and stores the data on the local memory 502. In some embodiments, the repeater 500 will store data from one or more sensor units 105 if the gateway 102 is not in range of local wireless network of the repeater 500. In some embodiments, the repeater 500 will automatically send data saved to the local memory 502 to the gateway 102 when the gateway 102 is within range of the local wireless network of repeater 500.

Figure 5B:
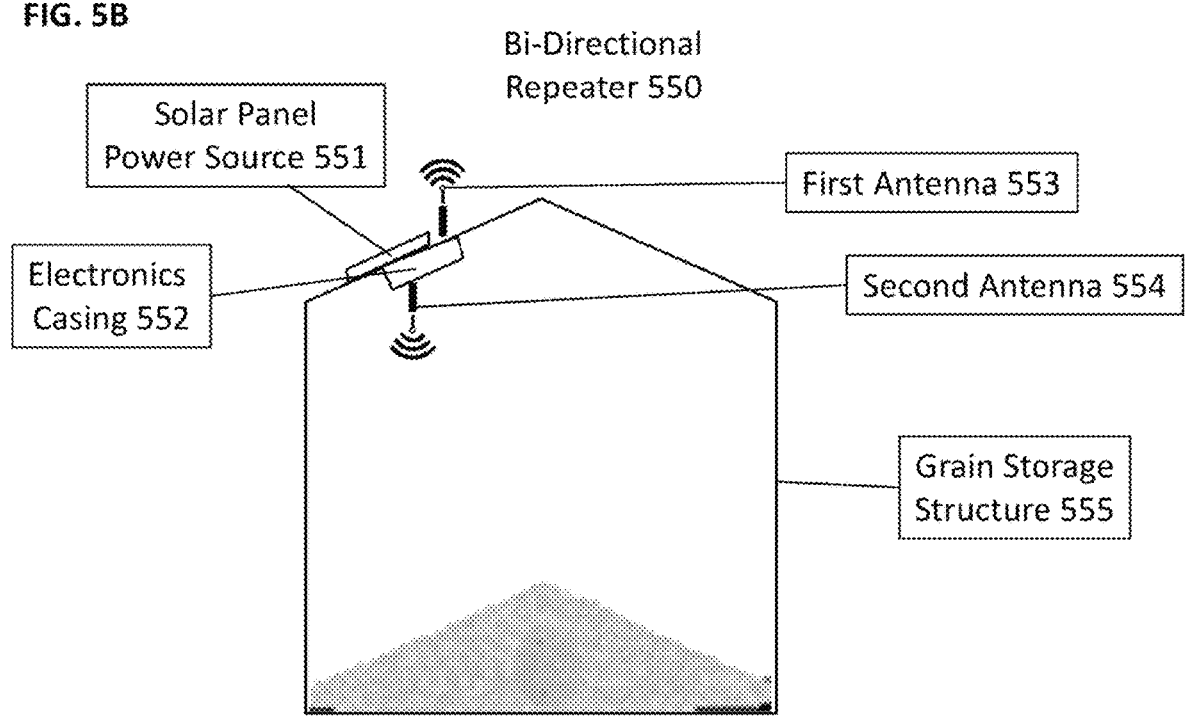
FIG. 5B depicts one embodiment of repeater unit 550, bi-directional repeater 550, which is mounted on the roof of grain storage structure 555. Bi-directional repeater comprises a solar panel power source 551, which delivers power to the electronics (described above with respect to FIG. 5A), located in electronics casing 552. First antenna 553, located on the external side of the grain storage structure 555 is used, for example, to communicate with a gateway 102 and/or cloud computing system 101. Second antenna 554, is located on the internal side of grain storage structure 555 and is used, for example, to communicate with sensor units 105 located within the grain storage structure 555.

FIG. 5B depicts one embodiment of repeater unit 550. Bi-directional repeater 550 is depicted in FIG. 5B mounted on the roof of grain storage structure 555. Bi-directional repeater 550 comprises to external antennas: first antenna 553 and second antenna 554. First antenna 553, located on the external side of the grain storage structure 555 is used, for example, to communicate with a gateway 102 and/or cloud computing system 101. Second antenna 554, is located on the internal side of grain storage structure 555 and is used, for example, to communicate with sensor units 105 located within the grain storage structure 555. The power source for the unit (depicted as power source 501 in FIG. 5A) comprises solar panel power source 551, which delivers power to the electronics located within electronics casing 552. In some embodiments, these electronics comprise processor 502, processor 503, radio receivers 504, and radio transmitter 505. In addition, in some embodiments, the bi-directional repeater 550 comprises a battery to store power generated by solar panel power source 551.

Sensor systems of the present disclosure, such as sensor system 100 can also include additional components that are not directly involved in collecting, transmitting, and processing environmental data. For example, in some embodiments, sensor system 100 can integrate one or more LiDAR sensors that are used to quantify grain stores. LiDAR sensors mounted in the interior of a grain storage environment (e.g., on the top of a grain silo) can measure the distance between the LiDAR sensor and the top of the bulk grain pile. In this way, the LiDAR sensor can collect data used to calculate the amount of grain remaining in storage containers. This data can be transmitted, for example, over local network 110 to gateway 102. Gateway 102 can transmit this data to cloud computing system 101 over, for example, second network 120. Transmission of this data can be accomplished using any of the methods discussed herein with respect to the transmission of environmental data. For example, in some embodiments, a WJB can be connected to a LiDAR detector thereby enabling wireless communication of the data over the local network 101. Thus, data relating amount of grain in each of a plurality of storage containers can be transmitted throughout the system and processed by cloud computing system 101. This information can be accessed via a user interface and/or transmitted to a user. In some embodiments, this output relating to the amount of grain in storage containers is displayed in conjunction with the display of environmental data, trends, and analysis discussed throughout the present disclosure.

D. Local Wireless Meshing Network

Figure 6:
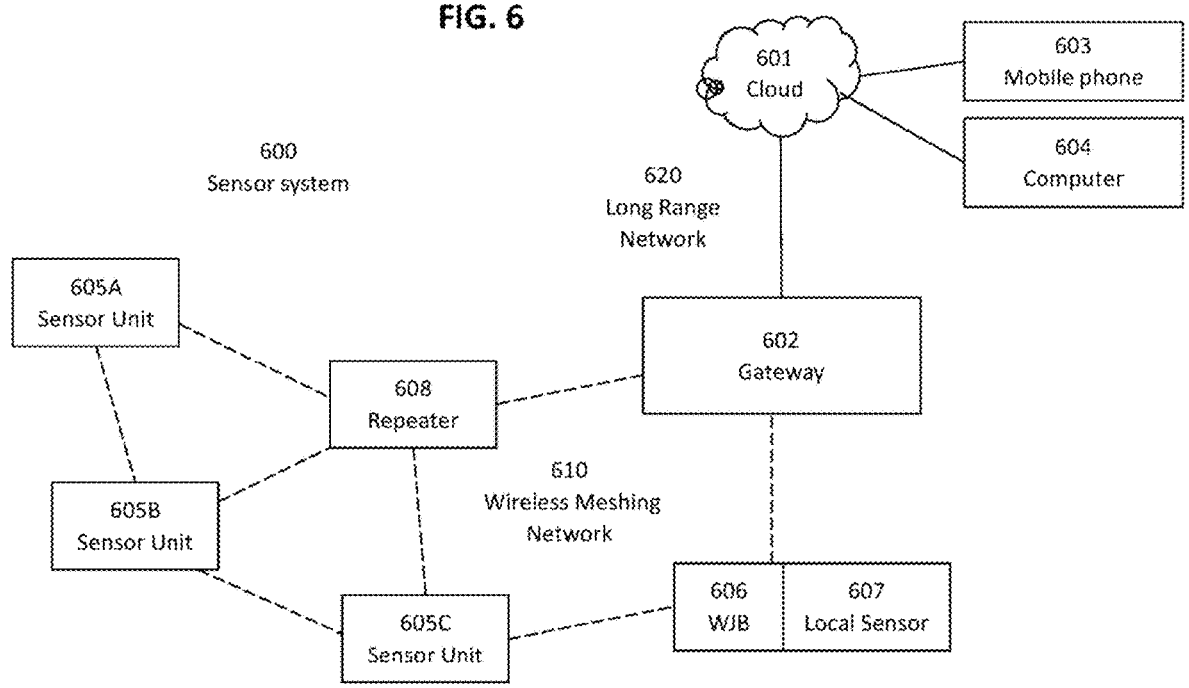
FIG. 6 depicts, as a block diagram, one embodiment of a meshing local sensor system 600 comprising gateway 102, three standalone sensor units 605A to 605C, repeater 608, and local sensor 607, which has been enabled for wireless communication by WJB 606. Each of these system components functions as a sensor node with respect to local wireless meshing network 610, allowing wireless communication between the components whenever they are within range of one another. In some embodiments, the sensor nodes communicate using the ZigBee protocol. Gateway 602 utilizes long range network 620 to communicate with cloud computing system 601, which, in turn, may be accessed through a user interface, such as mobile phone 603 and computer 604. In some embodiments, long range network 620 utilizes, for example, standard wireless and/or wired protocols, such as Wi-Fi and/or wired LAN.

In some embodiments, local network 110 is a wireless network and each component of the sensor system functions as a network node for a local meshing wireless network (with the exception of the cloud computing system). An exemplary embodiment of such a sensor system is depicted in FIG. 6. Sensor system 600 comprises three standalone sensor units 605A-C, gateway 602, repeater 608, and local sensor 607, which has been modified with WJB 606. Each of these components can communicate data to other components in the system via the local wireless meshing network 610 (depicted by dashed lines). For example, sensor unit 605A can communicate data directly with both the repeater 608 and sensor unit 605B. Although the gateway 602 is out of range for sensor unit 605A to communicate with directly, data can be sent from sensor unit 605A to repeater 608 and from repeater 608 to gateway 602. In contrast, WJB 606 can communicate directly with gateway 602 because the two components are within the range of the local wireless meshing network 610. Thus, either directly or indirectly, gateway 602 can communicate with all three standalone sensor units 505A-C as well as the modified local sensor 607/WJB 606 unit. As discussed above, gateway 602 can communicate with cloud computing system 601 over long range network 620. Cloud computing system 601 can, in turn, be accessed through user interfaces, such as, for example, mobile phone 603 and/or computer 604. In some embodiments, the user interface, such as the mobile phone, also serves as the gateway 602.

In some embodiments, the local wireless meshing network 610 can still function to deliver information to the gateway 602 even when one of the network nodes is not operational. For example, if repeater 608 from FIG. 6 became temporarily inoperable, each component of sensor system 600 would still be able to communicate with gateway 602. In such embodiments, sensor unit 605A could communicate data to sensor unit 605B, which could then, in turn, send that data to sensor unit 605C. Sensor unit 605C can send the data to WJB 606, which is in range to forward the data to gateway 602. Data flow is similarly enabled in the opposite direction (e.g., from gateway 602, through WJB 606, sensor units 605C and 605B, to sensor unit 605A. Many variations on this feature are envisioned.

In some embodiments, the gateway 602 is a mobile device (e.g., a tablet computer or a mobile phone). Thus, in such embodiments, there may be time periods where the gateway 602 is outside of the range of the local wireless meshing network 610. In some embodiments, the network nodes (e.g., sensor units, repeaters, etc.) exchange data with each other and one or more of said network nodes stores that data to local memory. When the gateway 602 is within range of the local wireless meshing network 610, that locally stored data is communicated through the local wireless meshing network 610 to the gateway 602. At this stage, it is important to note that the gateway 602 might reenter the range of the local wireless meshing network 610 at any point. For example, with reference to FIG. 6, the gateway 602 might come within range of sensor unit 605A, but be out of range of all other components of the sensor system 600. In that case, data from one or all sensors will be communicated through the local wireless meshing network 610 to sensor unit 605A, which can then communicate the data to gateway 602. Data can, of course, be sent in the other direction as well (e.g., from gateway 602 to sensor unit 605A, and then from sensor unit 605A to any or all of the sensor system components via local wireless meshing network 610). Additional features of these meshing sensor systems are discussed elsewhere in the present disclosure (above and below).

In some embodiments, the sensor units 605 communicate with each other using local wireless meshing first network 610. In some embodiments, local wireless meshing network 610 is a local meshing wireless network 610 that operates in a defined frequency range. In some embodiments, the frequency range is between 400 MHz and 2.5 GHz. In some embodiments, the frequency range is between 400 MHz and 2.0 GHz. In some embodiments, the frequency range is between 500 MHz and 1.0 GHz. In some embodiments, the frequency range is between 950 MHz and 850 MHz. In some embodiments, the sensor units 105 communicate over a local meshing wireless network 610 that operates at one or more communication frequency. In some embodiments, the one or more communication frequency of local meshing wireless network 610 includes, for example, at least one of the following: 2.4 GHz, 915 MHz, 900 MHz, 868 MHz, and/or 433 MHz. In some embodiments, the one or more communication frequency of local meshing wireless network 610 is, for example, 2.4 GHz, 915 MHz, 900 MHz, 868 MHz, or 433 MHz. In some embodiments, the communication frequency of local meshing wireless network 610 is 2.4 GHz. In some embodiments, the communication frequency of local meshing wireless network 610 is 915 MHz. In some embodiments, the communication frequency of local meshing wireless network 610 is 900 MHz. In some embodiments, the communication frequency of local meshing wireless network 610 is 868 MHz. In some embodiments, the communication frequency of local meshing wireless network 610 is 433 MHz. In some embodiments, the local meshing wireless network 610 utilizes a ZigBee protocol. In some embodiments, the local meshing wireless network 610 utilizes at least one of the following wireless protocols: Z-Wave, Thread, Bluetooth mesh, and/or Wi-Fi mesh.

II. Fully Encapsulated Sensor Pods

Figure 7A:
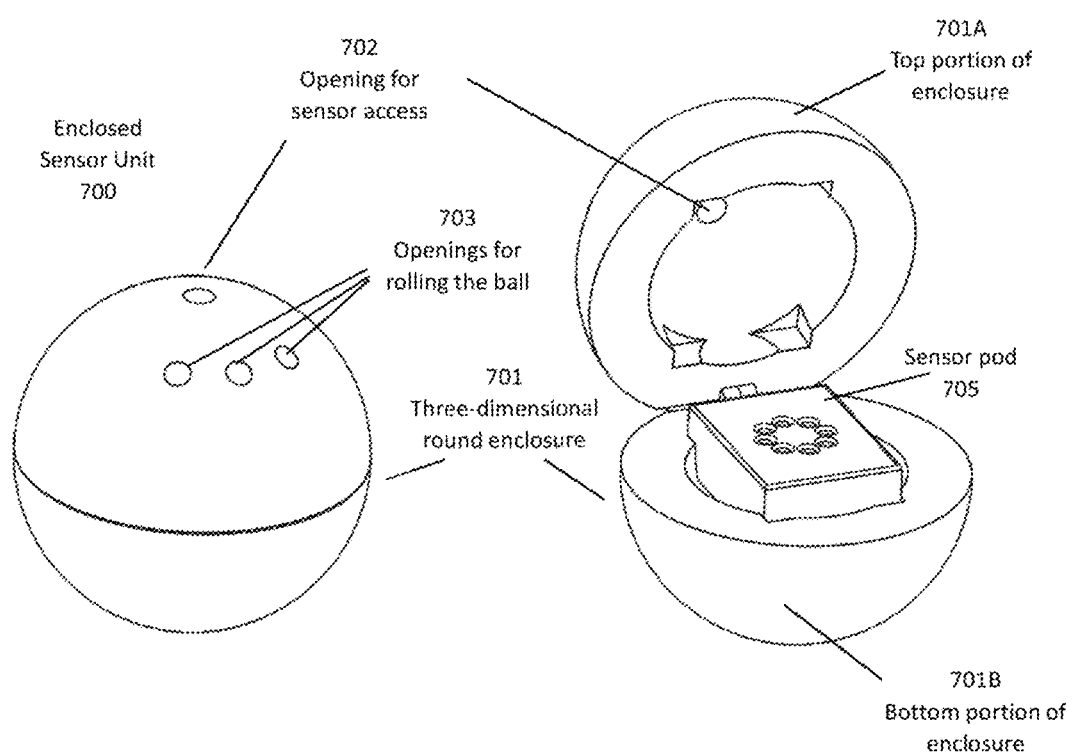
FIG. 7A shows an embodiment 700 of the sensor unit 105 in which a sensor pod 705 is enclosed in a ball-shaped three-dimensional round enclosure 701. In some embodiments this case includes openings for gasses to pass through 702. In some embodiments, openings 703 are carved within the ball to allow a person to hold the ball, e.g., arranged similarly to the openings found on a bowling ball. This arrangement of openings makes the ball easier to roll in tunnels and flat surfaces, making its design unique.

In some embodiments, the standalone sensor unit 105 is constructed as a sensor pod 705, which is entirely contained in a three-dimensional round enclosure 701. In some embodiments, three-dimensional round enclosure 701 has at least one cross section that is circular or semi-circular (e.g., a three-dimensional ellipsoid or spherical shape). Sensor pod 705, which represents one set of embodiments of sensor unit 105, can comprise all of the components of sensor unit 105 and possess all the functionality previously described with respect to sensor unit 105. FIG. 7A depicts an exemplary embodiments of a sensor pod 705 enclosed in three-dimensional round enclosure 701. Two views of the sensor pod apparatus are shown in FIG. 7A. The right side of FIG. 7A depicts the sensor apparatus with the three-dimensional round enclosure 701 open to show that sensor pod 705 is located within three-dimensional round enclosure 701. As discussed, sensor pod 705 can be, for example, any of the sensor units described above, including those described in general terms with respect to FIG. 3. The left side of FIG. 7A depicts the sensor apparatus with the three-dimensional round enclosure 701 such that the each portion of three-dimensional round enclosure 701 are joined together such that it is shaped as a ball. In this embodiment, the two portions of round enclosure 701 are joined together by a hinge, but many other embodiments (e.g., those joined by fasteners, screws, bolts, integral molding, etc.) are within the scope of the present enclosure and would be apparent to one skilled in the art. In some embodiments not depicted, the three-dimensional round enclosure 701 comprises only a single piece into which sensor pod 705 can be inserted. In such embodiments, the three-dimensional round enclosure can be, for example, plastically deformable to allow insertion of the sensor pod 705. As shown in FIG. 7A (right) the sensor pod 105 is entirely contained within the three-dimensional round enclosure 701. In the exemplary embodiment shown in FIG. 7A, the three-dimensional round enclosure 701 is spherical or nearly spherical in shape. In other embodiments, such as that described below, with respect to FIG. 7B, the three-dimensional round enclosure is elongated.

Figure 7B:
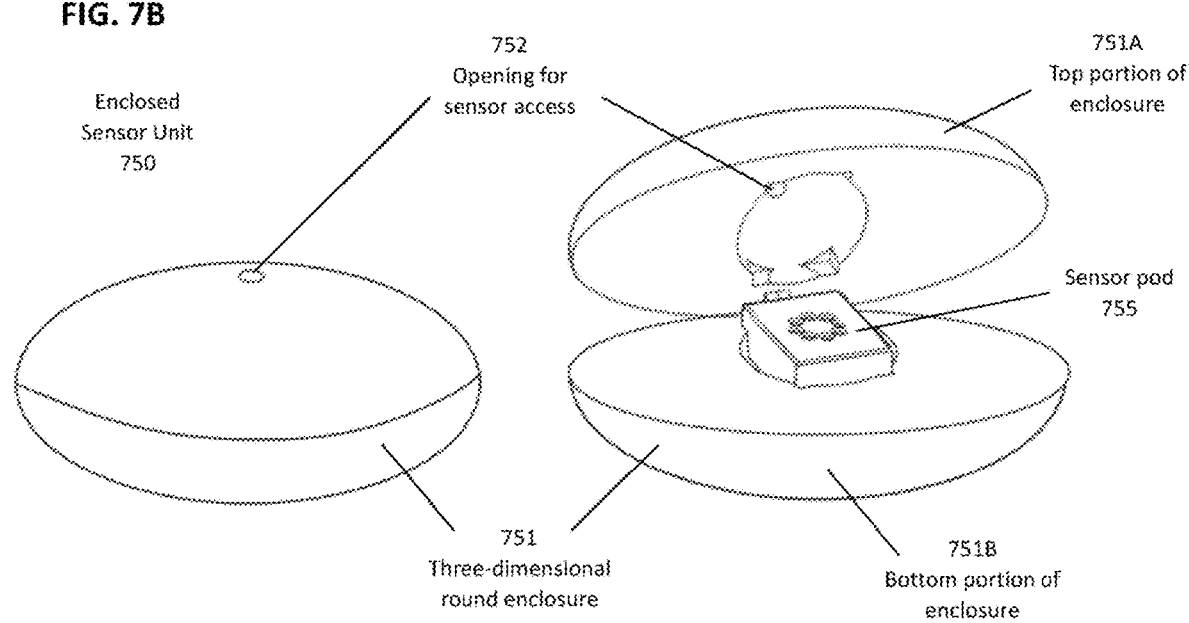
FIG. 7B shows an embodiment 750 of the sensor unit 105 in which a sensor pod 755 is enclosed in an elongated three-dimensional round enclosure 751. Like the enclosed sensor unit 700, elongated enclosed sensor unit 750 comprises an opening 752 so that the gasses from the storage environment can pass through and interact with the sensors in sensor pod 755.

In some embodiments, the sensor unit 105 is enclosed in a three-dimensional round enclosure that is elongated and/or oblong. In some embodiments, such as the embodiment depicted in FIG. 7B, enclosed sensor unit 750 comprises three-dimensional round enclosure 751. Three-dimensional round enclosure 751 comprises at least one ellipsoid cross section. Three-dimensional round enclosure 751 also comprises at least one circular cross section. Sensor pod 755, like sensor pod 705, represents one set of embodiments of sensor unit 105, and can comprise all of the components of sensor unit 105 and possess all the functionality previously described with respect to sensor unit 105. FIG. 7B depicts an exemplary embodiment of a sensor pod 755 enclosed in elongated three-dimensional round enclosure 751. Two views of the sensor pod apparatus are shown in FIG. 7B. The right side of FIG. 7B depicts the sensor apparatus with the three-dimensional round enclosure 751 open to show that sensor pod 755 is located within three-dimensional round enclosure 751. As discussed, sensor pod 755 can be, for example, any of the sensor units described above, including those described in general terms with respect to FIG. 3. The left side of FIG. 7B depicts the sensor apparatus with the three-dimensional round enclosure 751 such that the each portion of three-dimensional round enclosure 751 are joined together. In this embodiment, the two portions of three-dimensional round enclosure 751 are joined together by a hinge, but many other embodiments (e.g., those joined by fasteners, screws, bolts, integral molding, etc.) are within the scope of the present enclosure and would be apparent to one skilled in the art. In some embodiments not depicted, the three-dimensional round enclosure 751 comprises only a single piece into which sensor pod 755 can be inserted. In such embodiments, the three-dimensional round enclosure can be, for example, plastically deformable to allow insertion of the sensor pod 755. As shown in FIG. 7B (right) the sensor pod 105 is entirely contained within the three-dimensional round enclosure 751.

Embodiments having an elongated enclosure, such as enclosed sensor unit 750, can have all the features and components discussed in the present disclosure, including those described with respect to, for example, sensor unit 105, sensor unit 605, and enclosed sensor unit 700, as well as enclosed sensor units 800, 850, and 880. Each of the various embodiments of the enclosed sensor unit 700 and 750 described below can be used in connection with any of the various sensor systems described throughout the present disclosure. For ease of explanation, many of the following features are described with reference to enclosed sensor unit 700, but such features are equally applicable to sensor units in elongated three-dimensional round enclosures, such as enclosed sensor unit 750.

In some embodiments, three-dimensional round enclosure 701 comprises a permeable or semi-permeable area, which allows for the passage of gasses into the three-dimensional round enclosure 701. In this way, the gasses from the grain storage environment can interact with the internal sensors on the sensor pod 705, thereby allowing the sensors to detect environmental variables from the grain storage environment. For example, in an exemplary embodiment where the sensor pod 705 comprises an internal temperature sensor and an internal humidity sensor, the atmosphere from the grain storage condition can permeate the permeable area of the three-dimensional round enclosure 701. The temperature and humidity sensors can then interact with the atmospheric gas of the storage environment, thereby detecting the temperature and humidity level of the storage environment. In some embodiments, such as the enclosed sensor unit 700 depicted in FIG. 7A, the permeable area in the three-dimensional round enclosure 701 define at least one opening 702 that allows gasses to permeate the three-dimensional round enclosure 701.

Placement of the entire sensor unit 105 into such a three-dimensional round enclosure 701 offers several advantages heretofore unrealized in the prior art. For example, round enclosures such as three-dimensional round enclosure 701, by the virtue of their shape, are intrinsically resistant to damage from blunt force. Thus, sensor units 705 encapsulated in such three-dimensional round structures will be inherently more durable than sensor units having other shapes. This enhanced durability is particularly important in the field of grain storage due to, in some instances, prolonged exposure to the elements. Moreover, during deployment of the sensor pod, it might have to be dropped from significant heights, thereby risking damage to the sensor unit 705. Similarly, during emptying of the grain silos, the enclosed sensor unit 700 might be subject to significant force. Thus, the enhanced durability afforded by the three-dimensional round enclosure 702 represents a significant improvement over any prior art sensor devices for use in grain storage.

In addition to enhanced stability, the three-dimensional round enclosure 701 offers the advantage of easy deployment. In some embodiments, the three-dimensional round enclosure 701 is spherical and approximately the size of a softball. Such embodiments can easily be handled and tossed or thrown into place by a user (e.g., into a desired area within a grain silo). Such embodiments will also roll with ease, and the user can utilize this unique feature to place the sensor pod in an area that might otherwise be difficult to access, simply by rolling the sensor pod along the ground. In some embodiments, including the enclosed sensor unit 700 depicted in FIG. 7A (and, as discussed, enclosed sensor unit 750 depicted in FIG. 7B), the three-dimensional round enclosure further has a surface defining openings that aid the user in handling and rolling the sensor pod because such users can insert their fingers into such openings, thereby allowing for increased force and accuracy in positioning. In some embodiments, the user can utilize, for example, an external rod to better position the sensor pod. In some embodiments, the surface defines a plurality of openings that are independent of the opening used to facilitate interaction of the internal sensors with the grain storage environment. For example, in the embodiment depicted in FIG. 7A, the surface of the sensor defines three openings 703 for rolling the sensor pod, and the openings are arranged in a triangle. In some embodiments, the surface of the sensor ball is arranged such that at least some of these openings will be arranged in a manner that resembles a bowling ball. Such a configuration may be more familiar to the user and will allow greater control when placing the enclosed sensor unit 700.

The size of the three-dimensional round enclosure 701 (and thereby the size of enclosed sensor unit 700) also facilitates handling and deployment of enclosed sensor unit 700. In some embodiments, enclosed sensor unit 700 has an external diameter between 3 inches and 36 inches. In some embodiments, enclosed sensor unit 700 has an external diameter between 3 inches and 24 inches. In some embodiments, enclosed sensor unit 700 has an external diameter from 3 inches to 12 inches. In some embodiments, enclosed sensor unit 700 has an external diameter from 4 inches to 10 inches. In some embodiments, enclosed sensor unit 700 has an external diameter from 4 inches to 8 inches. In some embodiments, enclosed sensor unit 700 has an external diameter of 6 inches.

The dimensions are slightly different for embodiments of the enclosed sensor unit that are enclosed in an elongated case, such as enclosed sensor unit 750 depicted in FIG. 7B. In some embodiments, enclosed sensor unit 750 has a circular or semi-circular cross section having an external diameter between 3 inches and 36 inches and an external length (defined perpendicular to the first cross section) between 3 inches and 48 inches. In some embodiments, enclosed sensor unit 750 has a circular or semi-circular cross section having an external diameter between 3 inches and 24 inches and an external length between 3 inches and 36 inches. In some embodiments, enclosed sensor unit 750 has a circular or semi-circular cross section having an external diameter from 3 inches to 12 inches and an external length between 3 and 24 inches. In some embodiments, enclosed sensor unit 750 has circular or semi-circular cross section having an external diameter from 4 inches to 10 inches and an external length between 6 and 16 inches. In some embodiments, enclosed sensor unit 750 has circular or semi-circular cross section having an external diameter from 4 inches to 8 inches and an external length between 6 inches and 12 inches. In some embodiments, enclosed sensor unit 750 has a circular or semi-circular external diameter of 6 inches. In some embodiments, enclosed sensor unit 750 has a circular or semi-circular external diameter of 6 inches and a length between 8 and 12 inches.

The round shape of the three-dimensional round enclosure 701 also aids in retrieval of the sensor pods following deployment. For example, some grain silos are emptied using a vacuum system. Generally, a vacuum is applied to a portion of the grain, thereby pulling the grain out of the grain silo so it can be weighed and shipped. Application of the existing vacuum system to the grain silo can also create a negative pressure that will act on the sensor pod. Because of the shape of the three-dimensional round enclosure 701, the sensor pod will roll under the force of the negative pressure, thereby pulling the ball out of the grain storage environment (e.g., grain silo). In some embodiments, the dimensions of the sensor pod aid in retrieval because the diameter of the circular cross section (e.g., of enclosed sensor pod 700 and/or 750) is larger than the spacing between loadout grates, causing the sensor unit to remain in the storage container after unloading of the grain. In this way, the shape of the three-dimensional round enclosure 701 facilitates retrieval of the sensor pod.

In some embodiments, the enclosed sensor unit 700 further comprises structures for remote retrieval. Such structures may include one or more of the following. In some embodiments, an attached string or cord is connected to the three-dimensional round enclosure 701, so that the enclosed sensor unit 700 can be manually retrieved. In one such embodiment, the three-dimensional round enclosure 701 comprises a hook or a ring (as depicted, for example, as hooks 809 in FIG. 8A) to which the cord or string is reversibly attached. In other embodiments, the enclosed sensor unit 700 comprises enclosed motors that roll the enclosed sensor unit 700 using an off-center weight (e.g., a propulsion system using a weight mounted inside the ball on a gimbal, such that when the gimbal is rotated the heaviest part of the ball moves to different areas on the ball, causing rotation of the ball). In one such embodiment, the steering direction may be implemented using a gyroscope and controlled remotely. In other embodiments, internal fans may be used to roll the enclosed sensor unit 700 in the desired directions. In some embodiments, the delivery and/or retrieval of the enclosed sensor unit 700 is achieved using drones. In such embodiments, the three-dimensional round enclosure 701 may further comprise further modification (e.g., one or more handles, divots, openings, grooves, etc.) to facilitate the handling of the enclosed sensor unit 700 by the drone during delivery and/or retrieval. In other embodiments, delivery and/or retrieval is achieved because the enclosed sensor unit 700 itself is capable of flight (e.g., the enclosed sensor unit has fans built in such that it is a drone itself). In yet other embodiments, delivery and/or retrieval of the enclosed sensor unit 700 is achieved through magnetism. For example, retrieval can be achieved using electromagnets that are energized and de-energized in sequence such that the ball rolls itself along a metal surface.

In some embodiments, the enclosed sensor unit 700 may include one or more positioning sensors to determine position of the sensor unit 700, (e.g., GPS). In some embodiments, position may be determined through triangulation, (e.g., by measuring angle to strongest signal for three or more wireless nodes that are in known locations).

In some embodiments the enclosed sensor units 700 may move themselves to provide even coverage of the space. In some such embodiments, a set of rules for desirable placement is created. For example, in some embodiments, a rule is created so that each enclosed sensor unit 700 must be no further than 10 meters from its nearest sensor unit. In this embodiment, the enclosed sensor units 700 may use their data communication capability to transmit their position to a central device, such as a gateway. The central device may use a planner (e.g. a recursive decent planner) to determine an efficient plan for moving the balls so they satisfy the rules for desirable placement as closely as possible. The central device may then transmit to each enclosed sensor unit 700 instructions as to where each enclosed sensor unit 700 should move and/or what route each enclosed sensor unit 700 should take to achieve the best placement. For embodiments in which the enclosed sensor unit 700 is not configured to move itself, coordinated movement of the enclosed sensor unit 700 can also be achieved, for example, using drones, as described above.

In some embodiments, a camera may be included on an enclosed sensor unit 700. In some embodiments the camera is used to transmit continuous (e.g. low resolution images of the surrounding area) or periodic images of the area. In some embodiments, the camera is used to transmit thermal images. These images are used to determine local conditions remotely, such as development of a pest colony or visual observation of wheat kernels to determine their condition. In some embodiments, the enclosed sensor unit 700 comprises hyper spectral imaging sensors that can detect the presence of specific chemicals (e.g., phosphine gas, methane, etc.).

One exemplary embodiment is depicted in FIG. 8A in exploded view. In this embodiment, the three-dimensional round enclosure 801 comprises a top part 801A and a bottom part 801B. In this embodiment, the top portion part of the enclosure 801A defines a plurality of small openings 810, which comprises permeable area 802. Sensors 807 are located directly under the top part of enclosure 801A. The three dimensional round enclosure further comprises two hooks 809, located on the bottom part of the enclosure 801B, which can be used for hanging, deploying, and retrieving enclosed sensor unit 800. In this way, sensors 807 can interact with the grain storage environment, thereby detecting data corresponding to relevant environmental variables. In the example depicted in FIG. 8A, three sensors (807A-C) are installed on the sensor board 804 of enclosed sensor unit 800. In some embodiments, these sensors 807 are modular and can be removed and/or replaced without damaging other portions of the enclosed sensor unit 800. In this embodiment, an on/off switch 806 is also located on the sensor board 804. In some embodiments, on/off switch 806 can be manipulated via button 808 on the top part of the enclosure 801A (button 808 is visible in the schematic in FIG. 8A). In the exemplary embodiment depicted in FIG. 8A, power source 805 and antenna 803 are located underneath the sensor board 804. In some embodiments, these components are also modular and can be removed and/or replaced without damaging other portions of enclosed sensor unit 800. In some embodiments, internal components (e.g., power source, memory, antenna, etc.) are sealed such that corrosive gasses cannot come into contact with these components.

Another exemplary embodiment is depicted in FIG. 8B in exploded view. Enclosed sensor unit 850 has many of the components described above, with respect to enclosed sensor unit 800, depicted in FIG. 8B. Such components include Sensors 857A-C, sensor board 854, power source 855, and antenna 853. In some embodiments, each of these components can be modular and replaceable, as described above. All of these components are fully enclosed in three dimensional round enclosure 851, which is comprised of the top part of the enclosure 851A and bottom part of the enclosure 851B. Many variations and designs for enclosed sensor units 700 are within the scope of the present disclosure, including, for example, those with elongated three-dimensional round enclosures (i.e., embodiments having a three-dimensional round enclosure having at least one cross section that is ellipsoid).

Figure 8C:
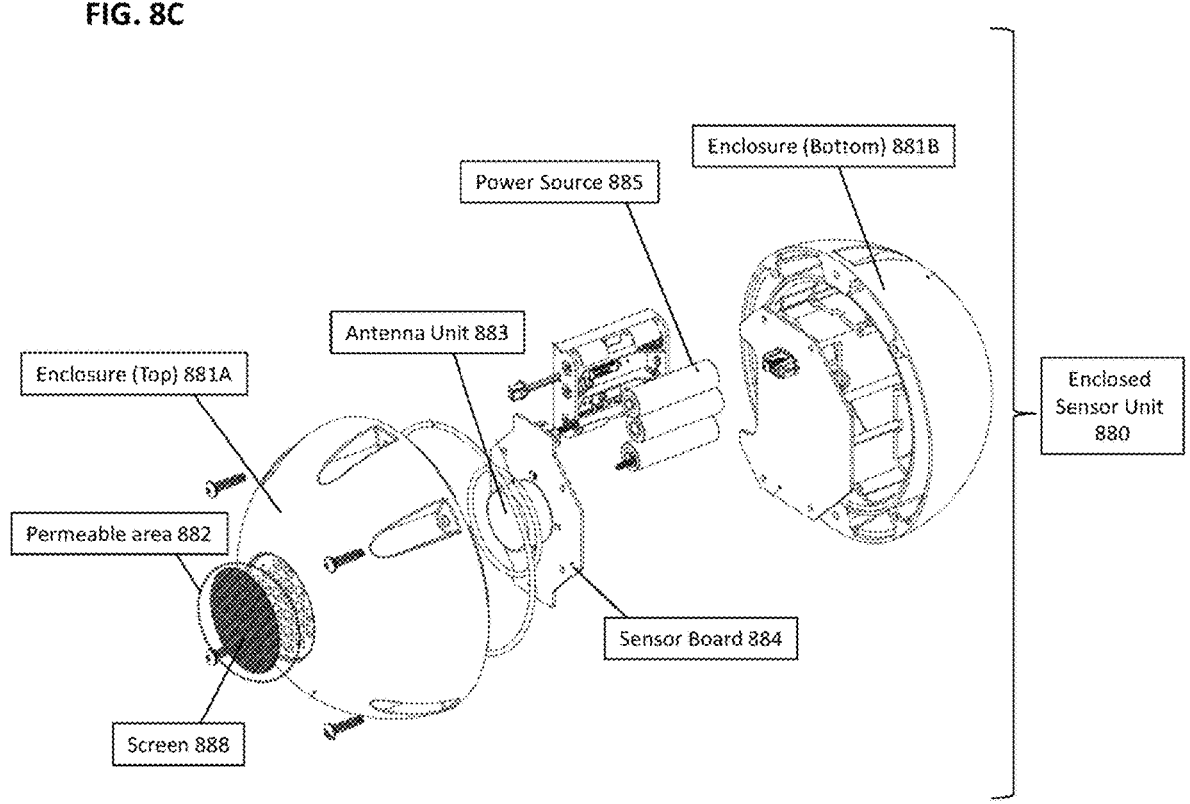
FIG. 8C depicts the details of another specific embodiment 880 of the enclosed sensor unit 700, enclosed sensor unit 880, in exploded view. In addition to the components found in other embodiments (e.g., FIGS. 8A and 8B), this embodiment 880 comprises additional features, such as modular sensor board 884 that is connected to power source 885. All of these components are fully encapsulated in a three dimensional round enclosure 881. Permeable area 882 comprises a screen that is permeable to gas.

Another exemplary embodiment is depicted in FIG. 8C. Like previously described embodiments, enclosed sensor unit 880 comprises a three-dimensional round enclosure 881 that is made up of a top part 881A and a bottom part 881B. The top part of the enclosure 881A comprises permeable area 882. In embodiment 880, permeable area 882 comprises a screen 888 that has small enough openings to prevent grain and other particulate matter to enter the enclosure 881 and allow gas to enter the enclosure 881, thereby interacting with the internal sensor units. Screen 888 is modular and can be easily replaced so that screens can be implemented having ideal hole sizes that maximize airflow into the enclosure 881 for each particular grain type. Sensor board 884 is also designed to be modular and easily replaceable, such that a user can swap out the sensor board to incorporate different combinations of sensors (e.g., temperature sensor, humidity sensor, phosphine sensor, etc.) into enclosed sensor unit 880. Enclosed sensor unit 880 is designed such that the sensors are exposed to the environment, but other electronics are sealed in an inner chamber that is not exposed to the environment. In this way, enclosed sensor unit 880 is designed to extend the lifetime of the most high-value electronics. Enclosed sensor unit 880 also comprises antenna unit 883. Antenna unit 883 comprises two circular coaxial antennas, each oriented at a 90° angle from each other. In some embodiments, the enclosed sensor unit 880 will turn on the first coaxial antenna and test the signal quality. The enclosed sensor unit 880 will then turn on the second coaxial antenna and test the signal quality. Next, the enclosed sensor unit 880 will compare the two signals and use the coaxial antenna that delivers the best signal quality. Although the preceding exemplary embodiment utilize spherical or nearly spherical enclosures, each of the features described with respect to enclosed sensor units 800, 850, and 880 can be similarly implemented with enclosed sensor units that comprise an elongated enclosure, such as that described in FIG. 7B.

Although the preceding discussion highlights the use of enclosed sensor systems in the application of monitoring grain storage, these modular sensor apparatuses are equally applicable to the monitoring of other items in storage (e.g., fruits and vegetables). This can be accomplished simply by configuring the sensors on the sensor panel to detect environmental conditions relevant to the desired application (e.g., the use of ethylene, temperature, and/or humidity in the monitoring of stored fruit and/or vegetables).

III. Advanced Functionality of Sensors and Sensor Systems

In some embodiments, the sensor units 105, including enclosed sensor units 700, possess additional functionality to that which has been heretofore described. Throughout the present disclosure, references made to features and functionality of sensor units 105 include those embodiments in which the sensor unit 105 is enclosed in a three-dimensional round enclosure, such as, for example, enclosed sensor unit 700.

A. Power Saving Features

Some embodiments of sensor units 105 use a battery as a power source. As in any battery system, it is desirable for battery life to be as long as possible. Therefore, in some embodiments, sensor units 105 have features and programs in place to effectuate power savings, thereby increasing the battery life of the unit.

A common strategy for power savings is to have electronics go to sleep, e.g., enter a low-power consumption state. In a sleep mode unused or unnecessary electronic circuits can be powered down, with only a small portion of the electronics remaining powered up so that the small portion can wake up the remaining electronics.

In some embodiments, sensor unit 105 can transition into and out of a sleep mode. In many embodiments of sensor units 105, the most power-hungry component is the radio transmitter 305. Accordingly, in some embodiments, when sensor unit 105 is in sleep mode, no power is delivered to the radio transmitter 305. In some embodiments, when sensor unit 105 is in sleep mode, no power is delivered to at least one of the following: radio transmitter 305, radio receiver 304, internal sensors 307, interface 306, and external wired sensors 308. In some embodiments, when sensor unit 105 is in sleep mode, no power is delivered to the radio transmitter 305, and at least one of the following: radio receiver 304, internal sensors 307, interface 306, and external wired sensors 308. In those embodiments where no power is delivered to radio transmitter 305 while the sensor unit 105 is in sleep mode, no data can be transmitted from the sensor unit 105 until the sensor unit 105 transitions out of sleep mode (thereby delivering power once again to radio transmitter 305). Therefore, the transition into and out of sleep mode can be controlled in a variety of manners, each of which can be used either alone or in combination with the others.

In some embodiments, the sensor unit 105 transitions into and out of sleep mode based on an internal timing system. In some embodiments, the schedule can be set by the user (using, for example, a user interface application, such as a native or web-based application). In some embodiments, the schedule will be preconfigured. In some embodiments, the sensor unit 105 will transition out of sleep mode when the sensor unit is moved. In such embodiments, the accelerometer will initiate the waking protocol when it detects movement beyond a predetermined threshold. In some embodiments, the sensor unit 105 will transition into sleep mode when it is unable to connect to the local network (e.g., wirelessly through connection to gateway 102 or repeater) for a predetermined period of time. In some embodiments, the sensor unit will repeatedly attempt to connect to the local network (e.g., once every minute) for a predetermined period of time (e.g., 30 minutes) before transitioning into sleep mode. Other protocols for transitions into and out of sleep mode are described below.

As discussed above, in some embodiments, data values may be tracked and stored in the sensor unit 105 (i.e., stored on local memory 302). In some embodiments, the sensor unit 105 can compare the latest data set to one or more prior data sets. If the latest data set has not changed meaningfully from the one or more prior data sets, then to save power a special short message that indicates that "nothing has changed" may be sent instead of the latest data set. Because the power needed by a transmitter is directly proportional to length of power transmission (which in turn is directly proportional to the length of message sent), the shorter message sent in lieu of the latest data set will require less power to send. While this process consumes more power than not sending data at all, it allows the receiver to know that the sensor unit 105 is still functional and active. However, in other embodiments, the sensor unit 105 will not send anything at all if the latest data set is not meaningfully different than one or more prior data sets.

In other embodiments, if all data values since the last transmission are within a desired range, data is sent in a batch mode on an infrequent basis to save power. However, if any data value since the last transmission is out of range, the data may be sent either immediately or more frequently. For example, suppose a sensor previously detected a carbon dioxide level of 405 parts per million (ppm) and transmitted that data value to the gateway 102. The range for the sensor unit 105 was set at ±10 ppm. If the next measurement was within that range (e.g., 408 ppm), then the sensor 105 unit would locally store the data and would not transmit the data to the gateway 102. In some embodiments, as long as each new data set was within the range (e.g. 395-415 ppm), this local storage would continue for a predetermined number of cycles (e.g., 2, 3, 4, 5, 6, etc. measurements). Only after the completion of the predetermined number of cycles would the locally stored data set be sent from sensor unit 105 to gateway 102. In some embodiments, each of the stored data sets would be sent. In other embodiments, an average (e.g., mean, median, etc.) value would be sent instead of the entirety of the locally stored data. However, if, for example, the next data value detected was out of range (e.g., 447 ppm), then that data would be sent before the predetermined number of cycles. For example, in one embodiment, the out-of-range data would be sent immediately. In other embodiments, the out-of-range data would be sent if later confirmed in additional measurements.

In other embodiments, a trend model runs in both the gateway 102 and the sensor unit 105 using identical mathematical equations. In such embodiments, the sensor unit 105 tracks the data values that the trend model in the gateway 102 calculates. If the sensor unit 105 determines that the values calculated in the gateway 102 have good accuracy data may be sent less frequently, even if the data are outside of range. However, if the values of the trend model drifts from the actual values, data may be sent from the sensor unit 105 to the gateway 102. For example, temperature in a refrigerated storage environment can be monitored using this method. In this example, the trend model assumes that values outside of range will continue to have the same first and second derivative, for example 1° C. rise per hour and a 0.1° C. decrease in the rate of rise. So if a temperature of 10° C. is sent one hour and the value read by the sensor pod is 11° C. in the next hour and 11.9° C. in the following hour, there would be no need to send these intermediate values since the model has done a good job predicting values. However, if the value read by the sensor pod is 11.1° C. and then 13.0° C., one or both values may be transmitted since it is clear that the trend model is not making accurate predictions. This technique may have significant saving in the amount of data being transmitted, thereby extending the battery life of the sensor unit 105. This method also greatly increases the amount of off-line data that can be stored.

In some embodiments, the data transmission interval may be adaptive, such that the frequency of transmission may be based on how far the values predicted by the trend model differ from the actual values. For example, a given embodiment might have a policy of not transmitting a new value if the trend model is accurate to 5%, transmitting a new value every 60 minutes if the trend model has between 5% and 10% inaccuracy, and transmitting a new value every 10 minutes if the accuracy of the trend model is 10% or worse.

In some embodiments, variable length coding may be utilized so that the amount of data needed to send a data packet with values that are normal and expected (such as small changes in value) requires less bits than for values that are unexpected (such as large changes in value). One method of implementing such variable length coding is Huffman Coding. Those skilled in the art will realize that other variable length codes may be substituted for other known techniques (e.g., Snappy compression).

B. Alarms and/or Notifications

In some embodiments, alarms and/or notifications are generated under certain circumstances. In some embodiments comparison data from one part of the system, e.g. a sensor pod may be forwarded to another part of the system (e.g., a gateway). In some embodiments the comparison data may be used for an alarm and/or a comparison display. In some embodiments, the alarm and/or notification is generated by the gateway 102. In some embodiments, the alarm and/or notification is generated by one or more sensors 105. In some embodiments, the alarm and/or notification signal is sent to cloud computing 101, which can be accessed by user interfaces, such as for example mobile phone 103 or personal computer 104. In some embodiments, the alarm and/or notification is generated by at least one of the following: the gateway 102, the sensor unit 105, and the cloud computing system 101.

In some embodiments, alarms and/or notifications are generated in response to data values outside a predetermined range. The range can be set using any methodology described herein. For example, the range can be manually set by the user (via, for example, the cloud computing interface or the gateway). The range can also be predetermined based a number of preset modules. The range can also be dynamic and based on prior measurements registered by the sensor unit, or those registered by other sensor units. In some embodiments, when the sensor registers data that are outside the predetermined range, an alarm signal is generated at the sensor unit 105 and sent to other parts of the sensor system (e.g., the gateway 102 and/or cloud computing system 101). In other embodiments, the data from sensor 105 is sent to the gateway 102, where the data value is compared to the range and the alarm signal is generated. In yet other embodiments, the data is received by the cloud computing system 101, where the data value is compared to the range and the alarm signal is generated. In some embodiments, the alarm and/or notification signal is sent back to the gateway 102 and/or accessed via a user interface to the cloud computing system 101 (e.g., a mobile phone).

In some embodiments, alarms and/or notifications are generated when one sensor unit registers a data value that is significantly different than those data values registered by other sensor units. As discussed above, in some embodiments multiple sensor units 105 communicate with a single gateway 102. In some embodiments, data from different sensor units 105 are compared to each other to determine outliers and/or failures. In such embodiments one or more of the following techniques are used:

a. Data from each sensor units 105 is forwarded to a gateway 102, wherein the comparison is made;
b. Data from a first sensor unit 105 (e.g., 105A) is communicated to a second sensor unit (e.g., 105B) wherein the comparison is made; and
c. Data from a first sensor pod is send through a network (e.g. a self-organizing mesh network) to a second sensor pod wherein the comparison is made.

If the data from the first sensor pod is significantly different than the data from the second sensor pod, an alarm and/or notification will be generated, for example, on the gateway, the sensor unit itself, or the cloud computing system (which can be accessed by a user interface such as a mobile phone or computer). Those skilled in the art will realize that the above may be generalized to an arbitrary number of sensor units and/or gateways.

As described above, in some embodiments, sensor unit 105 comprises a plurality of sensors (e.g., internal sensors 307, external wired sensors 398, or external wireless sensors 309). In some embodiments data sets from different sensors attached and/or communicating to the same sensor unit 105 may be compared to each other to determine outliers and/or failures. For example, if a single sensor unit 105 has three different external temperature probes, each located within the same grain storage bag and one shows a temperature that is 10 degrees or more different than the other two, a fault condition could be declared with an appropriate notification and/or alarm to the user.

In some embodiments, various components of the sensor units 105 and/or sensor system 100 are connected by long wires. In some such embodiments, noise picked up by long wires may be addressed. In some embodiments, longer probe lengths may act as an antenna. For example, industrial environments can contain noise from power supplies at 50/60 Hz and their harmonics. In some embodiments, both hardware and digital filtering are be applied to cancel out noise in the environment.

C. Advanced Spoilage Detection

Some sensor systems are equipped with hardware and/or software that allows the system to determine when conditions in the storage environment raise a substantial risk that spoilage will occur. In some embodiments, the sensor units 105 and/or sensor systems 100 allow for the detection of conditions conducive to grain spoilage. In such embodiments, data collected by one or more sensor units 105 are analyzed, for example, by an algorithm to detect conditions conducive to grain spoilage. In some embodiments, data collected by one or more sensor units 105 are transferred to the gateway 102, where the data is analyzed. In other embodiments, data are transferred to the cloud computing system 101, where the data are analyzed. The data analyzed to determine whether spoilage is likely to occur are data corresponding to any environmental variable discussed in the present disclosure, including temperature, humidity, carbon dioxide, oxygen, phosphine, ethylene, sound, movement, pressure, and combinations thereof. In some embodiments, the environmental data analyzed to determine whether spoilage is likely to occur comprises temperature data, humidity data, carbon dioxide data, oxygen data, phosphine data, ethylene data, sound data, or movement data. In some embodiments, the environmental data analyzed to determine whether spoilage is likely to occur comprises temperature data, and humidity data. In some embodiments, the environmental data analyzed to determine whether spoilage is likely to occur comprises temperature data, and humidity data, and at least one of the following: carbon dioxide data, oxygen data, phosphine data, ethylene data, sound data, or movement data. In some embodiments, the data analysis occurs in the cloud computing system 101. In some embodiments, the data analysis occurs in the gateway 102. In some embodiments, the data analysis occurs in the sensor unit 105.

By way of example, reference will be made to the sensor system depicted in FIG. 6. In this example, sensor units 605A, 605B, and 605C are each located a different area within a grain storage environment. In this exemplary embodiment, a data set comprising temperature data is used to determine if natural convection currents can be generated in a bin. For example, the temperature values recorded by sensor unit 605A in one section of the grain mass are compared to, for example, the values recorded by sensor units 605B and 605C, each located in a different section of the grain mass. The difference in temperature and the distance between the regions is used to calculate the velocity of airflow within the storage environment due to natural convection. If the calculated velocity is above a threshold value, the system will register conditions are conducive to grain spoilage. In some embodiments, the data set comprises other environmental data, including, for example, humidity data, carbon dioxide data, oxygen data, phosphine data, ethylene data, sound data, and/or movement data. In some embodiments, the data set comprises humidity data.

In some embodiments, the threshold value is determined at least in part by analyzing a data set comprising at least part of the historical environmental data set. For example, with respect to the exemplary embodiment discussed above, in some embodiments, the algorithm will use environmental data (e.g., humidity data, carbon dioxide data, oxygen data, etc.) to determine the threshold value that the calculated velocity will be compared to. For example, if the temperature data and the humidity data shows that conditions in the storage environment are particularly well-suited for mold growth, then the threshold value might be lower than it would be if the same data showed conditions were not conducive to mold growth. In this way, the algorithm can conduct multi-variant analysis to determine whether or not the storage environment is conducive to spoilage. This method is described in general terms in FIG. 9.

Figure 9:
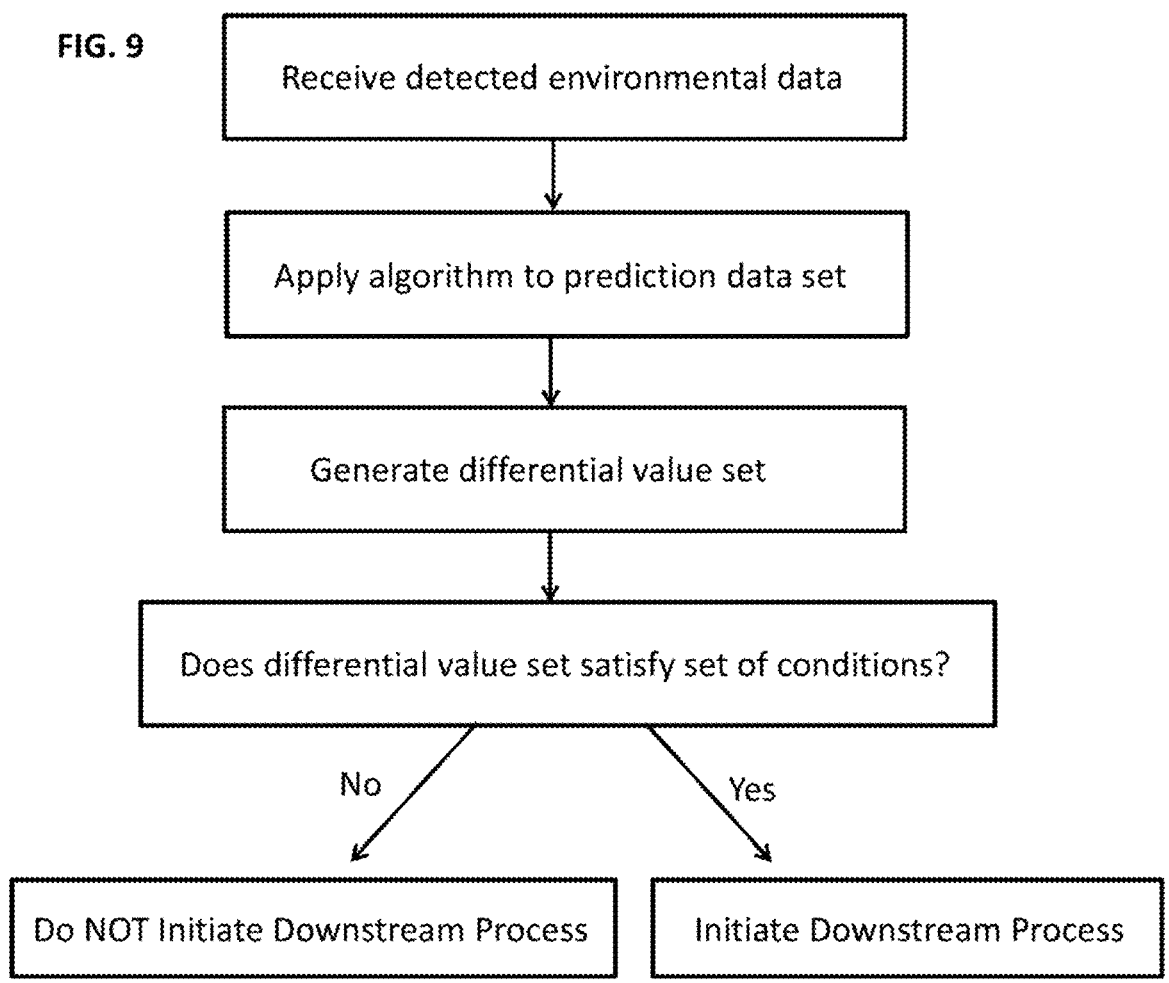
FIG. 9 depicts a flow chart for one embodiment of an algorithm for predictive detection, such as advanced spoilage detection. In the embodiment in FIG. 9, current environmental data corresponding to environmental variables inside a grain storage environment are received. An algorithm is applied to a prediction data set, which in some embodiments comprises historical environmental data from within the storage environment. In some embodiments, application of the algorithm to the prediction data set creates predicted environmental data. These predicted environmental data are compared to the detected environmental data, thereby generating a differential value set. This differential value set is analyzed using a set of conditions (e.g., comparison of each differential value to a threshold value) to determine whether the detected data are significantly different from the predicted data. In some embodiments, if the set of conditions is satisfied, a downstream process is initiated.

In some embodiments, the method described in FIG. 9 is performed. As depicted in FIG. 9, the method comprises the following steps:

receiving a detected environmental data set from the gateway;
applying the trained algorithm to a prediction data set comprising a historical environmental data set thereby generating a predicted environmental data set;
comparing the predicted environmental data set to the detected environmental data set, thereby generating a differential value set;
analyzing the differential value set using a set of conditions; and if the differential value set satisfies the set of conditions, automatically initiating a downstream process.

In the embodiment in FIG. 9, current environmental data corresponding to environmental variables inside a grain storage environment are received (e.g., detected temperature data, humidity data, and carbon dioxide data). An algorithm is applied to a prediction data set, which in some embodiments comprises historical environmental data from within the storage environment (e.g., previously detected temperature data, humidity data, and carbon dioxide data stored, for example, on the cloud computing system). In some embodiments, application of the algorithm to the prediction data set creates predicted environmental data (e.g., predicted temperature data, predicted humidity data, and predicted carbon dioxide data). These predicted environmental data are compared to the detected environmental data thereby generating a differential value set (e.g., having differential values for each environmental variable measured). This differential value set is analyzed using a set of conditions (e.g., comparison of each differential value to a threshold value) to determine whether the detected data are significantly different from the predicted data. In some embodiments, if the set of conditions is satisfied, a downstream process is initiated.

Although in the preceding example, temperature and humidity data were used to describe the process, any combination of environmental data described in the present disclosure can be utilized. For example, in some embodiments, the detected environmental data set and the historical environmental data set each comprise at least one of the following: temperature data, humidity data, oxygen data, carbon dioxide data, phosphine level data, and ethylene data. In some embodiments, the historical environmental data set comprises environmental data previously generated by the sensor corresponding to the one or more environmental variables.

In some embodiments, the advanced spoilage detection utilizes a rule based algorithm. In some embodiments, the advanced spoilage conditions are determined by the comparison of actual and predicted values. In some embodiments, the advanced spoilage detection utilizes pattern recognition.

In some embodiments, the system will produce an output in response to the determination that the storage environment is conducive to spoilage. In some embodiments, a notification and/or alarm is generated. In some embodiments, the notification and/or alarm is generated by cloud computing system 101. In some embodiments, the notification and/or alarm is displayed to the user when the user accesses cloud computing system 101 via a user interface (such as mobile phone 103 and/or computer 104). In some embodiments, a notification and/or alarm is sent directly to the user (e.g., to the user's computer 104 and/or mobile phone 103). In some embodiments, the user receives the notification and/or alarm over email, text message, and/or phone call. In some embodiments, the alarm and/or notification comprises a probability that a spoilage event (e.g., mold growth, insect colony growth, etc.) will occur over a defined time period (e.g., 1, 2, 3, 4, 5, 7, 10, 14 etc. days).

In some embodiments, the system will automatically initiate a downstream process in response to the determination that the storage environment is conducive to spoilage. In some embodiments, the automatic initiation of the downstream process will be performed by cloud computing system 101. In some embodiments, the automatic initiation of the downstream process will be performed by gateway 102. In some embodiments, the automated downstream process comprises generation of alarms and/or notifications as described throughout this application. In some embodiments, the automated downstream process comprises alterations in the storage environment, as discussed in other portions of this application. In some embodiments, the alterations in the storage environment are achieved by the action of an actuator that engages a mechanical process (e.g., turning on a fan, opening vents, initiating fumigation, stirring the grain, etc.).

D. Anomaly Detection

In some embodiments, the sensor units 105 and/or sensor systems 100 allow for the detection of anomalies in the grain storage environment. In such embodiments, data collected by one or more sensor units 105 are analyzed by an algorithm to detect anomalous events. In some embodiments, data collected by one or more sensor units 105 are transferred to the gateway 102, where the data are analyzed. In other embodiments, data are transferred to the cloud computing system 101, where the data are analyzed. The data analyzed to determine the presence of an anomaly comprise data corresponding to any environmental variable discussed in the present disclosure, including temperature, humidity, carbon dioxide, oxygen, phosphine, ethylene, sound, movement, pressure and combinations thereof. In some embodiments, the data analysis occurs in the cloud computing system 101. In some embodiments, the data analysis occurs in the gateway 102. In some embodiments, the data analysis occurs in the sensor unit 105.

In some embodiments, previous data collected from one or more sensors 105 is stored on the cloud computing system 101 or the gateway 102. These previous data comprise a historical data set. In some embodiments, an algorithm is applied to this historical data set to generate one or more predicted data values. In such embodiments, a current data set is received by the cloud computing system 101 or gateway 102 and the current data set is compared to the predicted data values. If the differential between the predicted data values and the current data is higher than a predetermined threshold value, then the algorithm will register an anomalous event and/or a probability that an anomalous event is occurring.

In some embodiments, each set of data collected by the sensor units 105 at different time points (e.g., once each day) is received by the cloud computing system 101 and/or gateway 102. Each data set is analyzed by an algorithm that applies a predetermined set of rules and/or conditions. If the rules and/or conditions are satisfied for a predetermined number of data sets, then the algorithm will register an anomalous event and/or a probability that an anomalous event is occurring.

Figure 10:
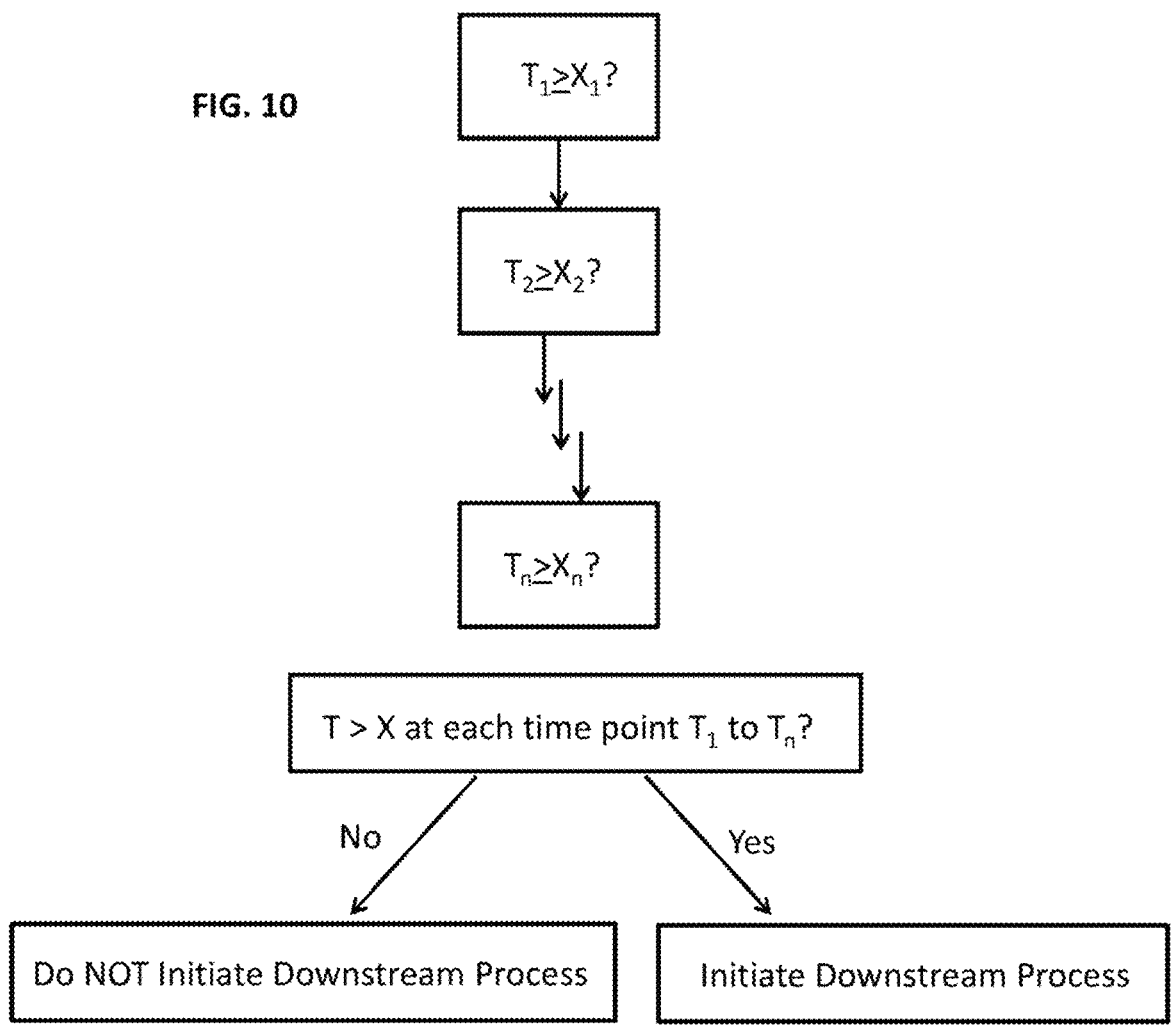
FIG. 10 depicts a flow chart of one embodiment of an algorithm for anomaly detection. In the embodiment in FIG. 10, a set of rules is applied to temperature data to determine whether a hot spot anomaly has developed. Each day, the temperature data for the day T is compared to a threshold value X, and if the temperature value T is greater than X each day for n continuous days, the system determines that a hotspot has developed. In some embodiments, the finding of an anomalous event automatically initiates a downstream process, such as production of an alarm, display of suggested responses, or automated physical processes.

For example, in one embodiment, a data set comprising temperature data is used to determine the presence of a hot spot using a set of rules depicted schematically in FIG. 10. In some embodiments, temperature data are collected from one or more sensor units 105, for example, once every day, and is transferred to gateway 102 and uploaded to the cloud computing system 101. Each set of temperature data are received by the cloud computing system 101. Each set of temperature data is then analyzed by an algorithm depicted in FIG. 10. On the first day, the temperature data (T1) is compared to a threshold value (X1). If the temperature is higher than the threshold value, then the algorithm will register this condition as satisfied. This process is repeated for data at several time points. In this example, each day the temperature data (Tn) from that data is compared to the corresponding threshold value for that day (Xn). If the condition is met (i.e., temperature recorded is higher than threshold) for a sufficient number of days, the system will register the formation of a hot spot. In some embodiments, the condition must be satisfied for a sufficient number (e.g., 4, 5, 6, 7, 8, 9, 10, etc.) of consecutive days for the system to register a hot spot. In some embodiments, the condition must be satisfied for at least 6 consecutive days for the system to register a hot spot.

Although the preceding exemplary embodiment discusses the use of temperature data, any combination of environmental variables can be analyzed to determine the presence of anomalous events. For example, in another exemplary embodiment, the system utilizes a data set that comprises temperature, oxygen, and carbon dioxide data to detect the presence of an emerging pest colony. The system can monitor data over time (e.g, a historical data set comprising temperature, oxygen, and carbon dioxide data from prior days, weeks, and/or months). If the algorithm detects, using any number of methods described herein, that there is an anomalous increase in temperature, combined with a statistically significant decrease in oxygen and a statistically significant increase in carbon dioxide, the system will register the development of a pest colony. In some embodiments, a decibel meter can be used to detect sound generated by the growing pest colony, and the sound data collected can also be factored into the analysis. Many different combinations of data are envisioned that can detect several anomalous events that are likely to have a deleterious effect on the quality of the grain in storage.

In some embodiments, the system provides the user with one or more outputs following analysis of the environmental data by the anomaly detection algorithm. In some embodiments, the output comprises one or more of the following: visual representations of historical, current, and predicted data, such as graphs and/or trendlines; probabilistic models that depict the probability that an anomalous event is occurring and/or will occur; confidence intervals that inform the user as to the strength of predictive insights; and/or warnings, alerts and/or notifications.

In some embodiments, an alarm and/or notification is generated when the system registers an anomalous event (e.g., hot spot, pest infestations, mold growth, etc.). In some embodiments, the alarm and/or notification is generated in the gateway 102 or generated in the cloud computing system 101 and sent to gateway 102. In some embodiments, the alarm and/or notification is generated in the cloud computing system 101, where it can be accessed via a user interface, such as, for example, a mobile phone or computer. In some embodiments, the alarm and/or notification is sent to the user interface (e.g., via text message or email notification). In some embodiments, the user interface utilizes a native application (e.g., on the mobile phone and/or computer). In some embodiments, the user utilizes a web-based application that is accessed via the user interface.

In some embodiments, the alarm and/or notification includes or is delivered with suggested instructions for how to best maintain the quality of the grain in storage. For example, in some embodiments, if the system detects a hot spot, then suggested instructions include instructions for mixing the grain and/or aerating the storage environment. In other embodiments, if the system detects a pest infestation, then the suggested instructions include instructions as to the duration and amount of pesticide to be administered to the grain. Many iterations on this system are possible.

In some embodiments, the system provides the user with a probability that an anomalous event is occurring or will occur in the future. In some embodiments, this probability is sent to gateway 102. In some embodiments, this information is maintained in the cloud computing system 101, which can be accessed via a user interface, such as for example, a mobile phone or personal computer. In some embodiments, this information is sent to the user interface (e.g., via text message or email notification).

In some embodiments, this probability is determined using a rule based algorithm. In some embodiments, the probability is determined by the comparison of actual and predicted values. For example, a spike in temperature of an actual value over a predicted daily spike in temperature can be used in the determination of an anomalous event. In some embodiments, the predictive models utilize moving averages. In some embodiments, the predictive models utilize exponential smoothing and/or double exponential smoothing. In some embodiments, the anomaly prediction utilizes pattern recognition. In some embodiments, the algorithm identifies a previous trend in the environmental data based on a historical environmental data set. The algorithm also identifies a current trend based on current and recent environmental data. The alogorithm then compares the two data sets and provides a probability that the current trend is the product of an anomalous event.

The probability of an anomalous event can be calculated using any number of methods known in the art and disclosed herein. For example, in one embodiment, the probability of developing a hotspot is calculated by analyzing a data set comprising temperature data over time. In an exemplary situation, the system registers a modest increase in temperature relative to the historical average (e.g. 0.5° C. higher than average) on day 1. The algorithm uses this information to generate a probability (e.g., 12%) that a hot spot is developing. On day 2, the system registers a temperature that is again higher than the historical average (e.g. 1.2° C. higher than average). The algorithm then analyzes both the data from day 1 and day 2, to generate an updated probability (e.g., 31%) that a hot spot is developing. If, for example, the system registers a temperature on day 3 that is less than day 2, but higher than day 1 (e.g. 0.9° C. higher than average), the algorithm will use the data values from all three days to update the probability (e.g., 34%) that a hot spot is developing. Thus, in some embodiments, the system will analyze the current data in the context of historical and recent data to determine the probability that an anomalous event is occurring. In some embodiments, other data will be included (e.g., weather data, such as temperature data, humidity data, and pressure data from a local weather service) to further refine the probabilities generated by the algorithm.

In some embodiments, the algorithms used to detect anomalous events (i.e., anomaly detection algorithms) utilize increasing sensitivity logic. In some embodiments, the sensitivity of the algorithm increases when the environmental conditions indicate an increased probability that an anomalous event will develop. For example, the temperature of the environment increases due to the presence of mold. This temperature increase is slow at first and then increases rapidly in an exponential way. Thus, in some embodiments, the algorithm has a built-in logic that increases the sensitivity of its analysis (e.g., by reducing the required threshold temperature values) upon detection of a small but statistically significant temperature increase. Similar sensitivity logic can be utilized for the detection of other anomalous event (e.g., increased sensitivity for determining presence of pest colony based upon localized decreases in oxygen levels and increases in carbon dioxide levels). Many embodiments are within the scope of the present disclosure.

In some embodiments, an anomaly detection algorithm comprises artificial intelligence models. In some embodiments, the anomaly detection algorithms are trained using machine learning. In some embodiments, the anomaly detection algorithms are trained utilizing inverse weight clustering and decision tree. In some embodiments, the anomaly detection algorithms are trained using linear one class support vector machines ("SVM with") deep learning. In some embodiments, the anomaly detection algorithms are trained using deep learning. In some embodiments, the anomaly detection algorithms are trained with deep Q-learning. In some embodiments, the algorithms are trained using deep policy gradient. In some embodiments, the anomaly detection algorithms are trained using neural networks.

In some embodiments, the anomaly detection algorithm is trained using deep learning. In some embodiments, the anomaly detection algorithm is trained using Restricted Boltzmann Machines (RBMs). In some embodiments, the anomaly detection algorithm is trained using Deep Belief Networks (DBNs). DBNs are built by stacking several RBMs and allow learning the distribution of the training data in an unsupervised manner. Thus, systems using anomaly detection algorithms trained in this manner can detect samples that do not come from the same distribution (thereby detecting anomalous events).

Training of the algorithm using these machine learning systems allows the anomaly detection algorithm to recognize patterns and regularities in the data collected by the sensor systems. Properly trained algorithms analyze environmental data sets to determine if the data represent standard/normal conditions within the grain storage environment, or if the data represent one or more anomalous conditions within the grain storage environment. In some embodiments, the anomaly detection algorithms can be trained to be probabilistic in nature and use statistical inference to find the best label for a given data set. In some embodiments, the output of an anomaly detection algorithm is the probability that the analyzed data represents an anomalous event (in contrast to a normal fluctuation of environment in absence of the anomaly).

E. Automation of Downstream Processes

In some embodiments, downstream processes are automatically initiated based on the results from data analysis conducted by the algorithms. In some embodiments, the downstream processes are simply the delivery of an alarm and/or notification to the user, as described above. However, in some embodiments, the automatically initiated downstream process comprises alterations of the environment of the grain in storage (e.g., increase or decrease in aeration, change in temperature, change in fumigation pattern and/or intensity, etc.).

For example, in some embodiments, the sensor system detects the presence of a hot spot using a data set that comprises temperature data. Upon registration of a hotspot by the system, a signal is sent, for example, from cloud computing system 101 to gateway 102 and from the gateway 102 to an actuator. The actuator then initiates a process that leads to changes in the storage environment that are likely to mitigate the damage caused by the hot spot and/or decrease the probability of having a hot spot develop. For example, in some embodiments, the actuator engages fans and/or other aeration systems to increase air flow in the grain storage environment. In some embodiments, the actuator engages a system that stirs and/or mixes the grain in storage.

In some exemplary embodiments, the sensor system is enabled with the ability to detect the presence of emerging pest colonies (using, for example, variations in temperature, carbon dioxide, and oxygen levels). In some such embodiments, upon the registration of an emerging pest colony event, a downstream process is initiated that results in increased fumigation of the grain in storage. In some embodiments, the system automatically selects an amount of fumigant, duration of fumigation, and/or a time schedule for fumigation based on the detection of an emerging pest colony event. These selected properties are then sent to an actuator that initiates a process that results in automated fumigation of the grain according to the automatically selected parameters.

Automation of downstream processes is not only possible when an anomalous event (e.g., pest infection) is formally registered by the system, but such processes can be automated in many different ways. For example, in some embodiments, downstream processes can be automated by the user (e.g., through scheduled events or direct instruction). In some embodiments, processes can be automated in response to an increased probability that such an event is occurring or will occur in the future. In such embodiments, the user can set a threshold probability beyond which, a downstream process will be automatically initiated. For example, in one embodiment, a system is configured to generate a probability that a hot spot is developing. If, for example, the probability of generating a hot spot exceeds 60%, the system is configured to send a signal to an actuator that initiates a process to mitigate the possibility of developing a hot spot (e.g., periodically stirring the grain or increasing aeration for a set period of time each day). In some embodiments, this process will be continued in a periodic manner until the system calculates a probability that is below a second threshold (e.g., 20% probability of a hot spot). In some embodiments, upon reaching this point, the system will revert back to the baseline settings. In other embodiments, upon reaching this reduced probability of developing a hot spot, the system will reduce the intensity of the downstream process but will not stop the process entirely. Many permutations on this responsive automation are possible using the sensor system disclosed herein.

F. Sensor Delete Logic

In systems with a plurality of sensors and/or sensor units, it is often advantageous to know whether each of the plurality of sensors and/or sensor units is accurately measuring the environment within the bulk grain. For example, levels of temperature, humidity, carbon dioxide and oxygen might be different at the top of a half-full grain silo than at the bottom of the grain pile within the silo. Furthermore, when determining the quality of the grain, the potential for spoilage, and/or the development of anomalous events, the measurements taken from within the grain pile likely will have greater relevance than the measurements taken outside of the grain pile. In some embodiments, the systems disclosed herein can detect which sensors and/or sensor units are outside of the bulk grain.

In some embodiments, the system will factor this information (i.e., which sensors and/or sensor units are outside of the bulk grain) into calculations when determining the features of the grain storage environment. For example, in one embodiment, environmental data collected by sensors and/or sensor units determined to be outside of the bulk grain will not be included in the environmental data set used by the algorithms to determine current and/or predicted environmental conditions of the storage environment, grain quality, presence or absence of anomalous events, or other determinations and/or predictive analysis disclosed herein. In some embodiments, environmental data collected by sensors and/or sensor units determined to be outside of the bulk grain will be included in the environmental data set, but its impact on calculations will be modified by applying, for example, a coefficient to the environmental data generated by the sensor and/or sensor unit located outside of the bulk grain.

In some embodiments, previous data collected from the sensors and/or sensor units in a grain storage environment are stored on the cloud computing system 101, gateway 102, and/or sensor unit 105. In some embodiments, a historical environmental data set is stored on cloud computing system 101, gateway 102, and/or sensor unit 105. In some embodiments, the historical environmental data set comprises environmental data previously collected by one or more sensors and/or sensor units. In some embodiments, an algorithm is applied to the historical environmental data set to generate one or more predicted data values. In some embodiments, a current environmental data set is received by the cloud computing system 101, gateway 102 and/or sensor unit 105. In some embodiments, the current environmental data set comprises data collected from the sensors and/or sensor units in the grain storage environment. In some embodiments, the current data are compared to the predicted data values. In some embodiments, the algorithm determines if there is a significant difference (e.g., greater than a threshold value) between the predicted data values for a sensor and/or sensor unit and the current data collected by the sensor and/or sensor unit. In some embodiments, if there is a significant difference (e.g., greater than a threshold value) between the predicted data values for a sensor and/or sensor unit and the current data collected by the sensor unit, then the algorithm will register that a sensor is outside of grain. In some embodiments, if there is a significant difference (e.g., greater than a threshold value) between the predicted data values for a sensor and/or sensor unit, and the current data collected by the sensor unit, then the algorithm will register a probability that a sensor is outside of grain.

In some embodiments, the algorithm will make a series of comparisons (i.e., comparing predicted environmental data to current environmental data) at a plurality of different time points. In some embodiments, the plurality of different time points will be evenly spaced in time (e.g., once every day, twice every day, every several hours, etc.). In other embodiments, the plurality of different time point is not necessarily evenly spaced in time. In some embodiments, the algorithm will not make a determination that a sensor and/or sensor unit is outside of the bulk grain until the difference between the predicted environmental data set and the current environmental data set is greater than a threshold value for a defined number of consecutive time points (e.g., 2, 3, 4, 5, 6, 8. 10, etc. consecutive measurements).

In some embodiments, the determination of whether a particular sensor and/or sensor unit is outside of the bulk grain will be made by comparing a first current environmental data set, comprising data collected by a first sensor and/or sensor unit, to a second current environmental data set, comprising data collected by at least one other sensor and/or sensor unit. In some embodiments, the first environmental data set, comprising data collected by a first sensor and/or sensor unit, is compared to a second current environmental set, comprising data collected by a second sensor and/or sensor unit. In some embodiments, the first environmental data set, comprising data collected by a first sensor and/or sensor unit, is compared to a second current environmental set, comprising data collected by two or more other sensor sand/or sensor units (e.g., a second, third, fourth and/or fifth sensor and/or sensor unit). In some embodiments, the difference between the first environmental data set and the second environmental data set will be compared to a threshold value and or threshold value(s). In some embodiments, if the differences between the first environmental data set are greater than the threshold value and/or values, the system will register this difference as significant. In some embodiments, this comparison will be made at a plurality of time points. In some embodiments, the algorithm will not make a determination that a sensor and/or sensor unit is outside of the bulk grain until the difference between the first environmental data set and the second environmental data set is greater than a threshold value (i.e., significant) for a defined number of consecutive time points (e.g., 2, 3, 4, 5, 6, 8. 10, etc. consecutive measurements).

In some embodiments, the determination of whether a sensor and/or sensor unit is outside of the bulk grain is made by cloud computing system 101. In some embodiments, the determination of whether a sensor and/or sensor unit is outside of the bulk grain is made by gateway 102. In some embodiment, the determination of whether a sensor and/or sensor unit is outside of the bulk grain is made by sensor unit 105 (including, for example, standalone sensor units and/or WJB units coupled to local sensors).

For purposes of illustration only, application of the sensor delete logic system is described with respect to a WJB connected to a plurality of sensors. In this example, the WJB is interfaced with a plurality of thermocouple cables installed in a grain storage structure. These cables consist of individual temperature sensors connected together. Data collected by the plurality of sensors are transferred to the WJB. As discussed in throughout the present disclosure, data collected by the WJB can then be communicated to one or more gateways and/or a cloud computing system. The data are analyzed by an algorithm to determine whether each individual sensor from the plurality of sensors is embedded in grain or is exposed to free air. In some embodiments, the data analysis occurs in the cloud computing system. In some embodiments, the data analysis occurs in the gateway. In some embodiments, the data analysis occurs in the WJB (e.g., using local memory and local processor).

In one exemplary embodiment, the change in temperature values registered by each sensor on a cable is compared to both the average change of all other sensors as well as the change in the ambient temperature (collected, for example by another sensor that is either connected to the WJB or communicates wirelessly with the WJB). If the change in temperature of a sensor is less than a specified fraction of the change of ambient temperature and greater than a specified fraction of the change of the average grain temperature, then the sensor is registered as being outside of the grain. As discussed above, when the system registers a sensor as being outside of the grain, the data from this system will be analyzed differently than the data collected by sensors determined to be inside the grain. In some embodiments, the data collected from the sensor(s) outside the grain will not be added to the current and/or historical environmental data sets, which are used for downstream analysis. In some embodiments, the data collected from the sensor(s) outside the grain will be modified (e.g., modified by a coefficient) before being added to the current and/or historical environmental data sets, which are used for downstream analysis.

In another exemplary embodiment, a plurality of sensor units is placed within different areas of a grain storage environment. As the quantity of the bulk grain is diminished, one sensor unit is released from the bulk grain and exposed to free air. The exposed sensor unit continues to transmit data (e.g., temperature, humidity, pressure, oxygen, carbon dioxide, etc.), for example, to a cloud computing system. An algorithm on the cloud computing system analyzes the current data set collected by the exposed sensor unit and compares it to a historical data obtained by the exposed sensor. By analyzing the differences between the current data set and the historical data set, the algorithm can determine that the sensor unit is no longer embedded in the bulk grain, but is now freely exposed. In some embodiments, the comparison of current data to historical data will be accompanied by the comparison of current data from the exposed sensor units to current and/or historical data collected by other sensor units.

Although the preceding exemplary embodiment discusses primarily the use of temperature data, any combination of environmental variables can be analyzed to determine that a sensor is outside of grain.

IV. Systems and Methods Utilizing GSQI

In some embodiments, the methods and systems disclosed herein provide the user with a quantitative measure of grain quality, referred to herein as a Grain Storage Quality Index ("GSQI"). The GSQI value of a given batch of grain corresponds to the objective quality of that grain batch. In some embodiments, the maximum GSQI value is 1000 and the minimum GSQI value is 100. In some embodiments, the GSQI scale comprises integers from 100 to 1000. GSQI allows an easy measurement of the quality of grain in a silo based on multiple factors simultaneously. The GSQI value is universal, in that the quality of two batches of grain, each comprising a different type of grain (e.g., rice and corn) can be directly compared simply by comparing the two GSQI values. Similarly, the quality of two batches of grain, each comprising grain from a different region (e.g., rice from Thailand and rice from California) can be directly compared simply by comparing the two GSQI values. For example, if grain Batch A, which is composed of rice grown California, has a GSQI value of 892, and Batch B, which is composed of rice grown in Texas, has a GSQI value of 772, a potential purchaser can easily quantify the difference in quality between Batch A and Batch B based on these GSQI values. GSQI-enabled systems can utilize all components (e.g., sensor units, WJBs, repeaters, gateways, cloud computing systems, user interfaces, etc.) and features (e.g., anomaly detection, sensor delete logic, advanced spoilage detection, notifications, automation of downstream processes, etc.) that are disclosed herein.

Each of GSQI providing algorithms discussed below can be trained using machine learning and/or artificial intelligence. In some embodiments, the GSQI algorithms comprise artificial intelligence models. In some embodiments, the GSQI algorithms are trained using machine learning. In some embodiments, the GSQI algorithms are trained utilizing inverse weight clustering and decision tree. In some embodiments, the GSQI algorithms are trained using linear one class support vector machines ("SVM with") deep learning. In some embodiments, the GSQI algorithms are trained using deep learning. In some embodiments, the GSQI algorithms are trained with deep Q-learning. In some embodiments, the GSQI algorithms are trained using deep policy gradient. In some embodiments, the GSQI algorithms are trained using neural networks.

In some embodiments, the GSQI algorithms are trained using deep learning. In some embodiments, the GSQI algorithms are trained using Restricted Boltzmann Machines (RBMs). In some embodiments, the GSQI algorithms are trained using Deep Belief Networks (DBNs). DBNs are built by stacking several RBMs and allow learning of the distribution of the training data in an unsupervised manner.

Using the concepts, methods, and systems disclosed herein, a similar quality index score could be developed for other crops in storage. For example, a quality score based on the ripeness level of fruit and/or vegetables could be developed. In some cases, where necessary, specific considerations for application to fruits and vegetables are discussed.

A. Initial GSQI Values

For each batch of grain in storage, an initial GSQI value must be determined. In some embodiments, a primary grain quality data set is used to determine the initial GSQI value includes an Equilibrium moisture content (EMC) for the grain batch, a test weight value for the grain batch, and a visual quality value for the grain batch. In some embodiments, the visual quality value comprises a number of broken kernels, stress cracks and/or a number of pests in a sample of grain from the grain batch. In some embodiments, the primary grain quality data set further comprises at least one of the following the species of the first batch of grain, the fatty acid content of the first batch of grain, and the protein, oil, and/or starch content of the first batch of grain. In some embodiments, the primary grain quality data set is analyzed by an algorithm that generates an initial GSQI value. In some embodiments, that algorithm can be trained using a machine learning process.

In some embodiments, a method is performed to determine an initial GSQI value. For example, in some embodiments, a system performs a method comprising the following steps:

receiving a primary grain quality data set comprising a first batch data set, the first batch data set comprising at least one the following values: an equivalent moisture content value for a first grain batch, a test weight value for the first grain batch, and a visual quality value for the first grain batch; and providing the primary grain quality data set to a GSQI predictor, wherein the GSQI predictor applies machine learning to the primary grain storage data set, thereby generating the initial GSQI value.

In some embodiments, a difference in quality between a first grain type and a second grain type can be determined by directly comparing a first initial GSQI value corresponding to the first grain type to a second initial GSQI value corresponding to the second grain type.

In some embodiments, cloud computing system 101 performs the steps necessary to generate an initial GSQI value. In some embodiments, gateway 102 performs the steps necessary to generate an initial GSQI value. In some embodiments, data corresponding to the primary grain quality data set are provided to the system by manual data entry. In some embodiments, the primary grain quality data set is provided to the system using an automatic process.

In some embodiments, the initial GSQI value is calculated using a formula. In some embodiments, the initial GSQI value is calculated using a clustering algorithm that is trained using a training data set that comprises grade scores for a plurality of grain batches, as well as GSQI values calculated for those batches (e.g., using a formula and/or machine learning trained algorithm). In some embodiments, the clustering algorithm defines ranges for each grade score and quantifies those scores. The clustering algorithm then correlates those grade scores to GSQI values to define the index. For example, the clustering algorithm could determine that "Grade A" canola corresponds to an initial GSQI score between 850 and 1000. To determine the initial GSQI value for a first grain batch (e.g., one determined to be "Grade A" canola), the algorithm in this example compares the initial quality data set for the first grain batch to initial quality data sets from other batches within the "Grade A" range to obtain the initial GSQI value for the first grain batch.

B. Determining Current GSQI Values

In some embodiments, the system can determine GSQI values for a batch of grain in storage. In some embodiments, the system predicts a current and/or future GSQI value for a batch of grain in storage based on historical GSQI values (including the initial GSQI value described above), data about the grain storage environment (e.g., data collected from sensors within the storage units, weather data from a local weather service, etc.), and future weather forecasts. In some embodiments, the predicted GSQI value representing the current quality of grain in storage is generated automatically upon receipt of updated environmental data. In some embodiments, the updated environmental data comprise data received from sensors inside the grain storage environment. In some embodiment, the updated environmental data comprise data received from external sources, such as, for example, a local weather service.

In some embodiments, cloud computing system 101 performs the steps necessary to determine a current GSQI value for a batch of grain in storage. In some embodiments, gateway 102 performs the steps necessary to determine a current GSQI value for a batch of grain in storage. In some embodiments, environmental data corresponding to environmental variables in the grain storage environment are provided to the system by manual data entry. In some embodiments, environmental data corresponding to environmental variables in the grain storage environment are provided to the system using an automatic process.

In some embodiments, current GSQI values are calculated using the following formula. Starting with an initial or baseline GSQI value, a value is subtracted, for example, for each day of storage. In one embodiment, the value subtracted for each day is dependent on the environmental conditions measured for that day. For example, the value that is subtracted is greater, for example, for high humidity and/or temperature values. In some embodiments, the values that are subtracted for a particular humidity and/or temperature have been determined empirically, through data collected in grain silos. In some embodiments, the values that are subtracted for a particular humidity, temperature, and/or pressure are determined based on local weather reports.

Figure 11:
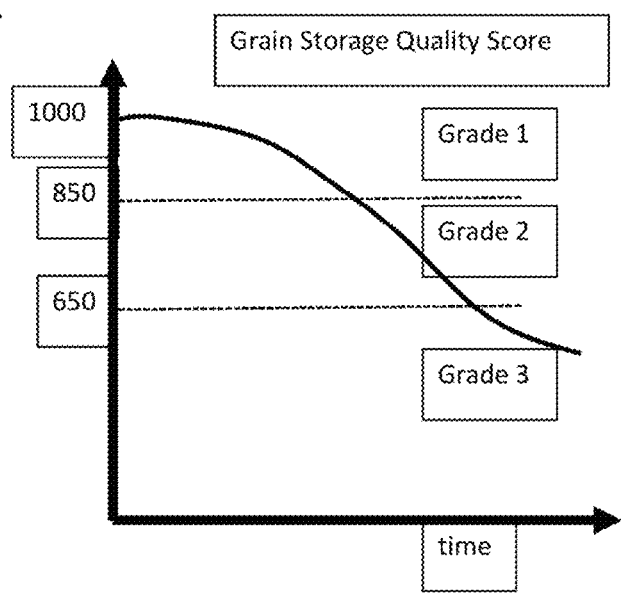
FIG. 11 depicts a graph that shows degradation of grain over time using an exemplary GSQI scale that spans from 100 to 1000. As time goes on the Grain Storage Quality Index (GSQI) goes from 1000 through a value of 850, which represents the frontier from Grade 1 to Grade 2 and then through a value of 650, which represents the frontier from Grade 2 to Grade 3. The higher the temperature in the silo, the faster the degradation of the grain and therefore, its GSQI score. A GSQI predictive model would put out a graph similar to the one shown in FIG. 10. Different grains, regions, producers, and/or buyers may utilize different grading systems. Therefore, the GSQI values associated with the threshold between quality grades may change between different grains, regions, producers, and/or buyers.

FIG. 11 depicts a chart of a GSQI score over time for a hypothetical batch of grain. In this example, the initial GSQI value is calculated to be 1000. Over time, however, the GSQI value is gradually reduced. The reduction in GSQI value corresponds to the reduction in quality of the grain in storage. In the beginning, the deterioration is slow. During this time, for example, the environmental data (e.g., temperature and humidity data) indicate favorable conditions for storing grain (e.g., low humidity and moderate temperature). Accordingly, the system would not register a large decrease in grain quality during this time. In contrast, during a later time period (indicated by the middle portion of the curve, the rate of degradation (indicated by the slope of the line) is much higher. During this time period, for example, conditions in the grain storage environment are less favorable to maintaining grain quality (e.g., high temperature and high humidity), thereby leading to more rapid degradation in quality. As depicted in the graph in FIG. 11, the rate of degradation is reduced at the end of the observation period, as indicated by a reduction in the downward slope of the line. During this time, the grain storage conditions are determined to be more favorable.

In some embodiments, the GSQI value will correspond to one or more current grain quality scores. For example, in FIG. 11, the GSQI scale matches an arbitrary current grain score as follows: GSQI values from 850 to 1000 correspond to Grade 1 for a particular grain (for example, canola). GSQI values from 650 to 849 correspond to Grade 2 for that same grain. GSQI values below 650 may correspond to Grade 3 for that grain. Thus, as demonstrated in FIG. 10, the grain in storage degrades from a Grade 1 grain to a Grade 3 grain during the course of storage, and this information is available because the system provides a GSQI score. In some embodiments, these threshold values will change over time based on the availability of additional data and normalization across a myriad of agricultural standards. In some embodiments, the thresholds will change over time when normalizing across countries and regions. Importantly, the GSQI score provides a more granular and nuanced quality readout for a particular batch of grain, while still correlating to an existing grain quality grading system. Also, as discussed above, GSQI permits direct comparison of grain quality across regions and grain types.

In some embodiments, sensor systems of the present disclosure, such as for example sensor system 100 and sensor system 600, are able to predict current and future grain quality of grain in storage using the GSQI metric. For example, in some embodiments, a grain batch is stored in a storage container which is equipped with a sensor system of the type disclosed herein, such as GSQI-enabled sensor system 1200, depicted in FIG. 12. This exemplary sensor system comprises two enclosed sensor units 1205, analogous to enclosed sensor unit 700. Enclosed sensor units 1205 are configured, for example, to detect temperature and humidity values inside grain silo 1210, where they are deployed. Sensors 1205 gather environmental data (e.g., temperature and humidity data from inside grain silo 1210) and transmit that data wirelessly to gateway 1202. Gateway 1202 then sends the temperature data to cloud computing system 1201, where it is analyzed to determine a predicted GSQI score for the grain stored in the grain silo over time. This information can be accessed by the user via user interface 1204, which could be, for example, a personal computer or mobile phone. In some embodiments, the user interface 1204 utilizes a native application (e.g., on the mobile phone and/or computer). In some embodiments, the user utilizes a web-based application that is accessed via the user interface 1204. The user interface 1204 provides display 1220 which communicates, among other things, the GSQI score over time to the user. In the embodiment depicted in FIG. 12, the GSQI Score is displayed as a graph of GSQI score over time. However, many formats and methods of display are within the scope of the present disclosure.

Figure 12:
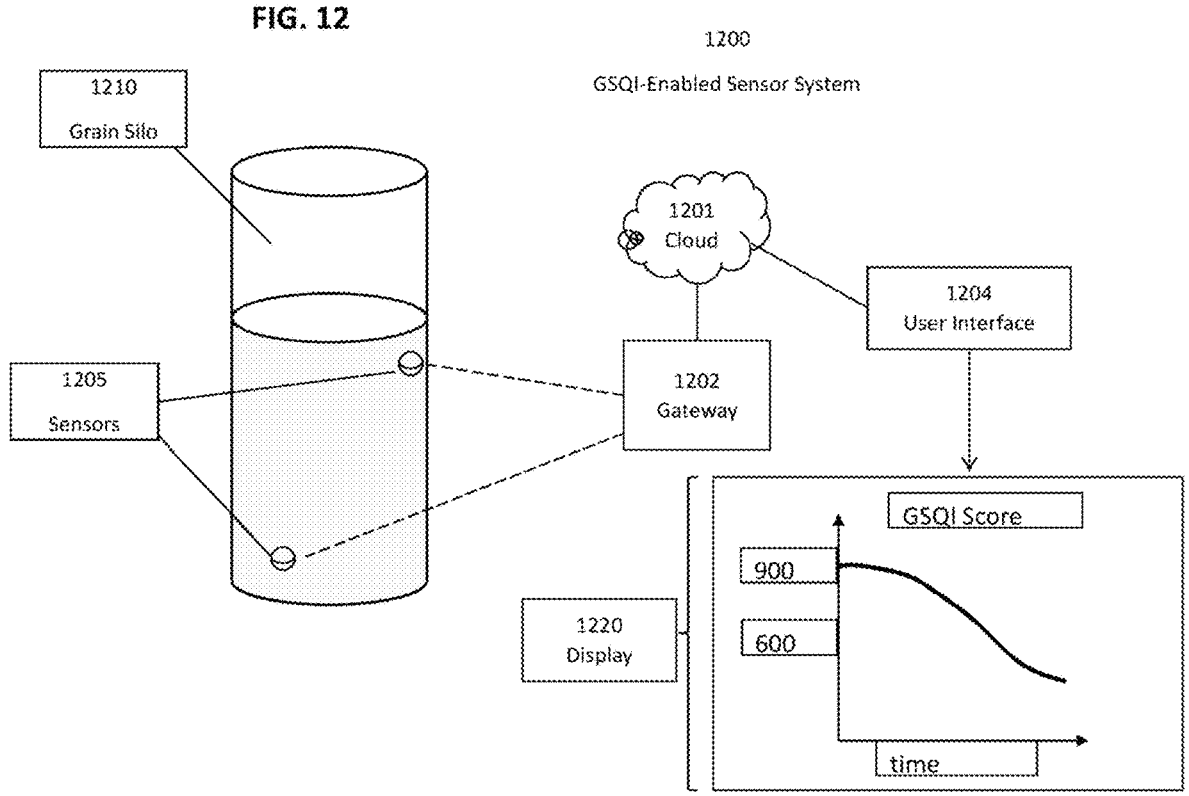
FIG. 12 shows a block diagram of an exemplary GSQI-enabled sensor system 1200. Enclosed sensor units 1205 communicate data pertaining to the environment within grain silo 1210 to gateway 1202 over a local wireless network. Gateway 1202 communicates that data to cloud computing system 1201, where the data is analyzed to generate a GSQI score profile for the grain stored in grain silo 1210. A user can access the cloud computing system 1201 via user interface 1204, where they are provided with display 1220. Display 1220 includes visual representations of the GSQI profile of the grain stored in grain silo 1210. Various downstream processes can be enabled using the GSQI data provided by GSQI-enabled sensor system 1201.

With reference to the exemplary embodiment depicted in FIG. 12, the grain batch in grain silo 1210 has an initial GSQI value, determined using one or more of the techniques described herein. By way of example, this initial GSQI value was determined to be 900, but the initial value can, of course, be any GSQI value, as long as it correlates to the quality of the grain as described herein. At a first time point, sensors 1205 detect, for example, temperature and humidity values inside the grain silo. These values are transmitted wirelessly to the gateway 1202, which sends the data to cloud computing system 1201 for processing, as discussed. The cloud computing system 1201 applies an algorithm to determine GSQI based on the historical data set comprising the initial GSQI value, and the environmental data set, which comprises the temperature and humidity data received by the cloud computing system 1201 from sensors 1205. The algorithm then subtracts from the initial GSQI score an appropriate number, which is based on the temperature and humidity levels detected at the first time point. In some instances, the system will determine based on the data received from the sensors 1205 that no deduction is necessary, and the GSQI score will remain constant. At a second time point, this process is repeated. However, the GSQI value from the first time point is now factored into the historical data set, and new environmental data are received from sensors 1205. This process continues for a plurality of time points. Over time, this data can be displayed, for example as a graph of GSQI score over time, as depicted by display 1220, which is accessed via user interface 1204.

Although for ease of explanation this example utilizes sensors in only one grain storage environment (i.e., grain silo 1210), sensor systems covering a plurality of grain storage environments are envisioned. Sensors systems can utilize a plurality of sensors units (including both standalone sensor units and WJB-enabled local sensors), gateways, repeaters, etc. In some embodiments, these systems can create a local meshing network, as described above. All other features described herein can also be incorporated into a GSQI-enabled sensor system. For example, power saving modalities, discussed above, can be incorporated into a GSQI-enabled sensor system. For example, if the temperature and/or humidity data do not differ significantly from prior values, one or more "no change" signals are sent from sensors 1205 to the cloud computing system 1201 via gateway 1202. Cloud computing system 1201 will then proceed with calculating a present GSQI value using one or more data points from the previous environmental data set. As discussed above, each of the components and features discussed herein can be combined in many ways without deviating from the scope of the present disclosure.

Similarly, display 1220 is not limited to displaying GSQI values. It can display environmental data collected by the sensors 1205. Current and historical environmental data can be viewed, and the display 1220 can be configured to display such data in a variety of manners. In some embodiments, display 1220 also depicts the presence or absence of anomalous events (e.g., hot spot formation, pest colony development, mold growth, etc.), as well as probabilities that such anomalous events are developing. Display 1220 can also provide notifications and/or alarms, as well as suggested parameters for modifying the grain storage environment. In some embodiments, user interface 1204 will also be gateway 1202 (e.g., in embodiments where gateway 1202 is a mobile phone).

Although the examples described above utilize temperature and/or humidity data, many different types of environmental data can be utilized in a GSQI-enabled grain storage system, such as grain storage system 1200. For example, the environmental data used when determining a GSQI value can include the following: temperature, humidity level, carbon dioxide concentration, oxygen concentration, phosphine concentration, ethylene concentration, and sound levels. In some embodiments, each grain storage environment comprises a plurality (e.g., 2, 3, 4, 5, etc.) of sensors. In some such embodiments, each of the plurality of sensors is specific to a different environmental variable. In other embodiments, at least one sensor can detect data from a plurality (e.g., 2, 3, 4, 5, etc.) of environmental variables. For example, in one embodiment, a single sensor can detect more than one of the following: temperature, humidity, carbon dioxide, oxygen, phosphine, ethylene, and sound. In some embodiments, each sensor in the GSQI-enabled sensor system detects the same environmental variable or a set of environmental variables. In other embodiments, at least one sensor in the GSQI-enabled sensor system detects a different environmental variable or set of environmental variables than at least one other sensor on the GSQI-enabled sensor system. Thus, the use of GSQI allows an easy measurement of the quality of grain in a grain storage environment (e.g., grain silo, grain bag, etc.) based on multiple factors simultaneously.

Many different sets of environmental data may be utilized to determine the GSQI score of a batch of grain in storage. In some embodiments, the environmental data set used to determine GSQI comprises at least one of the following: temperature data, humidity data, carbon data, oxygen data, phosphine data, ethylene data, sound/acoustic data, pressure data, and movement data. In some embodiments, the environmental data set used to determine GSQI comprises at least one of temperature data and humidity data. In another embodiment, the environmental data set used to determine GSQI comprises at least one of temperature data and humidity data, as well as at least one of the following: carbon data, oxygen data, phosphine data, ethylene data, sound/acoustic data, pressure data, and movement data. In another embodiment, the environmental data set used to determine GSQI comprises both temperature data and humidity data. In another embodiment, the environmental data set used to determine GSQI comprises both temperature data and humidity data, as well as at least one of the following: temperature data, humidity data, carbon data, oxygen data, phosphine data, ethylene data, sound/acoustic data, pressure data, and movement data.

As discussed above, in some embodiments, the environmental data used to determine the GSQI value of grain in storage comprises data from a weather service. For example, in some embodiments, a GSQI-enabled system will import data from a local weather service at a regular time period (e.g. twice a day), and use this data as part of an environmental data set to determine the GSQI value of a batch of grain in storage. The data imported from the weather service can be, for example, temperature data, humidity data, and/or pressure data corresponding to the local area in which the grain storage environment (or plurality of grain storage environments) is located. In some embodiments, the environmental data set used to calculate a GSQI value is composed entirely of data retrieved from a weather service. In other embodiments, the environmental data set comprises data received from a weather service as well as data obtained from one or more sensors that detect environmental variables of the grain storage environment. For example, in one embodiment, a sensor system such as GSQI-enabled sensor system 1200 records temperature data, carbon dioxide data, and oxygen data using sensors 1205. However, when calculating a GSQI value for the grain in the storage environment (e.g., grain silo 1210), cloud computing system 1201 utilizes an environmental data set that comprises both data from sensors 1205 (e.g., temperature data, carbon dioxide data, and oxygen data) and data from a weather service (e.g., temperature data, humidity data, and/or pressure data). Many combinations of environmental data derived from sensors and weather services are envisioned, each of which is within the scope of the present disclosure.

In some embodiments, the sensor system develops a thermal signature of a storage unit (e.g., storage bin, silo, container, etc.). In such embodiments, one or more sensor units 1205 obtains environmental data that correspond to one or more environmental variables within the storage unit. The environmental data is stored, for example, on gateway 1202 or cloud computing system 1201, thereby creating a historical environmental data set. In some embodiments, the historical environmental data set comprises environmental data collected by sensors 1205 at a plurality of time points, with each subset of environmental data corresponding to environmental variables in the storage container at each of the plurality of time points. The historical data set is analyzed using an algorithm, thereby creating a thermal signature of the storage bin. In some embodiments, data storage and analysis are performed by cloud computing system 1201. In some embodiments, data storage and analysis are performed by cloud computing system 1202 and/or gateway 1202. In some embodiments, thermal signature is seasonally adjusted. In some embodiments, the thermal signature is unique to the storage unit in which sensors 1205 are located. The system analyzes a future environmental data set comprising predicted future weather data (e.g., data from a local weather forecast) and the thermal signature of the storage unit to determine predicted GSQI value(s) for the grain located in the storage unit. In some embodiments, the thermal profile is refined as new environmental data are transferred from sensors 1205 to cloud computing system 1201.

In some embodiments, the system develops the thermal profile of the storage unit using a combined historical data set comprising a historical environmental data set and a historical weather data set. In such embodiments, the algorithm analyzes the combined historical data set to generate a thermal profile of the storage unit. In some embodiments, the historical weather data set comprises weather data from the region in which the storage unit is located and the historical weather data set comprises local weather data at a plurality of time points. In some embodiments, the historical weather data set comprises a plurality of local weather data subsets each corresponding to the local weather at one of a plurality of time points. In some embodiments, the data from the historical weather data set at each of a plurality of time points are correlated with corresponding data from the historical environmental data set (e.g., environmental data obtained by the sensors 1205 on the same day as the local weather data). In some embodiments, cloud computing system 1201 applies an algorithm to the combined historical data set thereby generating a thermal profile for the storage unit. In some embodiments, the thermal profile is seasonally adjusted. In some embodiments, the thermal profile is refined as new environmental data and/or weather data are transmitted to cloud computing system 1201. In some embodiments, the local weather data is obtained from a third party (e.g., a local weather service). Using the same principals and methods, the system 1200 can also create thermal profiles for each of a plurality of storage units.

Figure 13:
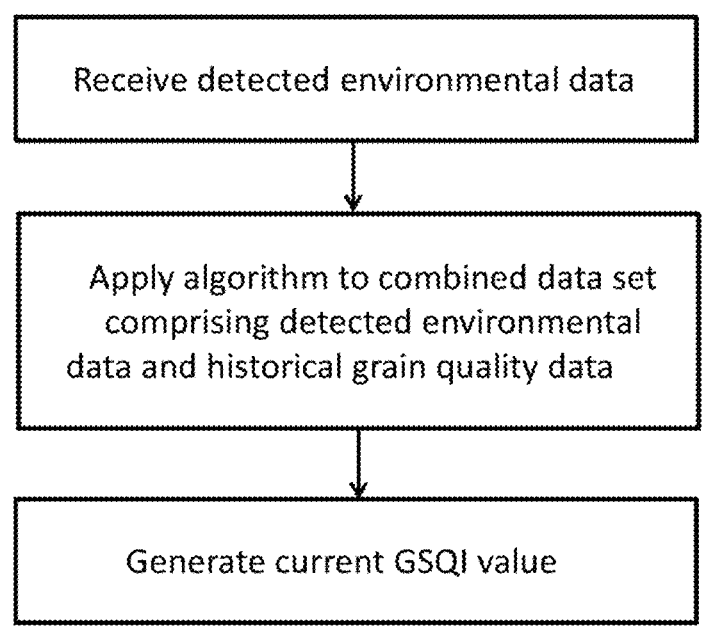
FIG. 13 depicts a flow chart for one method of determining a current GSQI value for a batch of grain in a storage condition. Environmental data detected from within the grain storage environment (i.e., the detected environmental data) is received. An algorithm is applied to a combined data set that comprises the detected environmental data as well as a historical grain quality data set. In some embodiments, the historical grain quality data set comprises one or more prior GSQI values corresponding to the quality of the grain in the grain storage environment at previous time points. Following application of the algorithm to the combined data set, a current GSQI value is generated.

While the examples above focus primarily on systems that are configured to generate a GSQI value, methods for generating such values are within the purview of the present disclosure. For example, in some embodiments, a system performs a method comprising the following steps, which are outlined in FIG. 13.

receiving an environmental data;
applying a trained algorithm to combined data set comprising detected environmental data and historical grain quality data; and
generating a current GSQI value;

wherein a difference in quality between a first grain type and a second grain type can be determined by directly comparing a first GSQI value corresponding to the first grain type to a second GSQI value corresponding to the second grain type. In some embodiments, the historical grain quality data set further comprises a historical GSQI profile, and the historical GSQI profile comprising a plurality of historical GSQI values. In some embodiments, the environmental data set comprises a temperature value and a humidity value. In some embodiments, the environmental data set further comprises at least one of the following: an oxygen value, a carbon dioxide value, a phosphine value, an ethylene value, an acoustic value, a pressure value, and a movement value. In some embodiments, the environmental data set comprises data derived from one or more sensors that detect environmental variables in a grain storage environment. In some embodiments, the environmental data set comprises data derived from a weather service.

As discussed above, a quality index for fruit and/or vegetables in storage could be devised using many of the same systems and methods described herein. In such a system, the data correlating to levels of ethylene gas detected by sensor units, such as sensor unit 105, are factored prominently in the determination of quality. Ethylene is given off by ripening fruit and/or vegetables. Therefore, the environmental data tracked by the system includes ethylene concentration, as well as temperature and humidity. This data can be used to determine the level of ripeness for the fruit and/or vegetables. In addition, analysis using other environmental variables (e.g., temperature, humidity, carbon dioxide, oxygen, phosphine, etc.) can be analyzed to determine the presence or absence of additional factors, such as anomalous conditions, conditions conducive to spoilage, etc. These additional factors can also be included in determining the quality level of the fruit and/or vegetables in storage.

C. Predicting Future GSQI Values

In some instances, it is advantageous to predict the quality of a batch of grain in storage at a future time point. Thus, a GSQI predictive model is particularly desirable, as decisions could be made today based on anticipated GSQI values in the future.

In some embodiments, the system predicts a future GSQI value for a batch of grain in a storage environment. In some embodiments, the system predicts a plurality of future GSQI values, each corresponding to the quality of a batch in grain in storage at a different future time point. In some embodiments, the system generates a predicted GSQI profile for a batch of grain in storage that comprises a plurality of future GSQI values, each corresponding to the quality of a batch in grain in storage at a different future time point. In some embodiments, the predicted GSQI value(s) are derived from a GSQI predictive model.

In some embodiments, the GSQI predictive model is based on a predicted environmental data set. In some embodiments, the predicted environmental data set comprises predicted environmental data derived from weather forecasts and/or predicted environmental data derived at least in part from analysis of historical environmental data. In some embodiments, the analysis of historical environmental data is based on the application of one or more of the following: artificial intelligence (e.g., neural network, machine learning, etc.), lookup tables, curve fitting to a mathematical model, and direct mathematical modeling. In some embodiments, a historical environmental data set is analyzed using a machine-learning trained algorithm that generates predicted environmental data. In some embodiments, this predicted environmental data is used to calculate a predicted GSQI profile for a batch of grain in storage. In some embodiments, this predicted environmental data is combined with data from at least outside source (e.g., weather report) before it is used to calculate a predicted GSQI profile for a batch of grain in storage.

In some embodiments, the historical environmental data are derived from sensors that detect one or more environmental variables in the grain storage environment. In some embodiments, the sensors comprise standalone sensors, such as sensor unit 105 (described, for example, with respect to FIG. 1A and FIG. 3). In some embodiments, the sensors comprise local sensors 407 that have been modified using a WJB 400, (described, for example, with respect to FIG. 4). In some embodiments, the sensors comprise enclosed sensor units 700 (described, for example, with respect to FIG. 7A). In some embodiments, the historical environmental data are collected as part of a sensor system disclosed in the present embodiment (e.g., sensors systems 100, 600, 1200, etc.). In some embodiments, the historical environmental data set comprises data derived from at least one external source (e.g., weather report data). In some embodiments, for example, historical data (e.g., temperature data, humidity data, and/or pressure data) gathered and collected by one or more third parties (e.g. weather report) will be collected and incorporated into the historical data set used to predict future GSQI values. In some embodiments, such historical data, in conjunction with historical environmental data derived from sensors within the grain storage environment, will be used to train and/or refine the predictive algorithm.

The historical environmental data used to predict future GSQI values can comprise data corresponding to any environmental variable, including for example, those environmental variables described herein. For example, the environmental data used when predicting a future GSQI value can include the following: temperature, humidity level, carbon dioxide concentration, oxygen concentration, phosphine concentration, ethylene concentration, and sound levels. Many different sets of environmental data may be utilized to predict future GSQI scores for a batch of grain in storage. In some embodiments, the historical environmental data set used to predict future GSQI values comprises at least one of the following: temperature data, humidity data, carbon data, oxygen data, phosphine data, ethylene data, sound/acoustic data, pressure data, and movement data. In some embodiments, the historical environmental data set used to predict future GSQI values comprises at least one of temperature data and humidity data. In another embodiment, the historical environmental data set used to predict future GSQI values comprises at least one of temperature data and humidity data, as well as at least one of the following: carbon data, oxygen data, phosphine data, ethylene data, sound/acoustic data, pressure data, and movement data. In another embodiment, the historical environmental data set used to predict future GSQI values comprises both temperature data and humidity data. In another embodiment, the historical environmental data set used to predict future GSQI values comprises both temperature data and humidity data, as well as at least one of the following: temperature data, humidity data, carbon data, oxygen data, phosphine data, ethylene data, sound/acoustic data, pressure data, and movement data.

In some embodiments, the provision of predicted GSQI values and/or a predicted GSQI profile is achieved using a sensor system, such as, for example, sensor system 1200, depicted in FIG. 12. In some embodiments, the historical environmental data set comprises data derived from sensors 1205, located within grain silo 1210. In some embodiments, this historical data set is stored in cloud computing system 1201 and/or gateway 1202. In some embodiments, cloud computing system 1201 and/or gateway 1202 also stores a historical GSQI profile for grain silo 1210, which is comprised of a plurality of GSQI values at different time points, which were determined using any of the methods disclosed herein. In some embodiments, the cloud computing system 1201 utilizes a machine-learning trained algorithm to generate the predicted GSQI profile. In some embodiments, the machine-learning trained algorithm analyzes the historical GSQI profile and the historical environmental data to generate the predicted GSQI profile. In some embodiments, the cloud computing system 1201 provides a visual depiction of the predicted GSQI profile. In some embodiments, the user can access the predicted GSQI profile and/or the visual depiction using user interface 1204, which in some such embodiments comprises a mobile phone, personal computer, tablet computer, etc. This feature of providing predicted GSQI values in connection with a sensor system can be combined with any of the various features and/or sensor systems described in the present disclosure. Many permutations are envisioned, each of which are within the scope of the present disclosure.

Figure 14:
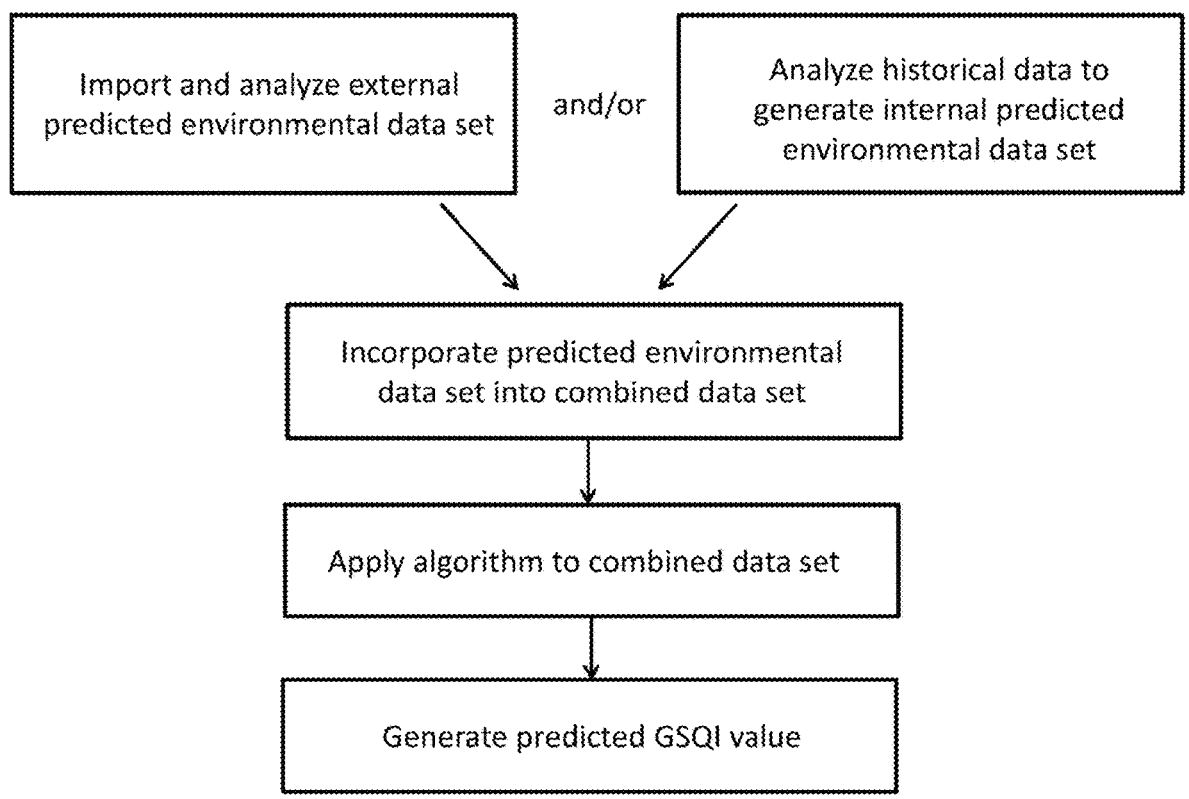
FIG. 14 depicts a flow chart for one method of predicting GSQI values for a batch of grain in a grain storage environment. The method can utilize external predicted environmental data (e.g., data from a weather forecast) and/or internal predicted environmental data (e.g., generated by application of an algorithm to historical environmental data). This predicted data is incorporated into a combined data set. In some embodiments, the combined data set comprises historical GSQI values for the grain batch in storage. An algorithm is applied to the combined data set, thereby generating a predicted GSQI value.

While the examples above focus primarily on systems that are configured to generate a GSQI value, methods for generating such values are within the purview of the present disclosure. For example, in some embodiments, a system performs a method comprising the following steps, which are outlined in FIG. 14:

incorporating a predicted environmental data set into a combined data set;
applying a trained algorithm to the combined data set; and
generating a predicted GSQI value;

wherein a difference in quality between a first grain type and a second grain type can be determined by directly comparing a first GSQI value corresponding to the first grain type to a second GSQI value corresponding to the second grain type. Also as depicted in FIG. 14, the system can generate the predicted environmental data set in several possible ways. First, in some embodiments, the system can import an external predicted environmental data set, such as for example temperature data, humidity data, and pressure data from a local weather forecast. In some embodiments, this external predicted environmental data set is analyzed and/or processed before being incorporated into the combined data set. Second, in some embodiments, a historical environmental data set is stored on the cloud computing system. In some embodiments, this historical environmental data set comprises environmental data previously collected from within the grain storage environment. In some embodiments, a trained algorithm analyzes this historical data set, thereby generating internal predicted environmental data. In some embodiments, this internal predicted data set is used in the predicted environmental data set that is incorporated into the combined data set. In some embodiments, the predicted environmental data set incorporated into the combined data set comprises both the external predicted environmental data set and the internal predicted environmental data set.

In some embodiments, the historical grain quality data set further comprises a historical GSQI profile, the historical GSQI profile comprising a plurality of historical GSQI values. In some embodiments, the environmental data set comprises a temperature value and a humidity value. In some embodiments, the environmental data set further comprises at least one of the following: an oxygen value, a carbon dioxide value, a phosphine value, an ethylene value, an acoustic value, a pressure value, and a movement value. In some embodiments, the environmental data set comprises data derived from one or more sensors that detect environmental variables in a grain storage environment. In some embodiments, the environmental data set comprises data derived from a weather service.

In some embodiments, predicted GSQI values are calculated and refined over time. In one embodiment, model refinement occurs as follows. Current GSQI values are computed at regular or approximately regular intervals of time (e.g., every day, every 2 days, every week, etc.) based upon environmental data collected by the sensor units within the grain storage environment. In some embodiments, each current GSQI value is calculated, for example, based on stepwise deduction from the prior GSQI values (i.e., historical GSQI data set). The magnitude of the stepwise deduction is, in turn, dependent on the environmental data obtained by the sensors within the grain storage environment. In some embodiments, a first future predicted GSQI value is calculated, based, for example, on a linear regression model with data inputs from, for example, local weather data. After the passage of time, the first future predicted GSQI value is compared to a first calculated current GSQI value at that time point (i.e., the next GSQI value calculated using actual data collected from sensors within the grain storage environment). The first future GSQI value is compared to the first calculated current GSQI value to determine a first error margin. This process is then repeated with each iteration of predicted data. For example, a second future predicted GSQI value is generated, using slight alterations to the analytical parameters. For example, in the next iteration, the predictive model will factor humidity data from the weather forecast slightly higher in its analysis, temperature data from the weather forecast slightly lower in its analysis, and the linear regression from the historical GSQI data slightly higher in its analysis. This second future predicted GSQI value is then compared to a second calculated current GSQI value, which is generated when the corresponding environmental data are collected. This comparison produces a second error margin. This process is iteratively repeated over time, and the predictive model systematically changes the analytical parameters at each iteration to improve the accuracy of the predicted future GSQI values (i.e., lower the margin of error). In this way, the predictive model is responsive and improves over time.

In some embodiments, the predictive GSQI model will produce different predictive outputs over time. For example, in some embodiments, the predictive GSQI model will only produce conservative predictions of future GSQI profiles (e.g., predictive GSQI profiles only 1-2 weeks out) due to the limited access of historical data. However, as more historical data are analyzed over time and the predictive algorithm is refined (for example, as discussed above), the predictive algorithm predictive future GSQI profiles will be made over longer periods of time (e.g., 1-2 months). In some embodiments, these more advanced predictions are the result of pattern recognition analysis. In some embodiments, these predictions are coupled with confidence intervals. In some embodiments, a plurality of predictive models are offered, each having an associated probability.

In some embodiments, the predicted GSQI value is determined using a rule based algorithm. In some embodiments, the probability is determined by the comparison of actual and predicted environmental values (as discussed before). In some embodiments, the predictive models utilize moving averages. In some embodiments, the predictive models utilize exponential smoothing and/or double exponential smoothing. In some embodiments, the GSQI prediction algorithm utilizes pattern recognition.

Similar methodology can be utilized to predict the quality of fruit and/or vegetables in storage. For example, trends in ethylene data in the historical data set can be analyzed in conjunction with additional environmental data (e.g., temperature and/or humidity data) to determine predictive models for ripening during storage and/or transport. These predictive ripening models can be analyzed in conjunction with predicted environmental data (e.g., predicted temperature, humidity data, and/or pressure data derived from a local weather forecast) to generate a predicted quality profile for the fruit and/or vegetables in storage. Like those for grains, these predictive models can be iteratively refined. In addition, analysis using other environmental variables (e.g., temperature, humidity, carbon dioxide, oxygen, phosphine, etc.) can be analyzed to determine the presence or absence of additional factors, such as anomalous conditions, conditions conducive to spoilage, etc. These additional factors can also be included in the prediction models for the quality level of the fruit and/or vegetables in storage.

D. Optimization Processes utilizing GSQI Values

In some circumstances, it is advantageous to have a system that automatically analyzes current and/or future quality data (e.g., GSQI profiles) from one or more batches of grain and uses these data sets to optimize a process. Two exemplary optimization processes are described below. However, many business decisions can be automated using predicted GSQI profiles without deviating from the scope of the present disclosure.

(1) Optimizing Decisions Relating to Sale of Grain Batches and/or Grain Products For example, an operator might have two batches of grain, Batch 1 and Batch 2, which are located in different grain storage environments. In some embodiments of the systems described in the present disclosure, GSQI profiles for each batch will be generated by the system and displayed for the operator. In some embodiments, the system will provide a display that include a predicted GSQI profile for future time points. These displays can inform decisions made by an operator (e.g., which batch to sell, when to sell, whether to move one or both batches to different storage areas, etc.). In some embodiments, the display will also provide suggestions to the operator to help the operator make that decision. For example, in one embodiment, the system generates an alert notifying the operator that the quality of Batch 1 is deteriorating rapidly, while the quality of Batch 2 is relatively constant. The notification also includes predicted GSQI profiles that tell the operator that Batch 1 is likely to continue to degrade at a rapid rate, while Batch 2 is likely to hold its quality for the foreseeable future. Along with this data, the notification would include a suggestion that the operator sell Batch 1 within the next week or two, while holding onto Batch 2. In some embodiments, the notification includes predicted returns on the sale, based on public data pertaining to the most recent prevailing market rate for that particular grain in that particular region. In some embodiments, the entire decision of when and how much to sell could be automated by the system.

In some embodiments, weather forecasts for each of the grain batches are utilized to generate the predictive GSQI models. In some embodiments, commodity market forecasts, weather forecasts, energy costs, estimated shrink, and/or labor costs are analyzed to predict the ideal time to sell grain. In some embodiments, the presence of a deleterious anomalous event (e.g., hotspot) is utilized to generate the predictive GSQI models. In some embodiments, the probability of a future deleterious anomalous event is utilized to generate the predictive GSQI models.

(2) Optimizing Decisions Relating to the Shipment of Grain and/or Grain Products The sensor systems, apparatuses, and methods of the present disclosure have applications outside of stationary grain storage environments. For example, a grain storage environment can be mobile (e.g., shipping container, shipping truck, boat, train, etc.). Sensor systems disclosed herein are uniquely suited for utilization in mobile grain storage environments.

For example, a sensor system comprising three sensor units and a gateway can be used to monitor shipment of grain products in a refrigerated truck. In this exemplary embodiment, each sensor units monitors the environmental variables within the refrigerated truck. The sensor units send the data to the gateway over, for example, a local wireless network. The gateway then utilizes a long range wireless network to send the data to a cloud computing system over a long-range network, using, for example, cellular or satellite connectivity. In this way, the cloud computing system can monitor the environmental variables within the refrigerated truck in real time or nearly in real time during the transport of the grain products.

In some embodiments, the system will provide suggestions for optimal shipping methods and/or shipping routes for grain and/or grain products before the grain and/or grain products are shipped. By optimizing the route selected to ship the grain or grain product, the system will allow the user to obtain the maximum return on their product by delivering the product at the highest possible quality. In some embodiments, the system will provide suggestions for the optimal shipping destination for grain and/or grain products, thereby allowing the user to ship and sell their product to the buyer who will receive the grain at maximum quality and consequentially be willing to pay the highest price.

In some embodiments, one or more of the following pieces of information may be collected:
  a. the transport distance for each possible destination;
  b. for non-refrigerated shipping, ambient temperature along possible routes for each possible destination;
  c. variability of time to reach each possible destination; and
  d. likely time that the given product is likely to spend in the remaining portions of the supply chain before reaching the end customer.

This information may be collected using one or more of the following means:
  a. Data is input manually.
  b. The data is transferred from another system, e.g. through an automated process.
  c. The data is determined from other information that is available to the sensor system. For example, if the sensor unit 105 receives power only when a trip is underway, and a gateway has access to a log which indicates which route a given sensor unit 105 is traversing, the average time that the sensor pod receives power on a given route is the average time required to traverse that route. Those skilled in the art will realize that other statistics may equally be determined, such as variability in time to cover the route. Those skilled in the art will also realize that other data may equally be used, for example variability in temperature of a refrigerated truck during the loading and unloading of the truck compared to stable temperature during transit.
  d. In some embodiments, sensor pods may include a geolocation function such as GPS or mobile tower triangulation to facilitate data collection.
  e. In some embodiments, a smart phone equipped with a GPS function may be used to track the movement of the truck in the Cloud e.g. using an app. The Smart phone may also communicate with the Internet e.g., using a cellular (e.g., GSM) gateway if real-time data is needed. The smartphone may also collect data from the Sensor Node (e.g., using the Bluetooth protocol).

Figure 15:
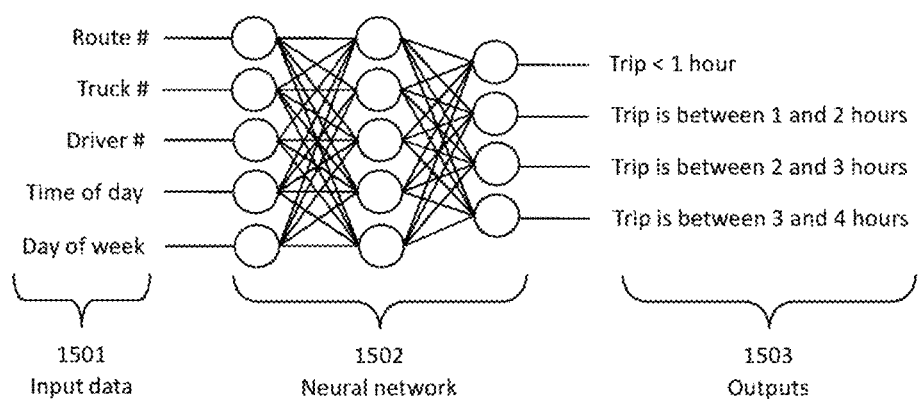
FIG. 15 shows an artificial neural network 1502 that is used to calculate trip length 1503 based on various input data 1501, including route number, truck number, driver number, time of week, and day of the week.

In some embodiments, machine learning is used to estimate transit time based on multiple variables, such as the neural network depicted in FIG. 15. In a preferred embodiment, a neural net may be used. The neural net may have inputs that include route, time of day, day of week, driver, truck identifier and/or other information. The neural net may have outputs that include trip length, trip variability, and/or other parameters e.g. expressed as ranges, for example trip length less than 1 hour, trip length 1 hour to 2 hours, 2 hours to 3 hours, etc. The neural network is trained using techniques known to those knowledgeable in the art, such as back propagation. In some embodiments, the neural network is trained using many other techniques described in the present disclosure with respect to other features (e.g., GSQI, anomaly detection, predictive analytics, etc.).

In some embodiments, an analog neural network may be used, with output values including a numerical value for trip length, trip variability, etc. In some embodiments, the output values for each potential trip will be combined into predicted trip quality value. In some embodiments, the predicted trip quality value for each potential trip is compared, and the potential trip with the largest predicted trip quality value is suggested by the system.

In some embodiments, a predicted GSQI profile is offered for each potential transport option. Such embodiments can utilize all of the methods for determining and predicting GSQI profiles previously discussed. For example, a system could utilize the weather forecast for each of the possible routes of shipment to predict temperature, humidity, and pressure values for the storage environment. Using this information, combined with time for shipping, the system can generate a proposed GSQI profile for the time period of shipment. The system can then suggest the route and/or method of shipment that is predicted to result in the highest GSQI value upon delivery.

In some embodiments, this information may be combined with data on remaining shelf life to determine the optimal distribution order and means of distribution. The algorithm for this will use the perishable item's expected life, real-time environmental conditions (e.g., temperature, humidity), and additional factors important to the business (physical condition including color). The determination is made using one or more of the following algorithms:
  a. Combining these values together using a mathematical equation that has coefficients to weigh different factors differently; (for example, if temperature is twice as important as humidity, temperature could have a coefficient of 2 and humidity could have a coefficient of 1; this equation may be evaluated for each item, and distribution may be ordered based on minimizing the sum, utilizing numerical techniques known to those skilled in the art); or
  b. Machine learning, for example, using any of the machine learning systems disclosed herein or otherwise known in the art.

In some embodiments, real-time data on inventory at the destination may be used as an input to the system to determine where to send a given perishable good. For example, if the real-time data derived from grain in a shipping truck indicates an unforeseen decrease in quality during shipment, the system can suggest rerouting the truck to a closer destination. In some embodiments, a plurality of transport batches is analyzed in real time and each transport batch is matched with the shipping destination that will match the overall quality of all of the batches upon delivery.

Many business decisions can be optimized and/automated using variations on the processes described herein. Thus, many systems and methods for providing such optimization are within the scope of the present disclosure.

What is claimed is:

1. A sensor pod for detecting or providing information about characteristics of a crop storage environment, the sensor pod comprising:
   a three-dimensional round enclosure containing at least the following:
   (i) a power supply;
   (ii) a memory;
   (iii) a processor, the processor configured to execute instructions in the memory and to read and write data to and from the memory;
   (iv) a radio receiver;
   (v) a radio transmitter;
   (vi) an antenna; the antenna configured to wirelessly transmit data and receive data; and
   (vii) one or more sensors; wherein the one or more sensors comprise a temperature sensor, an accelerometer, and one or more of the following: a humidity sensor, an oxygen sensor, a carbon dioxide sensor, a phosphine sensor, an acoustic sensor, an ethylene sensor, a positioning sensor, and a pressure sensor;
   wherein the three-dimensional round enclosure comprises a permeable area, thereby allowing the one or more sensors to detect the environment;
   wherein the three-dimensional round enclosure includes at least one enclosed motor or internal fan configured to move the sensor pod,
   wherein the sensor pod is configured to wirelessly transmit a position of the sensor pod to a gateway or a cloud computing system and receive instructions from the gateway or the cloud computing system comprising movement instructions determined based on the position of the sensor pod,
   wherein the sensor pod is configured to move itself within a crop storage environment based on the movement instructions received from the gateway or the cloud computing system, wherein the movement instructions include a desired position of the sensor pod within the crop storage environment and a route for the sensor pod to take to reach the desired position;
   wherein the sensor pod is configured to be in two possible modes: an active mode, in which power from the power supply is delivered to the radio transmitter and the radio receiver, or a sleep mode, in which power from the power supply is not delivered to the radio transmitter or the radio receiver; and
   wherein the sensor pod can switch between the active mode and the sleep mode and between the sleep mode and the active mode, and wherein the sensor pod is configured to automatically switch from the sleep mode to the active mode responsive to the accelerometer detecting movement beyond a predetermined threshold, wherein the sensor pod will automatically transfer data to the gateway or the cloud computing system upon switching from sleep mode to active mode.

2. The sensor pod of claim 1, wherein the sensor pod further comprises one or more external sensors outside the three-dimensional round enclosure, wherein data is collected by the sensor pod from the one or more external sensors using a wireless connection or direct coupling between the one or more external sensors and the sensor pod.

3. The sensor pod of claim 2, wherein the one or more external sensors are coupled to the sensor pod.

4. The sensor pod of claim 2, wherein data is collected from the one or more external sensors by a wireless connection.

5. The sensor pod of claim 2, wherein the one or more external sensors comprise at least one of the following: an external temperature sensor, an external humidity sensor, an external carbon dioxide sensor, an external oxygen sensor, an external phosphine sensor, an external ethylene sensor, an external acoustic sensor, an external positioning sensor, an external accelerometer, and an external pressure sensor.

6. The sensor pod of claim 2, wherein the one or more external sensors comprise at least one of the following: an external temperature sensor, an external humidity sensor, an external phosphine sensor, an external carbon dioxide sensor, and an external oxygen sensor.

7. The sensor pod of claim 1, wherein the one or more sensors comprises a temperature sensor and a humidity sensor.

8. The sensor pod of claim 7, wherein the one or more sensors further comprises at least one of the following: an oxygen sensor, a carbon dioxide sensor, a phosphine sensor, an acoustic sensor, a positioning sensor, and a pressure sensor.

9. The sensor pod of claim 1, wherein the one or more sensors comprises a temperature sensor, a humidity sensor, and a phosphine sensor.

10. The sensor pod of claim 9, wherein the one or more sensors further comprises at least one of the following: an oxygen sensor, a carbon dioxide sensor, a phosphine sensor, an acoustic sensor, a positioning sensor, and a pressure sensor.

11. The sensor pod of claim 1, wherein the sensor pod will automatically switch from the sleep mode to the active mode upon at least one of the following:
    data received by the sensor pod is outside of a predetermined range or a predetermined set of ranges;
    data received by the sensor pod is different from or substantially different from a predetermined value or a predetermined set of values; or
    the sensor pod was in the sleep mode for a predetermined time period.

12. The sensor pod of claim 1, wherein the sensor pod switches from the active mode to the sleep mode upon at least one the following:
    data received by the sensor pod is within a predetermined range or ranges;
    data received by the sensor pod is equal to or substantially equal to a predetermined value or values;
    the sensor pod was in the active mode for a predetermined time period; and
    the sensor pod cannot find connectivity to a wireless network for a predetermined time period.

13. The sensor pod of claim 1, wherein the antenna comprises a first coaxial antenna unit and a second coaxial antenna unit, and wherein a plane defined by the first coaxial antenna unit is oriented perpendicular to or nearly perpendicular to a plane defined by the second coaxial antenna unit.

14. The sensor pod of claim 13, wherein the sensor pod tests the connectivity for each of the first coaxial antenna unit and the second coaxial antenna unit prior to communication, and communicates using whichever coaxial antenna unit has better connectivity.

15. The sensor pod of claim 1, wherein the power supply is operably coupled to the memory, the processor, the radio receiver, the radio transmitter, and the one or more sensors, wherein the memory is operably coupled to the processor, the radio receiver, the radio transmitter, and the one or more sensors, wherein the processor is operably coupled to the radio receiver, the radio transmitter, and the one or more sensors, and wherein the antenna is operably coupled to the radio transmitter and the radio receiver.

16. The sensor pod of claim 1, wherein the sensor pod further comprises one or more openings on a surface of the three-dimensional round enclosure configured to receive one or more fingers of a user to aid the user in positioning the sensor pod, wherein the one or more openings are separate and independent of the permeable area or one or more other openings configured to facilitate interaction of the one or more sensors with the grain storage environment.

17. The sensor pod of claim 16, wherein the one or more openings on the surface of the three-dimensional round enclosure comprise three openings arranged in a triangle.

18. The sensor pod of claim 1, wherein the three-dimensional round enclosure includes at least one cross section that is circular or approximately circular.

19. The sensor pod of claim 18, wherein the three-dimensional round enclosure has an external diameter of 4 inches to 8 inches.

20. The sensor pod of claim 1, wherein the three-dimensional round enclosure comprises an elongated case.

21. The sensor pod of claim 1, wherein the three-dimensional round enclosure includes one or more handles, divots, openings, and/or grooves configured to interface with a drone for delivery and/or retrieval of the sensor pod.

22. The sensor pod of claim 1, wherein the sensor pod includes one or more positioning sensors configured to determine a position of the sensor pod.

23. The sensor pod of claim 1, wherein the sensor pod includes a camera configured to capture images of the environment.

24. The sensor pod of claim 1, wherein the sensor pod is configured to shake to reestablish connectivity with a wireless network.

25. The sensor pod of claim 1, wherein the sensor pod sends data to and receives data from a second sensor unit, wherein data received from the second sensor unit is buffered within the memory and the data received from the second sensor unit is automatically transmitted wirelessly to the gateway or the cloud computing system when the data connection becomes available.

26. The sensor pod of claim 1, wherein the sensor pod is configured to automatically transmit data to the cloud computing system, wherein the cloud computing system is configured to automatically initiate a downstream process based at least in part on the data received from the sensor pod.

27. The sensor pod of claim 1, wherein the movement instructions are determined based further on a position of a second sensor unit and a set of rules indicating a desirable placement of the sensor pod relative to the second sensor unit.

* * * * *